(12) United States Patent
Nishi et al.

(10) Patent No.: US 10,767,347 B2
(45) Date of Patent: Sep. 8, 2020

(54) SHOVEL AND AUTONOMOUS AERIAL VEHICLE FLYING AROUND SHOVEL

(71) Applicant: SUMITOMO(S.H.I.) CONSTRUCTION MACHINERY CO., LTD., Tokyo (JP)

(72) Inventors: Takashi Nishi, Chiba (JP); Sou Sakuta, Chiba (JP); Takaaki Morimoto, Chiba (JP); Takeya Izumikawa, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/047,426

(22) Filed: Jul. 27, 2018

(65) Prior Publication Data

US 2018/0371723 A1 Dec. 27, 2018

Related U.S. Application Data

(63) Continuation of application No. PCT/JP2017/003041, filed on Jan. 27, 2017.

(30) Foreign Application Priority Data

Jan. 29, 2016 (JP) .................................. 2016-016664
Jan. 29, 2016 (JP) .................................. 2016-016665

(Continued)

(51) Int. Cl.
*E02F 9/26* (2006.01)
*E02F 9/24* (2006.01)
(Continued)

(52) U.S. Cl.
CPC ............ *E02F 9/262* (2013.01); *B64C 39/024* (2013.01); *E02F 9/205* (2013.01); *E02F 9/24* (2013.01);
(Continued)

(58) Field of Classification Search
CPC ........ B64C 2201/024; B64C 2201/127; B64C 2201/145; B64C 2201/146; B64C 39/024;
(Continued)

(56) References Cited

U.S. PATENT DOCUMENTS 6,270,038 B1 8/2001 Cycon et al.
6,744,372 B1 * 6/2004 Shaw ...................... B66C 13/44
212/276

(Continued)

FOREIGN PATENT DOCUMENTS

DE 102014218749 3/2016
GB 2533140 6/2016

(Continued)

OTHER PUBLICATIONS

International Search Report for PCT/JP2017/003041 dated Feb. 28, 2017.

*Primary Examiner* — Atul Trivedi
(74) *Attorney, Agent, or Firm* — IPUSA, PLLC

(57) ABSTRACT

A shovel includes a lower traveling body, an upper turning body mounted on the lower traveling body; and a receiver, a direction detecting device, a controller, and a display device mounted on the upper turning body, wherein the receiver is configured to receive an image captured by a camera-mounted autonomous aerial vehicle, the direction detecting device is configured to detect a direction of the shovel, the controller is configured to generate information related to a target rotation angle of the camera-mounted autonomous aerial vehicle based on the direction of the shovel, and the display device is configured to display the captured image in a same direction as a direction of an image that is captured when the camera-mounted autonomous aerial vehicle rotates by the target rotation angle.

12 Claims, 49 Drawing Sheets

(30) Foreign Application Priority Data

| Feb. 5, 2016 | (JP) | 2016-021322 |
|---|---|---|
| Mar. 15, 2016 | (JP) | 2016-051566 |
| Mar. 31, 2016 | (JP) | 2016-071609 |

(51) Int. Cl.

| H04N 7/18 | (2006.01) |
|---|---|
| G05D 1/00 | (2006.01) |
| E02F 9/20 | (2006.01) |
| G05D 1/10 | (2006.01) |
| B64C 39/02 | (2006.01) |
| E02F 3/43 | (2006.01) |

(52) U.S. Cl.
CPC ............ *E02F 9/26* (2013.01); *E02F 9/261* (2013.01); *G05D 1/0011* (2013.01); *H04N 7/18* (2013.01); *H04N 7/181* (2013.01); *H04N 7/185* (2013.01); *B64C 2201/024* (2013.01); *B64C 2201/127* (2013.01); *B64C 2201/145* (2013.01); *B64C 2201/146* (2013.01); *E02F 3/43* (2013.01); *E02F 9/2029* (2013.01)

(58) Field of Classification Search
CPC ......... G05D 1/0011; G05D 1/101; E02F 3/43; E02F 9/2029; E02F 9/205; E02F 9/24; E02F 9/26; E02F 9/261; E02F 9/262; H04N 7/18; H04N 7/181; H04N 7/185
USPC .......................................................... 701/50
See application file for complete search history.

(56) References Cited

U.S. PATENT DOCUMENTS

| 8,761,933 | B2 | 6/2014 | Oliver, III et al. | |
|---|---|---|---|---|
| 8,824,779 | B1* | 9/2014 | Smyth | G06K 9/0061 |
| | | | | 382/100 |
| 9,056,676 | B1 | 6/2015 | Wang | |
| 9,157,216 | B2 | 10/2015 | Seki | |
| 9,429,867 | B2 | 8/2016 | Suzuki et al. | |
| 2004/0267404 | A1* | 12/2004 | Danko | E02F 3/438 |
| | | | | 700/245 |
| 2005/0027420 | A1 | 2/2005 | Fujishima et al. | |
| 2009/0040307 | A1 | 2/2009 | Rubin | |
| 2012/0029732 | A1 | 2/2012 | Meyer | |
| 2014/0267731 | A1 | 9/2014 | Izumikawa | |
| 2014/0267775 | A1* | 9/2014 | Lablans | H04N 5/2624 |
| | | | | 348/169 |
| 2014/0350886 | A1* | 11/2014 | Metzler | G01S 7/003 |
| | | | | 702/150 |
| 2014/0362220 | A1* | 12/2014 | Izumikawa | G01S 17/89 |
| | | | | 348/148 |
| 2015/0120126 | A1* | 4/2015 | So | G01C 23/00 |
| | | | | 701/26 |
| 2015/0269622 | A1 | 9/2015 | Kitagishi | |
| 2016/0005286 | A1* | 1/2016 | Kiyota | G08B 13/196 |
| | | | | 340/435 |
| 2016/0313736 | A1* | 10/2016 | Schultz | G06F 16/5838 |
| 2017/0247107 | A1* | 8/2017 | Hauer | B64D 35/06 |
| 2019/0150357 | A1* | 5/2019 | Wu | G06T 7/0004 |
| 2019/0177131 | A1* | 6/2019 | Palberg | B66C 13/46 |
| 2019/0303982 | A1* | 10/2019 | Michel | G05D 1/0094 |

FOREIGN PATENT DOCUMENTS

| JP | 2002-542116 | 12/2002 |
|---|---|---|
| JP | 2003-241833 | 8/2003 |
| JP | 2007-147588 | 6/2007 |
| JP | 2008-011193 | 1/2008 |
| JP | 2008-545324 | 12/2008 |
| JP | 2010-200398 | 9/2010 |
| JP | 2010-236208 | 10/2010 |
| JP | 2010-248777 | 11/2010 |
| JP | 2011-058269 | 3/2011 |
| JP | 2012-086348 | 5/2012 |
| JP | 2012-171024 | 9/2012 |
| JP | 2012-178912 | 9/2012 |
| JP | 2012-202063 | 10/2012 |
| JP | 2013-124467 | 6/2013 |
| JP | 2014-123304 | 7/2014 |
| JP | 2014-149621 | 8/2014 |
| JP | 2014-522053 | 8/2014 |
| JP | 2015-037937 | 2/2015 |
| JP | 2015-048025 | 3/2015 |
| JP | 2015-184376 | 10/2015 |
| JP | 2015-189036 | 11/2015 |
| JP | 2015-194069 | 11/2015 |
| WO | 2009/073052 | 6/2009 |
| WO | 2015/066531 | 5/2015 |
| WO | 2015/180180 | 12/2015 |
| WO | 2015/194601 | 12/2015 |

* cited by examiner

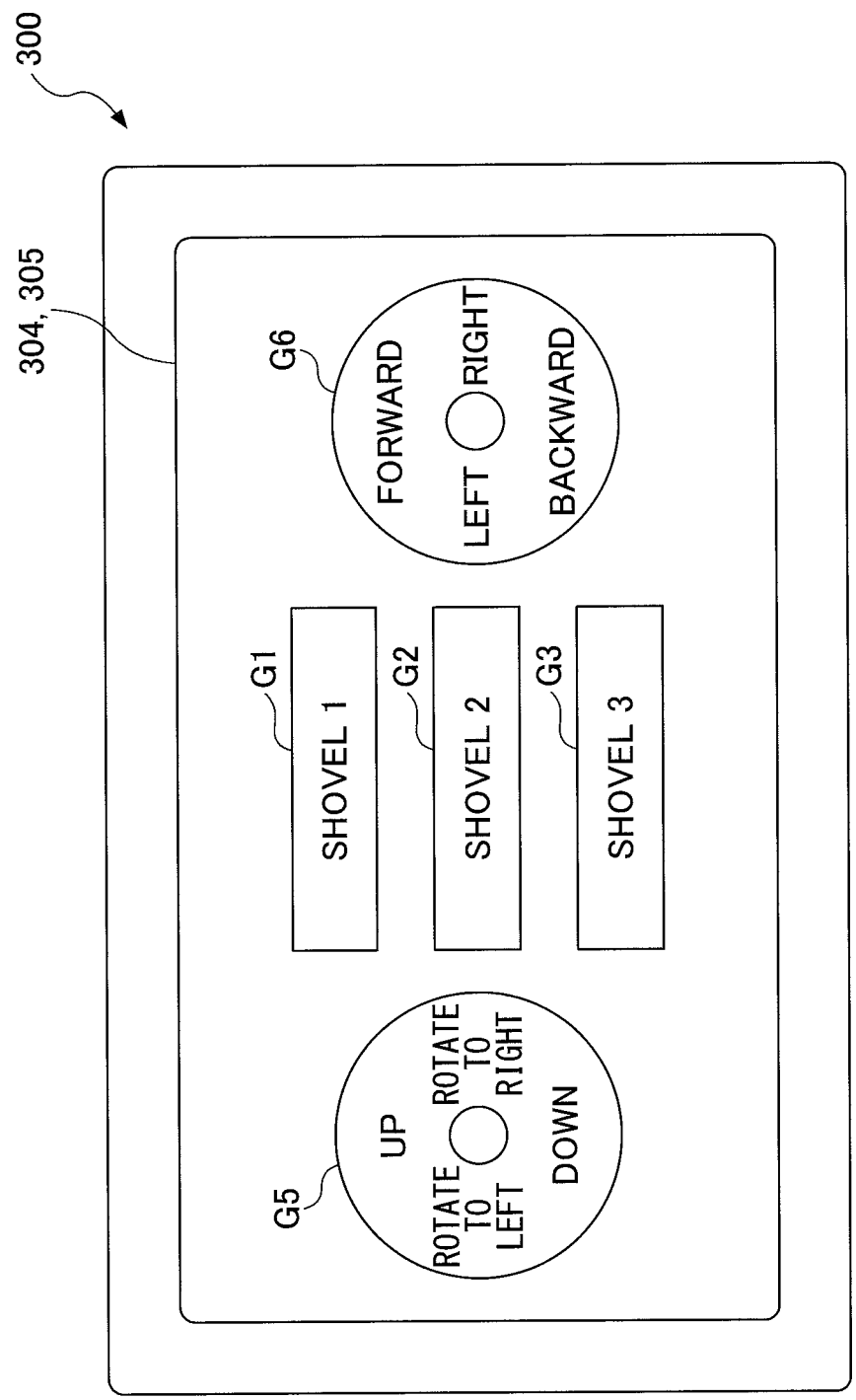

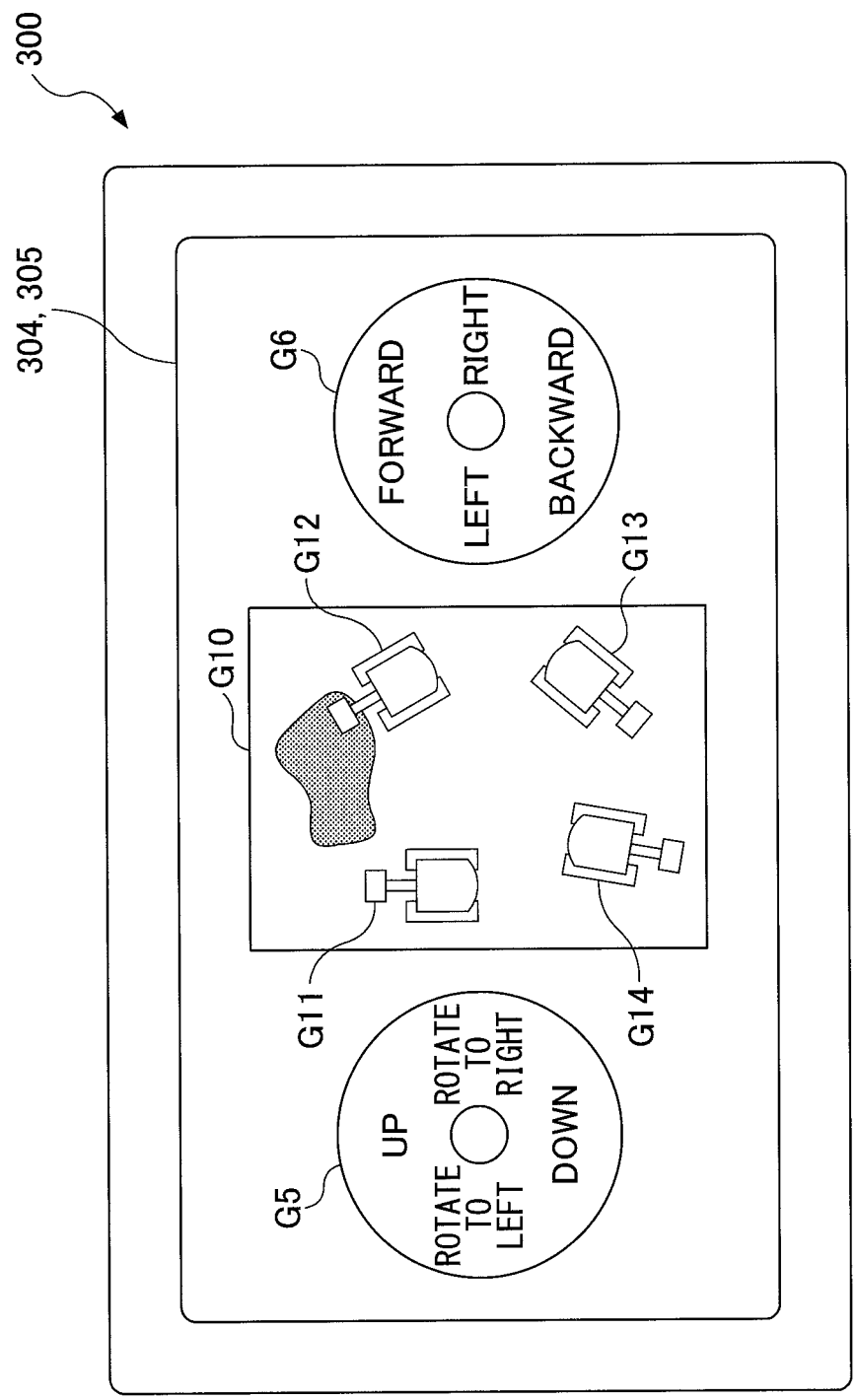

FIG.6A1
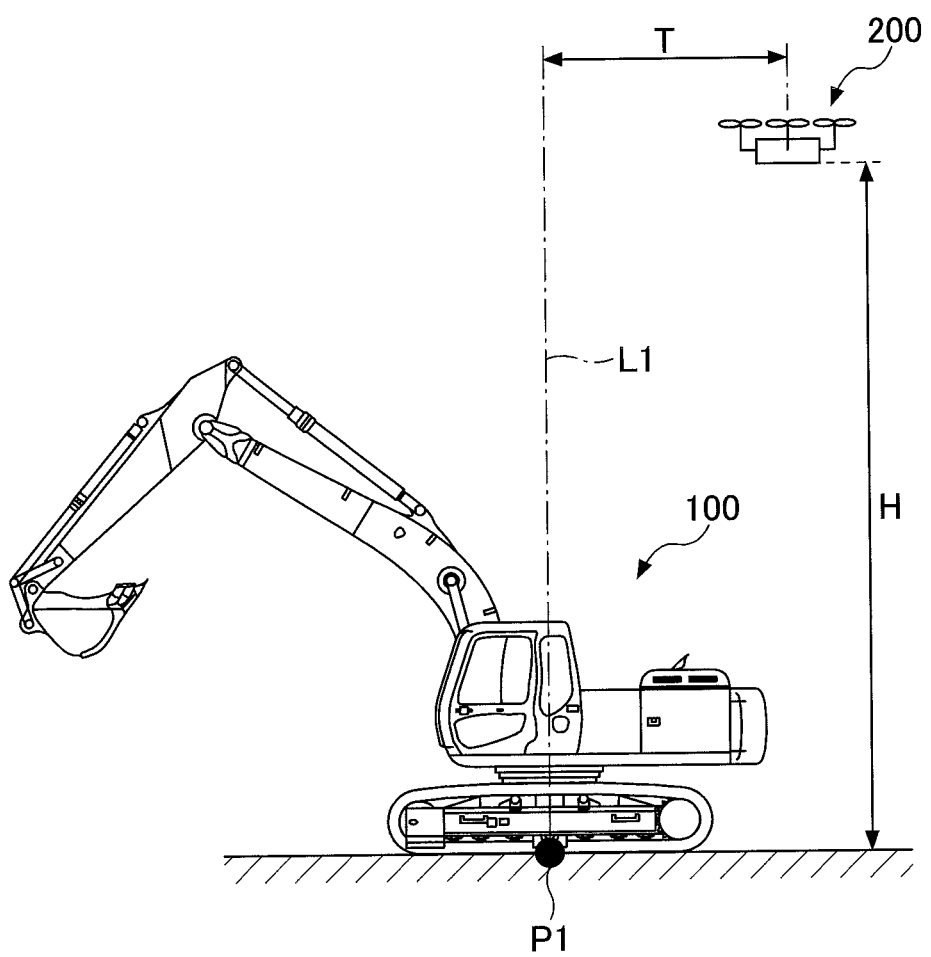

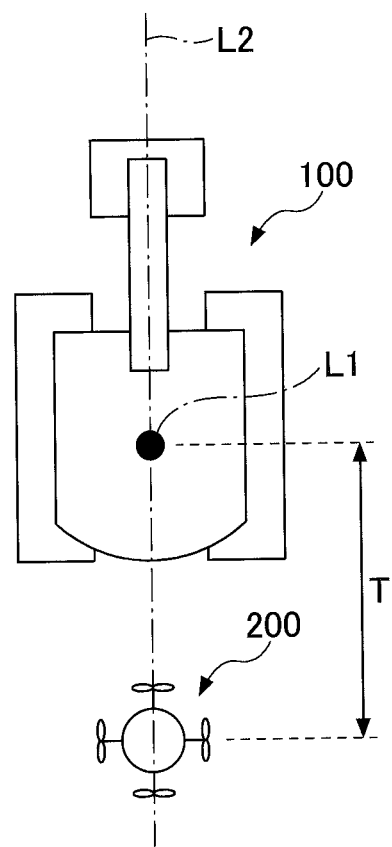
FIG.6A2

FIG.6B1
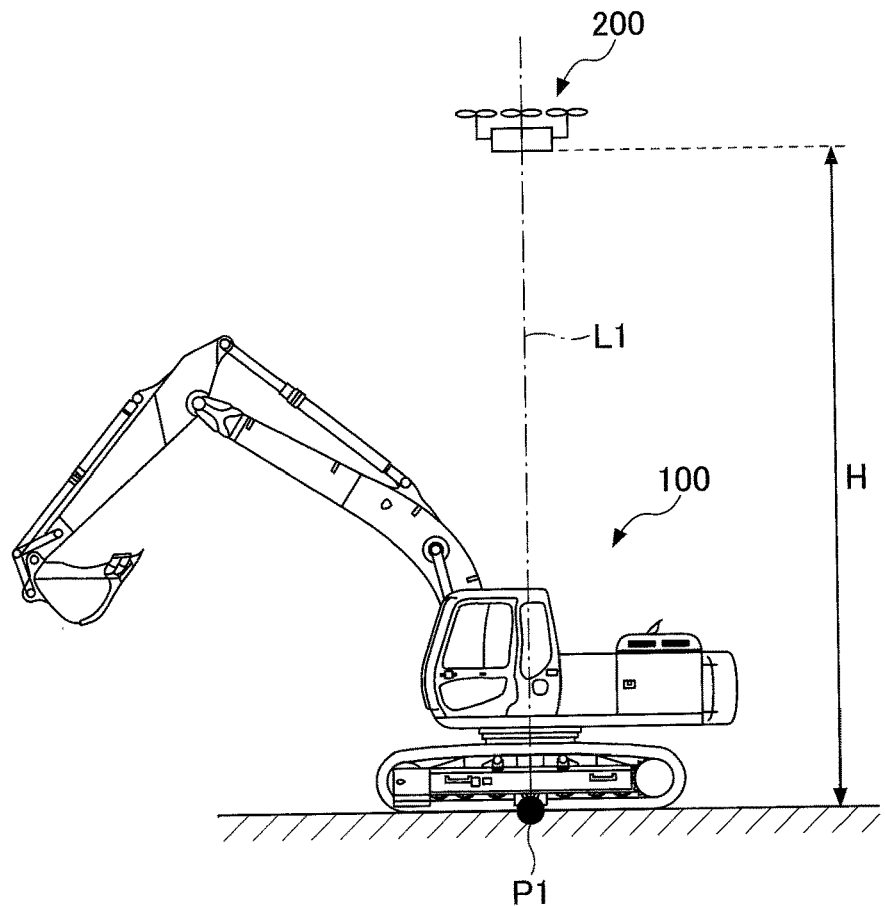
FIG.6B2
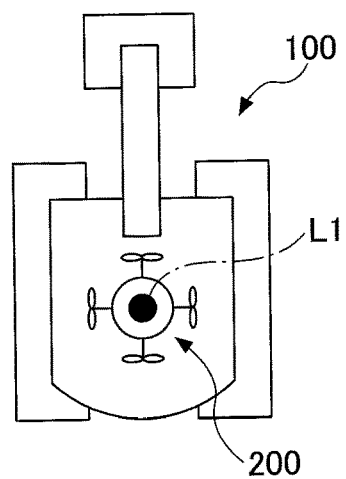

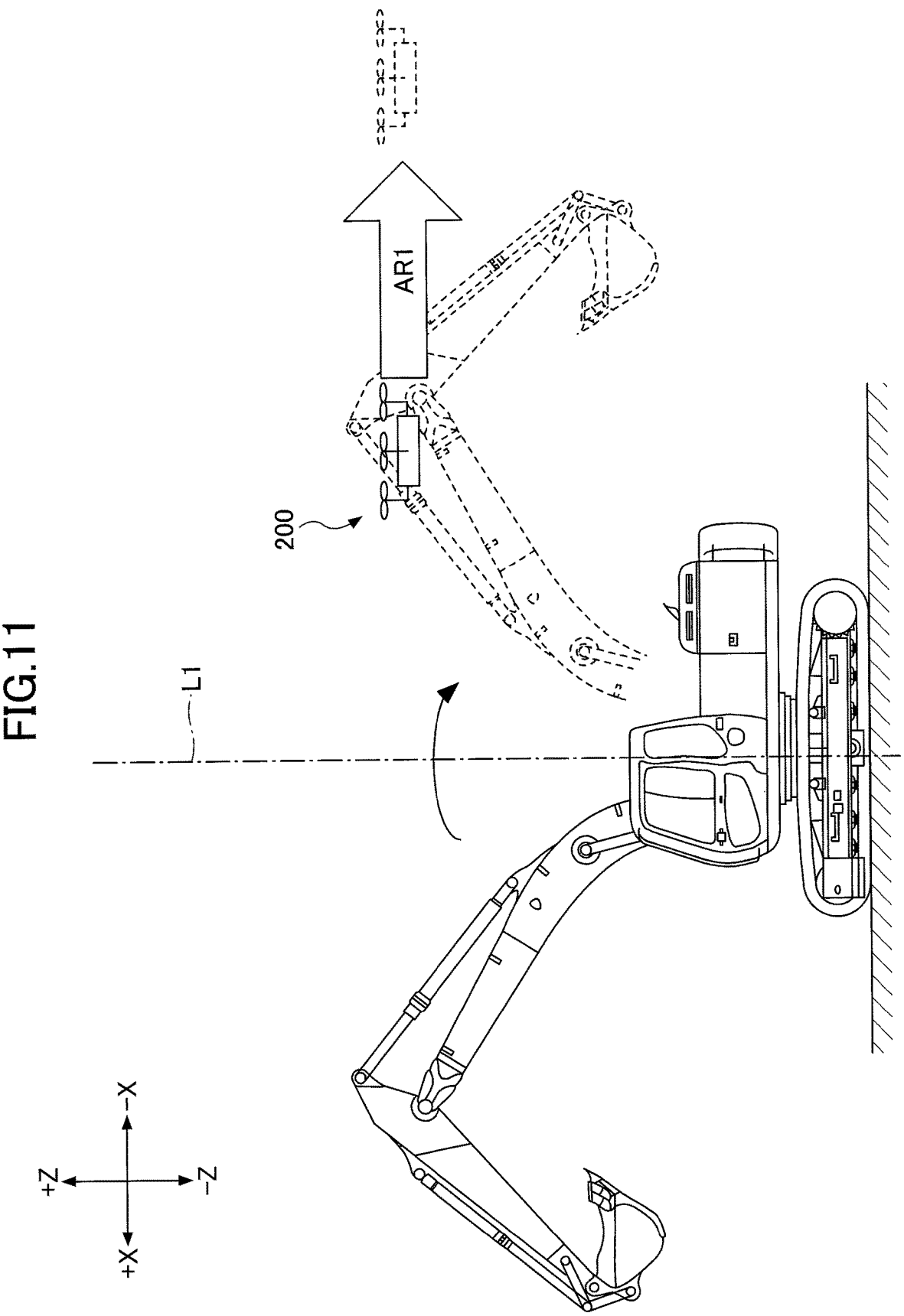

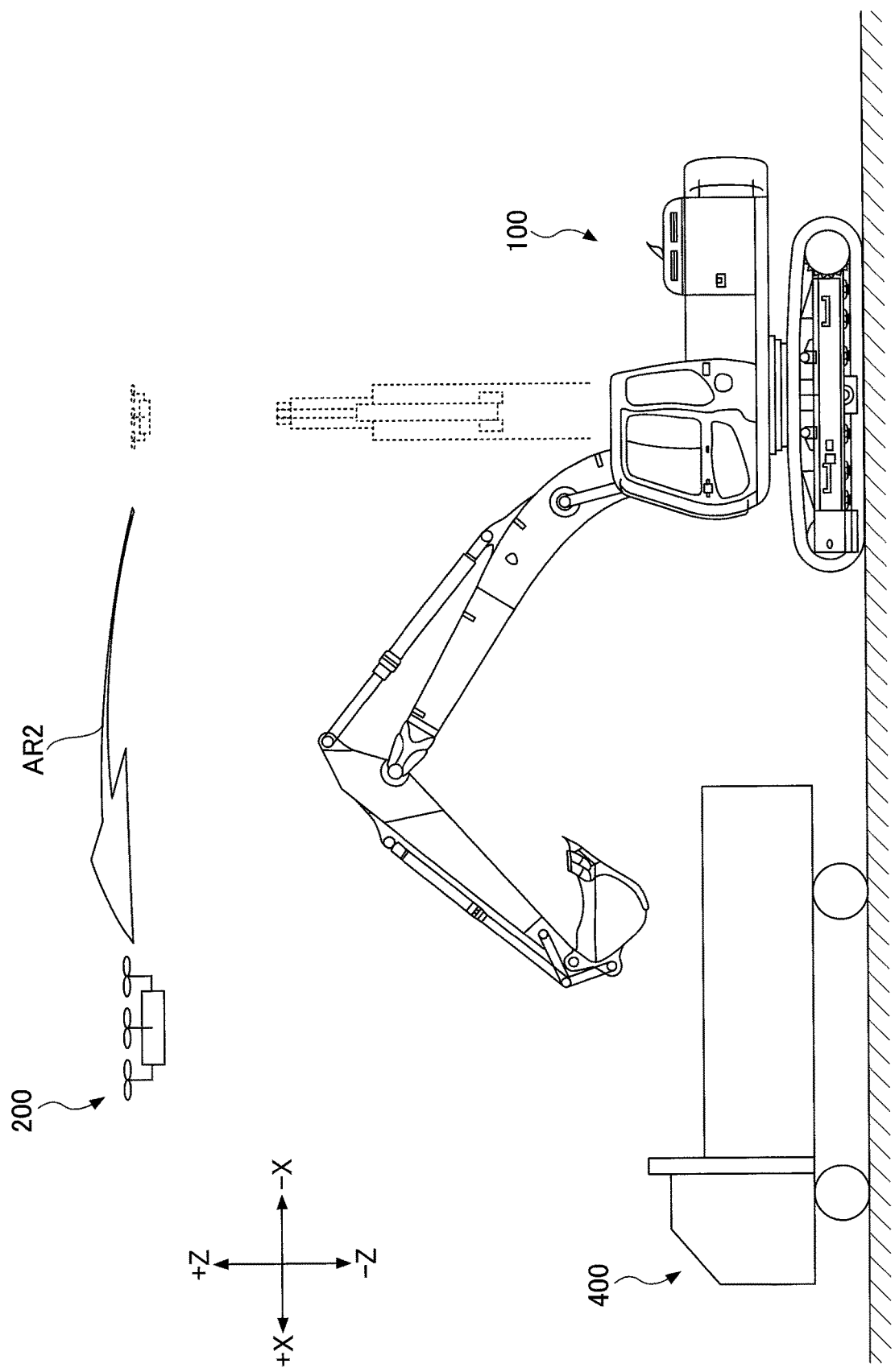

FIG.15A1
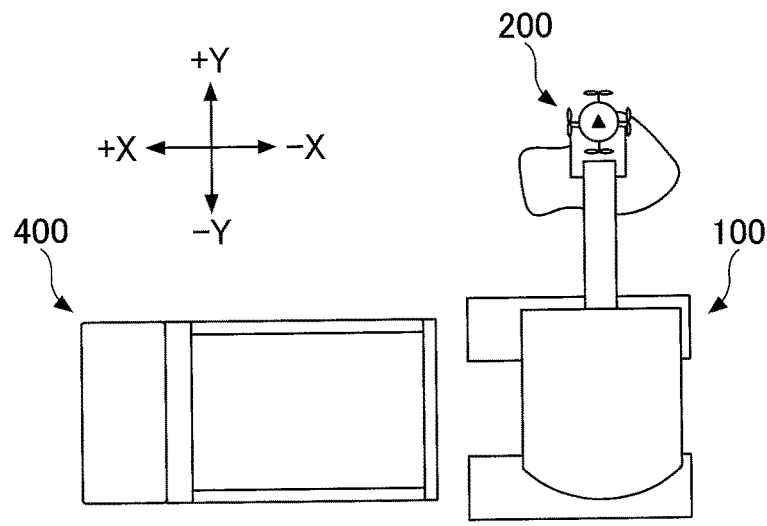
FIG.15A2
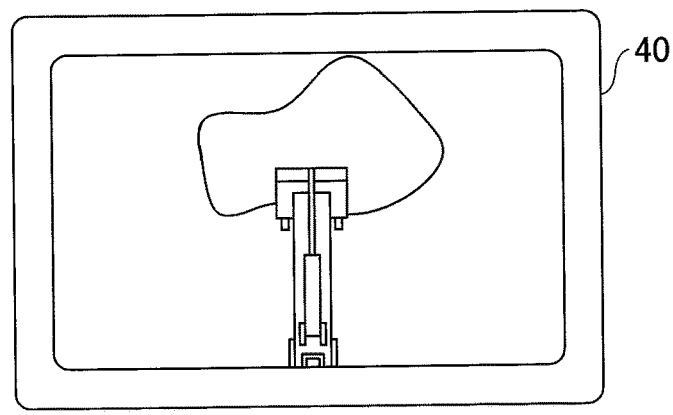

FIG.15B1
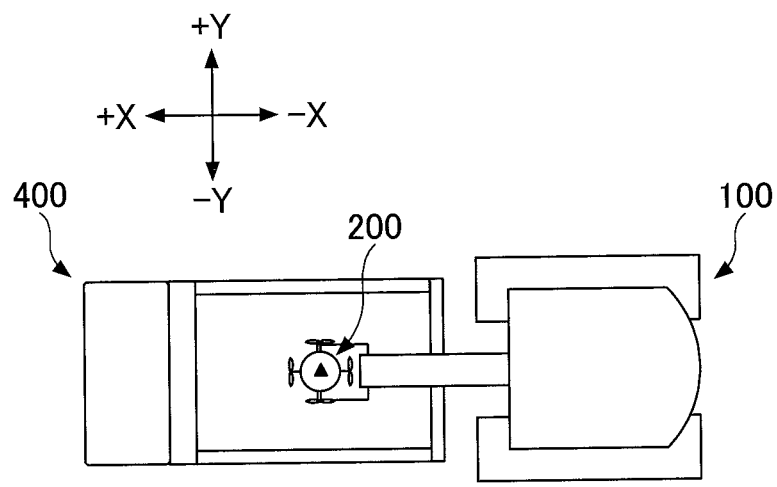
FIG.15B2
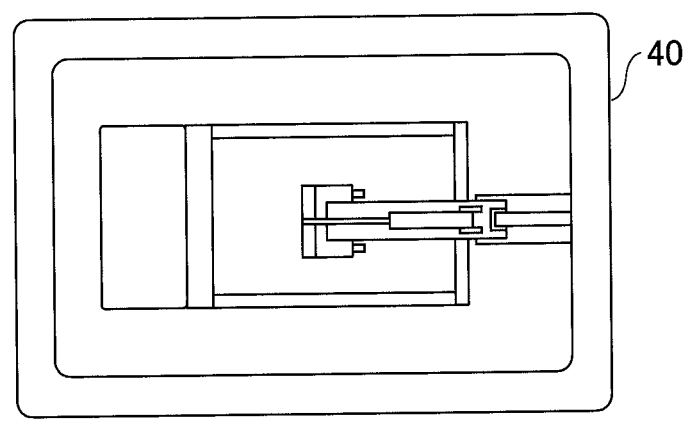

FIG.15C1
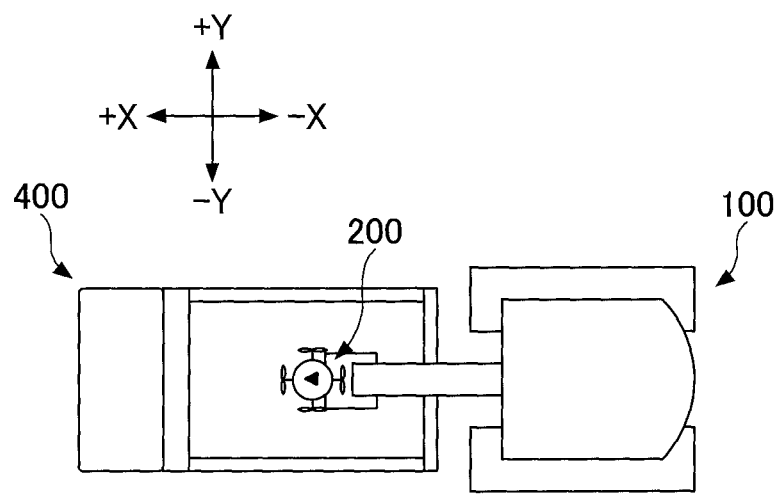
FIG.15C2
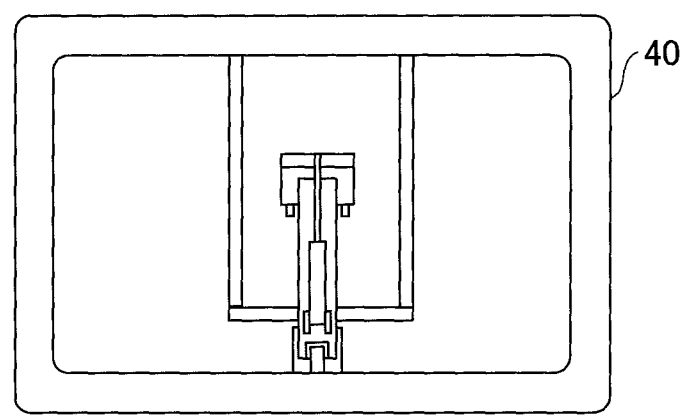

FIG.20B1
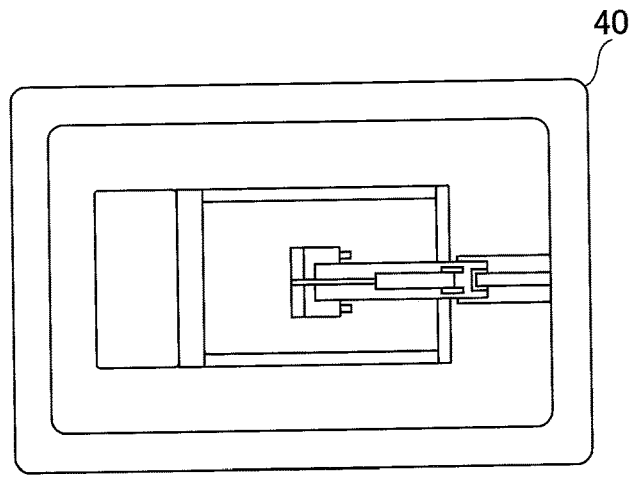
FIG.20B2
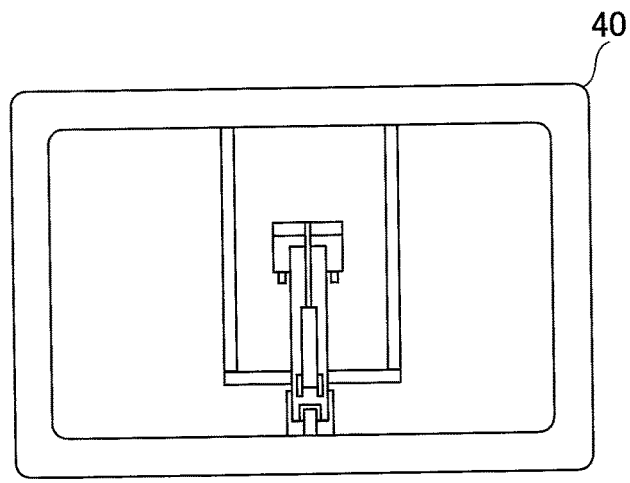

FIG.30A1
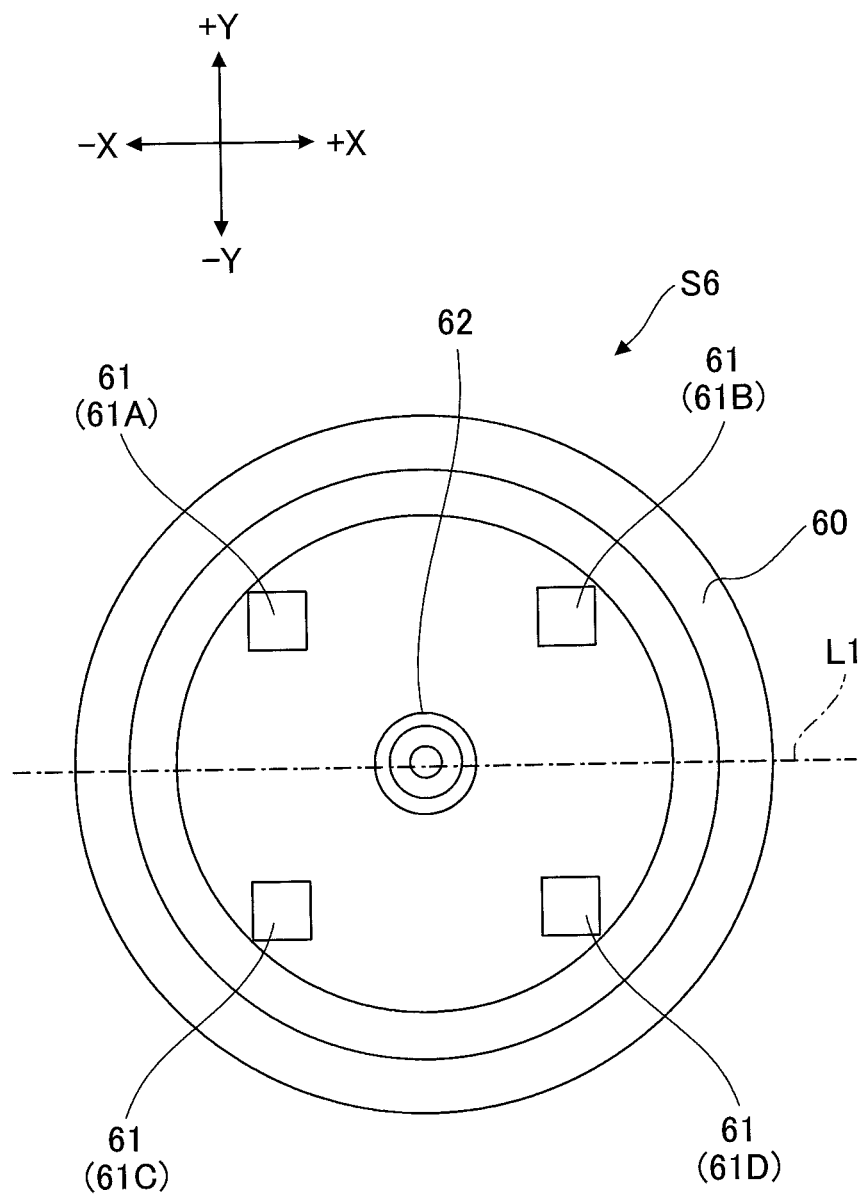

FIG.30A2
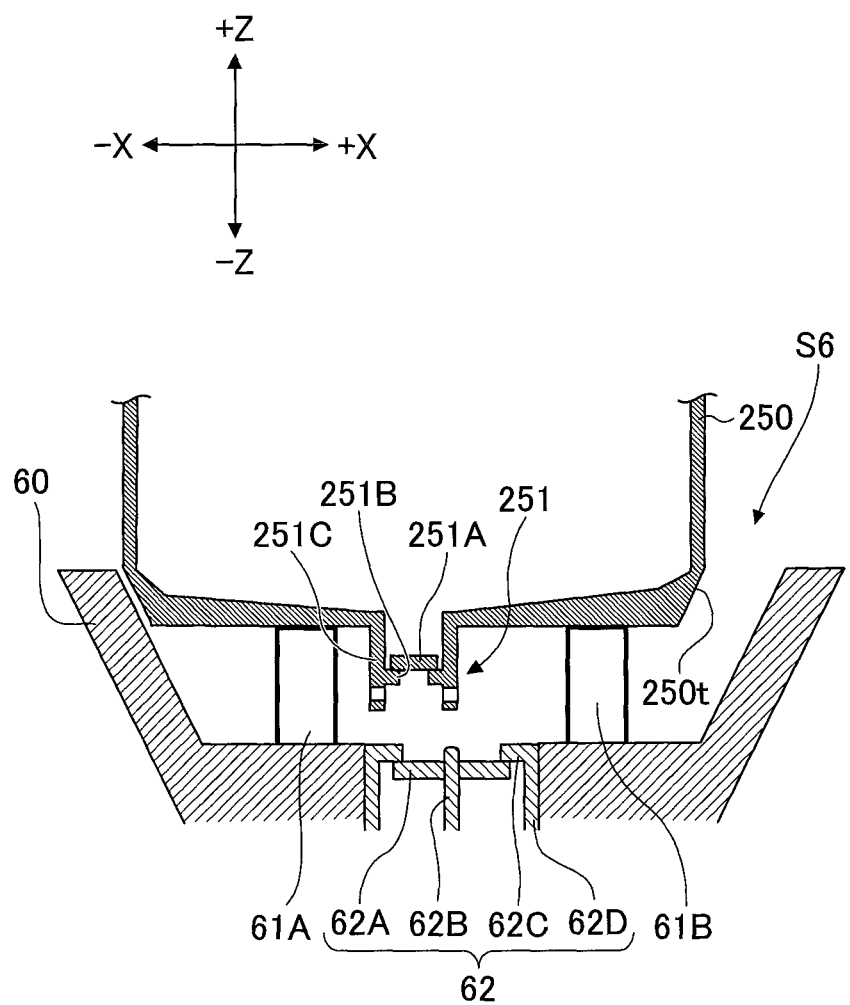

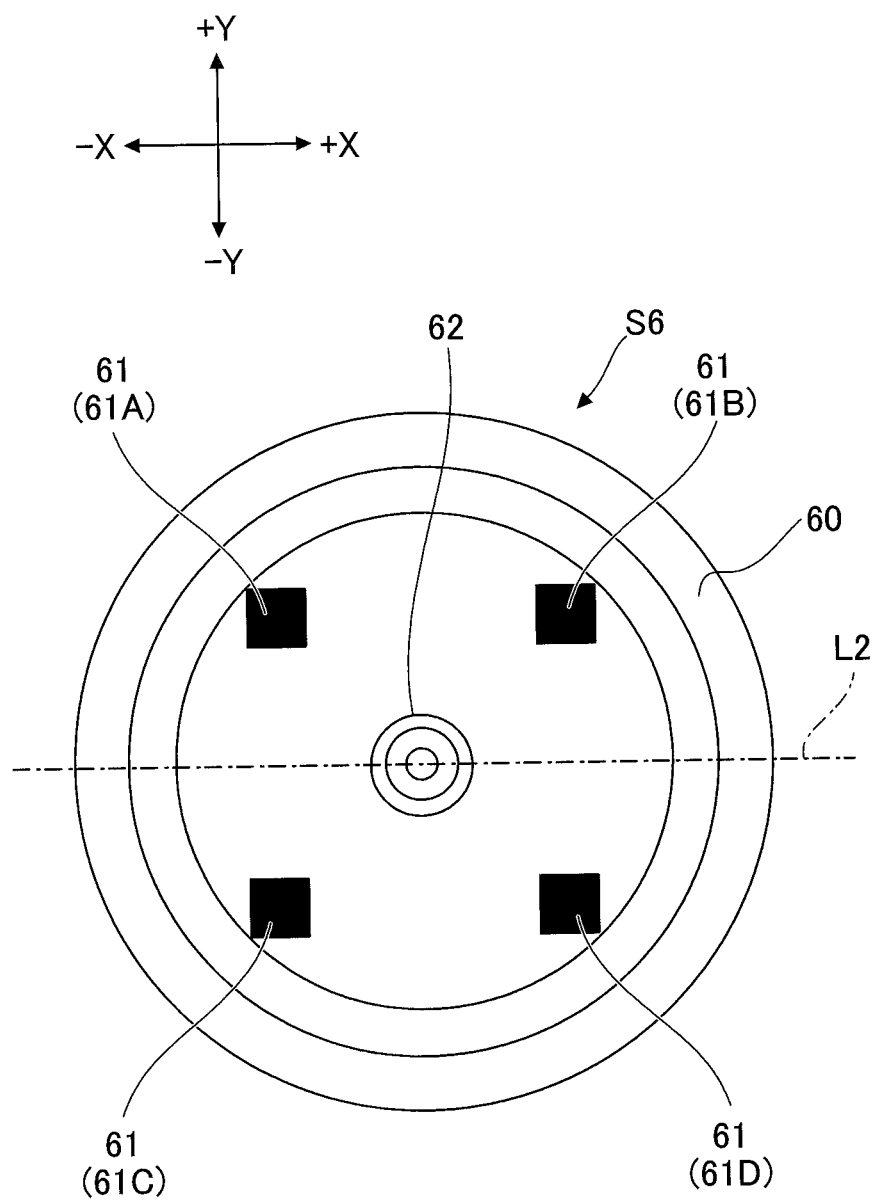
FIG.30B1

FIG.30B2
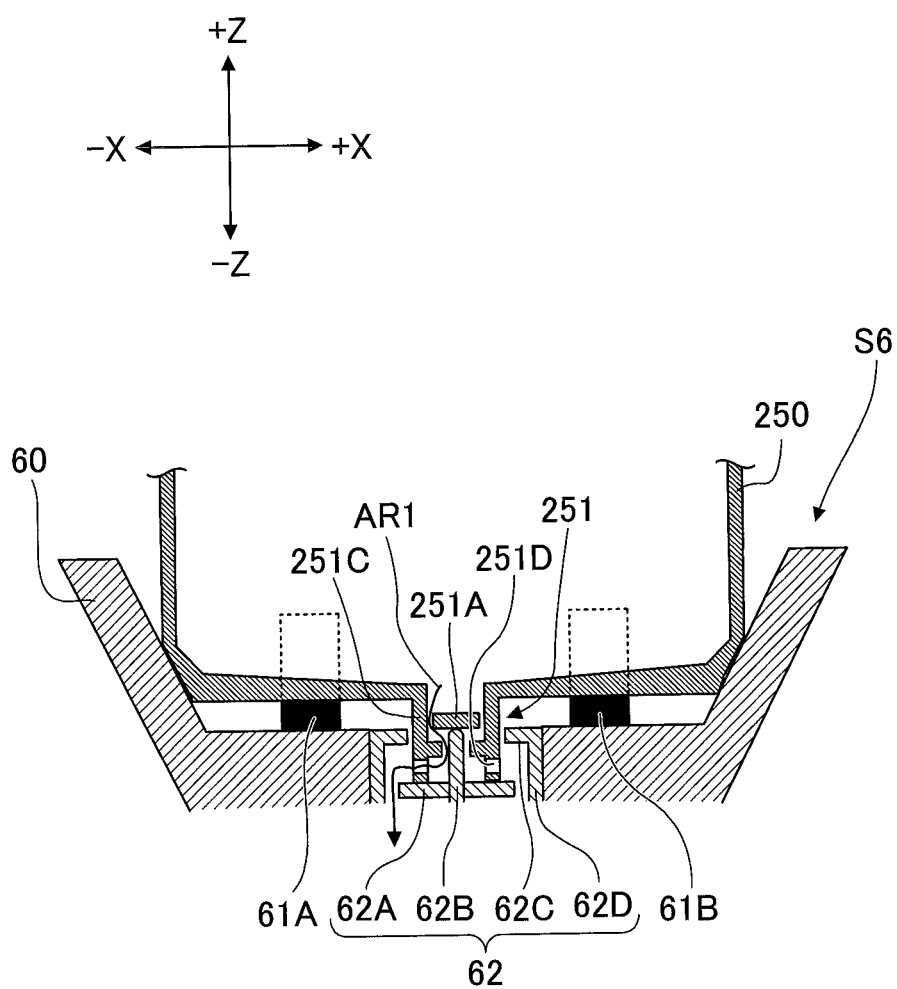

FIG.32A1
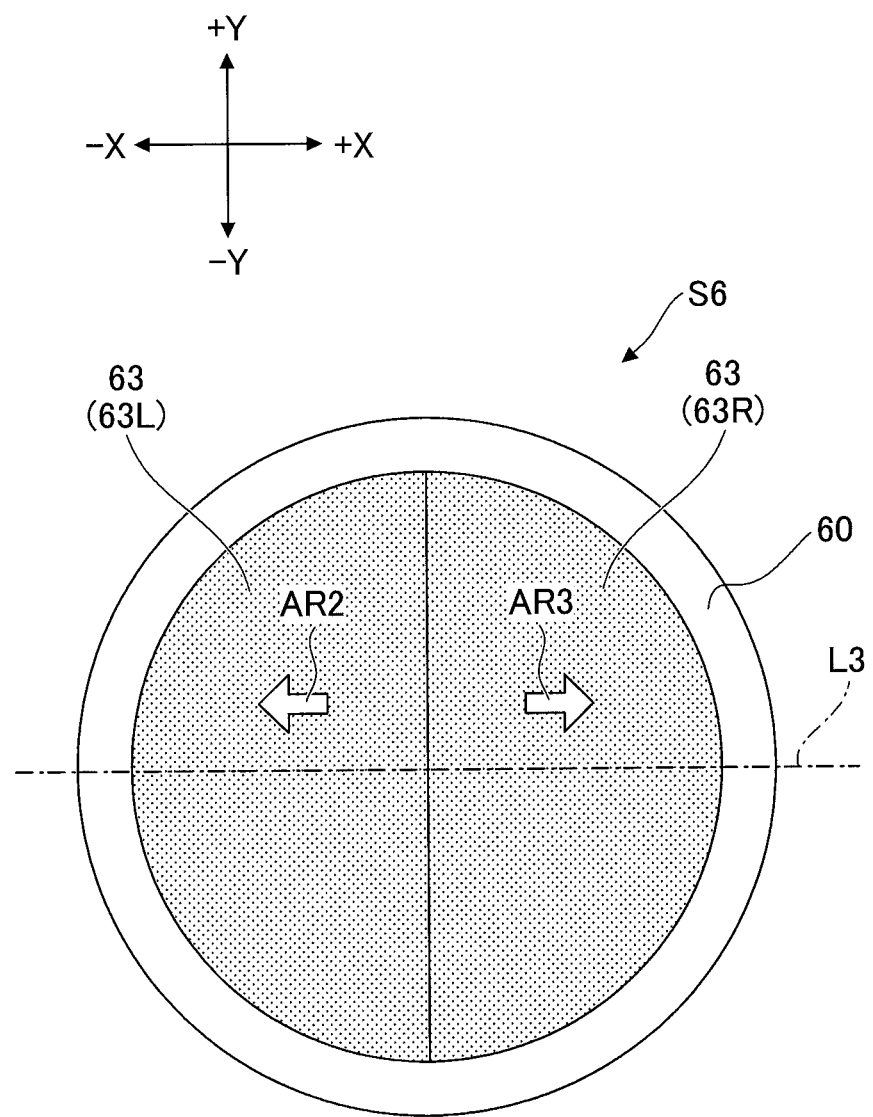

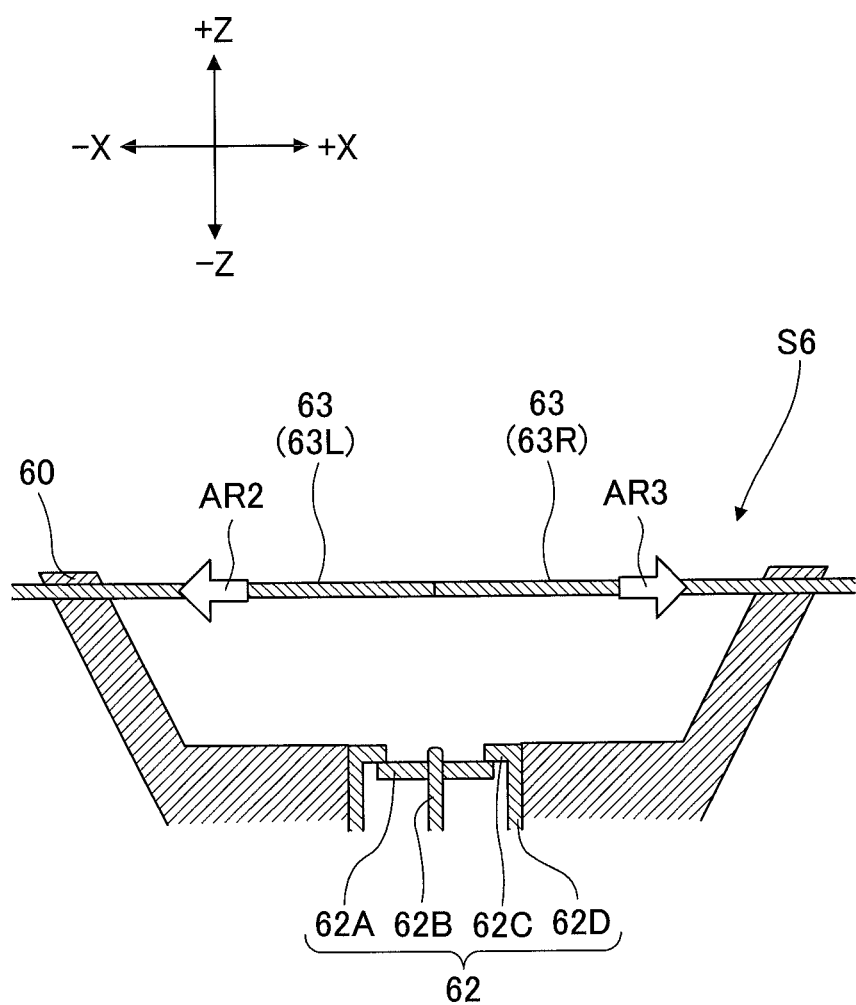
FIG.32A2

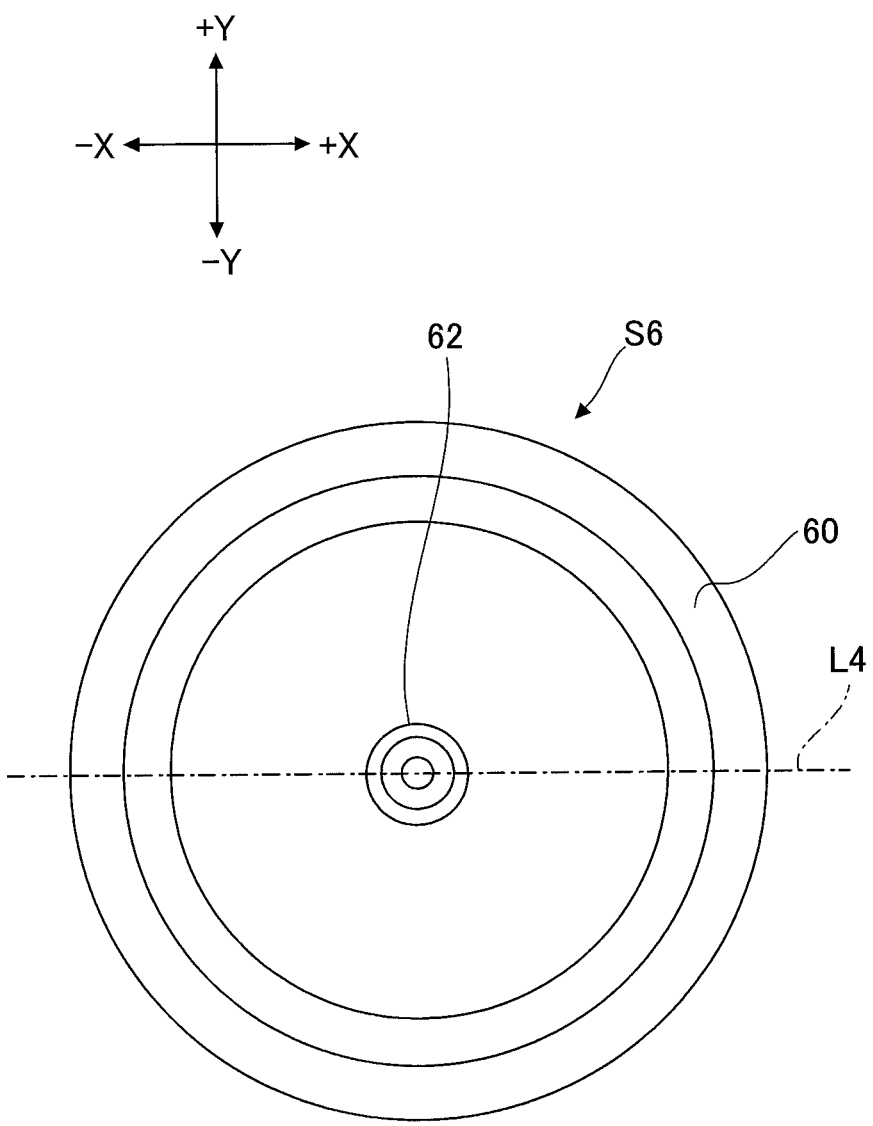
FIG.32B1

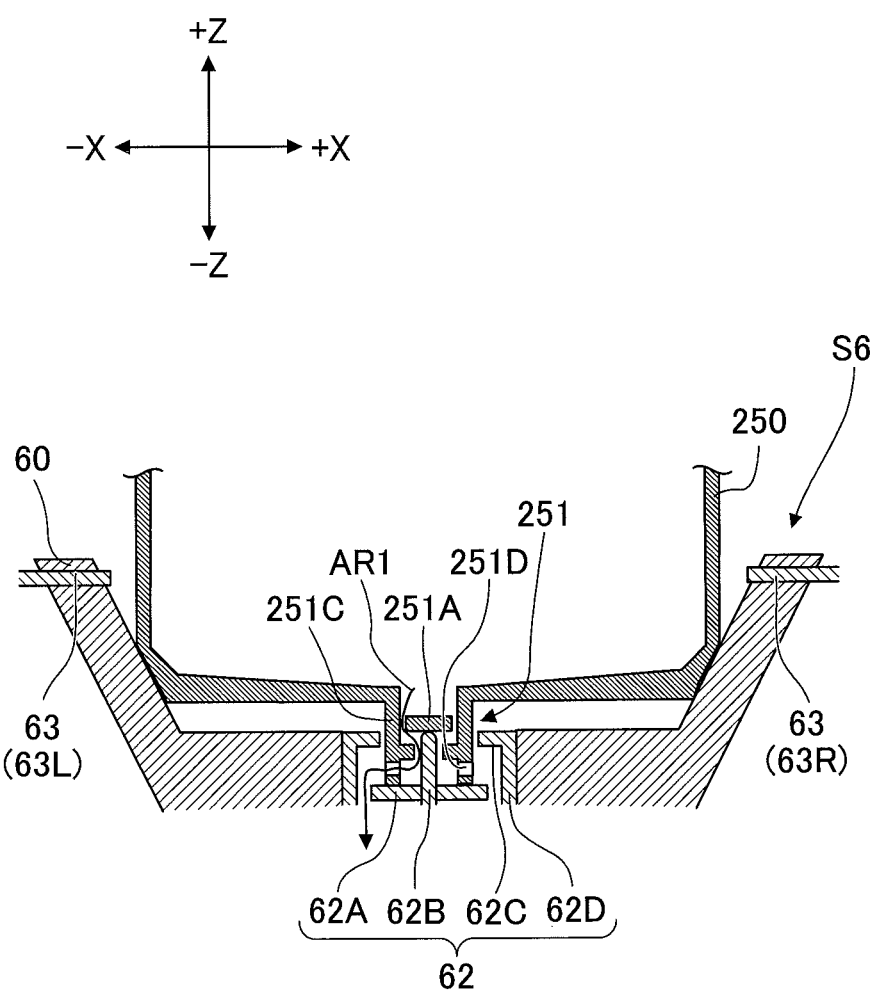
FIG.32B2

SHOVEL AND AUTONOMOUS AERIAL VEHICLE FLYING AROUND SHOVEL

CROSS-REFERENCE TO RELATED APPLICATION

The present application is a continuation application of International Application No. PCT/JP2017/003041, filed on Jan. 27, 2017, which claims priority to Japanese Application No. 2016-016664 filed on Jan. 29, 2016, Japanese Application No. 2016-016665 filed on Jan. 29, 2016, Japanese Application No. 2016-021322 filed on Feb. 5, 2016, Japanese Application No. 2016-051566 filed on Mar. 15, 2016, Japanese Application No. 2016-071609 filed on Mar. 31, 2016, the entire content of each of which is incorporated herein by reference.

BACKGROUND

Technical Field

The disclosures herein generally relate to a shovel and an autonomous aerial vehicle flying around the shovel.

Description of Related Art

A shovel that uses cameras mounted on an upper turning body is known. This shovel is equipped with, in a cabin, a display device that displays images captured by the cameras directed to the sides and the rear side of the upper turning body. Accordingly, an operator of the shovel can visually check situations on the rear side and the sides of the shovel by looking at the display device.

However, the shovel disclosed in Patent Document 1 only displays, on the display device, images captured by the cameras mounted on the upper turning body. Thus, the operator of the shovel is not able to visually check situations of spaces that are not captured by the cameras. The spaces that are not captured by the cameras include a space inside an excavated hole and a space immediately behind a counter weight, for example.

SUMMARY

According to at least one embodiment, a shovel includes a lower traveling body, an upper turning body mounted on the lower traveling body; and a receiver, a direction detecting device, a controller, and a display device mounted on the upper turning body, wherein the receiver is configured to receive an image captured by a camera-mounted autonomous aerial vehicle, the direction detecting device is configured to detect a direction of the shovel, the controller is configured to generate information related to a target rotation angle of the camera-mounted autonomous aerial vehicle based on the direction of the shovel, and the display device is configured to display the captured image in a same direction as a direction of an image that is captured when the camera-mounted autonomous aerial vehicle rotates by the target rotation angle.

According to at least one embodiment, an autonomous aerial vehicle includes a camera configured to capture an image of a shovel, a transmitter configured to transmit the image captured by the camera, and a controller configured to obtain a direction of the shovel based on the captured image and determine a target rotation angle based on the direction of the shovel, wherein an angle between a direction of the autonomous aerial vehicle when the autonomous aerial vehicle rotates by the target rotation angle and a direction of the shovel is a preliminarily set angle.

According to at least one embodiment, an autonomous aerial vehicle includes a camera configured to capture an image of a shovel, a transmitter configured to transmit the image captured by the camera, a receiver configured to receive information generated by the shovel, and a controller configured to determine a target rotation angle based on the information generated by the shovel, wherein an angle between a direction of the autonomous aerial vehicle when the autonomous aerial vehicle rotates by the target rotation angle and a direction of the shovel is a preliminarily set angle.

According to at least one embodiment, a shovel includes a lower traveling body, an upper turning body mounted on the lower traveling body, and a receiver and a controller mounted on the upper turning body, wherein the receiver is configured to receive an image captured by a camera-mounted autonomous aerial vehicle, the captured image includes a marker image that is an image of a mark attached to the shovel, and the controller is configured to guide a movement of the shovel based on the marker image included in the captured image.

According to at least one embodiment, an autonomous aerial vehicle includes a camera configured to capture an image of a shovel, a transmitter configured to transmit the image captured by the camera, and a controller configured to obtain a position and a direction of the shovel based on the captured image, wherein the captured image includes a marker image that is an image of a mark attached to the shovel.

Other objects and further features of the present invention will be apparent from the following detailed description when read in conjunction with the accompanying drawings.

BRIEF DESCRIPTION OF THE DRAWINGS

FIG. 4A is a front view of an example of a remote control;

FIG. 4B is a front view of an example of the remote control;

FIG. 6A1 is a drawing illustrating an example of a target flight position of the aerial vehicle;

FIG. 6A2 is a drawing illustrating an example of the target flight position of the aerial vehicle;

FIG. 6B1 is a drawing illustrating an example of a target flight position of the aerial vehicle;

FIG. 6B2 is a drawing illustrating an example of the target flight position of the aerial vehicle;

FIG. 11 is a drawing illustrating a relationship between the shovel and the aerial vehicle 200 when avoidance flight is performed;

FIG. 14 is a side view illustrating the shovel, the aerial vehicle, and a dump truck;

FIG. 15A1 is a drawing illustrating a relative positional relationship between the shovel, the aerial vehicle, and the dump truck;

FIG. 15A2 is a drawing illustrating an image captured by a camera of the aerial vehicle in FIG. 15A1;

FIG. 15B1 is a drawing illustrating another example of a relative positional relationship between the shovel, the aerial vehicle, and the dump truck;

FIG. 15B2 is a drawing illustrating an image captured by the camera of the aerial vehicle in FIG. 15B1;

FIG. 15C1 is a drawing illustrating yet another example of a relative positional relationship between the shovel, the aerial vehicle, and the dump truck;

FIG. 15C2 is a drawing illustrating an image captured by the camera of the aerial vehicle in FIG. 15C1;

FIG. 20B1 is a drawing illustrating an image captured by the camera of the aerial vehicle in FIG. 20A;

FIG. 20B2 is a drawing illustrating an image captured by the camera of the aerial vehicle in FIG. 20A;

FIG. 30A1 is a drawing for explaining an operation of the docking device;

FIG. 30A2 is a drawing for explaining an operation of the docking device;

FIG. 30B1 is a drawing for explaining an operation of the docking device;

FIG. 30B2 is a drawing for explaining an operation of the docking device;

FIG. 32A1 is a drawing for explaining another example of the docking device;

FIG. 32A2 is a drawing for explaining another example of the docking device;

FIG. 32B1 is a drawing for explaining another example of the docking device; and FIG. 32B2 is a drawing for explaining another example of the docking device.

DETAILED DESCRIPTION

It is desirable to provide a shovel that can present, to an operator of the shovel, an image of a space captured by a camera capable of capturing such an image of a space that is unable to be captured by a camera mounted on an upper turning body.

In the following, embodiments of the present invention will be described with reference to the accompanying drawings.

Figure 1:
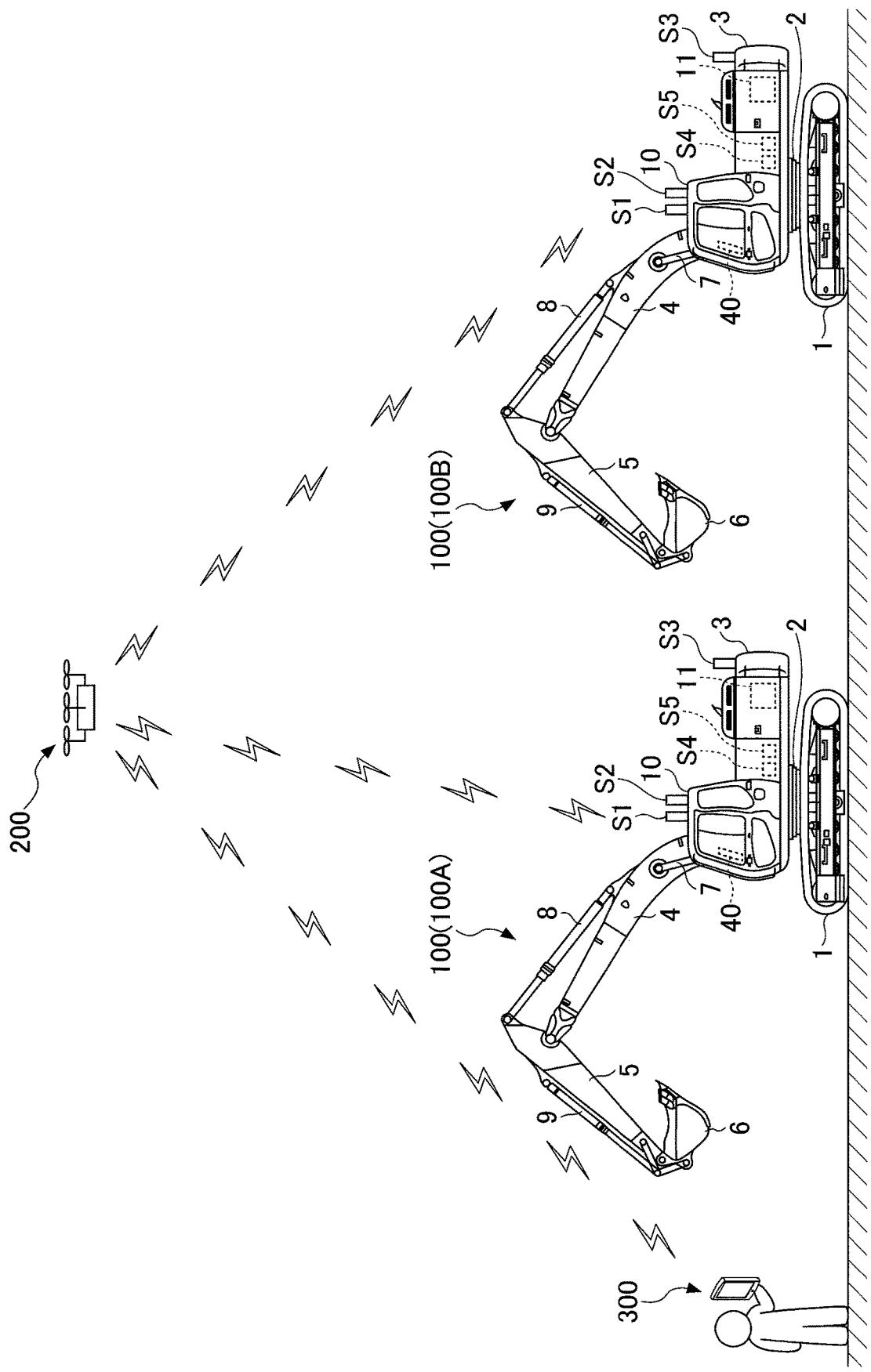
FIG. 1 is a drawing illustrating a work site where a work support system is used.

First, referring to FIG. 1, a work support system including a shovel (excavator) 100 and an aerial vehicle 200 according to an embodiment will be described. FIG. 1 is a drawing illustrating a work site where the work support system is used.

The work support system mainly includes the shovel 100, the aerial vehicle 200, and a remote control 300. The shovel 100 configuring the work support system may be a single shovel or a plurality of shovels. The example of FIG. 1 includes two shovels 100A and 100B.

The aerial vehicle 200 is an autonomous aerial vehicle that can fly under remote control or under autopilot. Examples of the aerial vehicle 200 include a multicopter and an airship. In the present example, the aerial vehicle 200 is a quadcopter having a camera mounted. The remote control 300 is a remote control for remotely controlling the aerial vehicle 200.

An upper turning body 3 is rotatably mounted on a lower traveling body 1 of the shovel 100 via a turning mechanism 2. A boom 4 is mounted on the upper turning body 3. An arm 5 is attached to the end of the boom 4, and a bucket 6 is attached to the end of the arm 5. The boom 4, the arm 5, and the bucket 6, which are work elements, form an excavation attachment as an example of an attachment. A cabin 10 is mounted on the upper turning body 3. The boom 4, the arm 5, and the bucket 6 are hydraulically driven by a boom cylinder 7, an arm cylinder 8, and a bucket cylinder 9, respectively. A cabin 10 is mounted on the upper turning body 3 and power sources such as an engine 11 are also mounted on the upper turning body 3.

The upper turning body 3 includes a transmitter S1, a receiver S2, a positioning device S3, an orientation detecting device S4, a direction detecting device S5, and a display device 40.

The transmitter S1 transmits information to the outside of the shovel 100. For example, the transmitter S1 repeatedly transmits, at predetermined intervals, information that can be received by the aerial vehicle 200 or the remote control 300. In the present embodiment, the transmitter S1 repeatedly transmits, at predetermined intervals, information that can be received by the aerial vehicle 200. Only after the aerial vehicle 200 receives information transmitted from the transmitter S1, the transmitter S1 may transmit next information to the aerial vehicle 200.

The receiver S2 receives information transmitted from the outside of the shovel 100. For example, the receiver S2 receives information transmitted from the aerial vehicle 200 or the remote control 300. In the present embodiment, the receiver S2 receives information transmitted from the aerial vehicle 200.

The positioning device S3 obtains information related to a position of the shovel 100. In the present embodiment, the positioning device S3 is a Global Navigation Satellite System (GNSS) (Global Positioning System (GPS)) receiver and measures latitude, longitude, and altitude of the current position of the shovel 100.

The orientation detecting device S4 detects an orientation of the shovel. The orientation of the shovel is, for example, an orientation of the excavation attachment. In the present embodiment, the orientation detecting device S4 includes a boom angle sensor, an arm angle sensor, a bucket angle sensor, and a body inclination angle sensor. The boom angle sensor is a sensor that obtains a boom angle. For example, the boom angle sensor includes a rotation angle sensor that detects a rotation angle of a boom foot pin, a stroke sensor that detects the length of stroke of the boom cylinder 7, and an inclination (acceleration) sensor that detects an inclination angle of the boom 4. The arm angle sensor and the bucket angle sensor are also configured similarly. The body inclination angle sensor is a sensor that obtains a body inclination angle. For example, the body inclination angle sensor detects an inclination angle of the upper turning body 3 relative to a horizontal plane. In the present embodiment, the body inclination angle sensor is a two-axis acceleration sensor that detects an inclination angle around a front-back axis and a right-left axis. For example, the front-back axis and the right-left axis of the upper turning body 3 are orthogonal to each other and pass through the center point of the shovel, which is a point on a turning axis of the shovel 100. The body inclination angle sensor may be a three-axis acceleration sensor.

The direction detecting device S5 detects a direction of the shovel 100. The direction detecting device S5 is configured with, for example, a geomagnetic field sensor, a resolver or an encoder for the turning axis of the turning mechanism 2, and a gyro-sensor. The direction detecting device S5 may be configured with a GNSS compass including two GNSS receivers. In the present embodiment, the direction detecting device S5 is configured with a combination of a 3-axis geomagnetic field sensor and the gyro-sensor.

The display device 40 is a device that displays various types of information, and is disposed in the vicinity of an operator's seat in the cabin 10. In the present embodiment, the display device 40 can display an image captured by the aerial vehicle 200.

Figure 2:
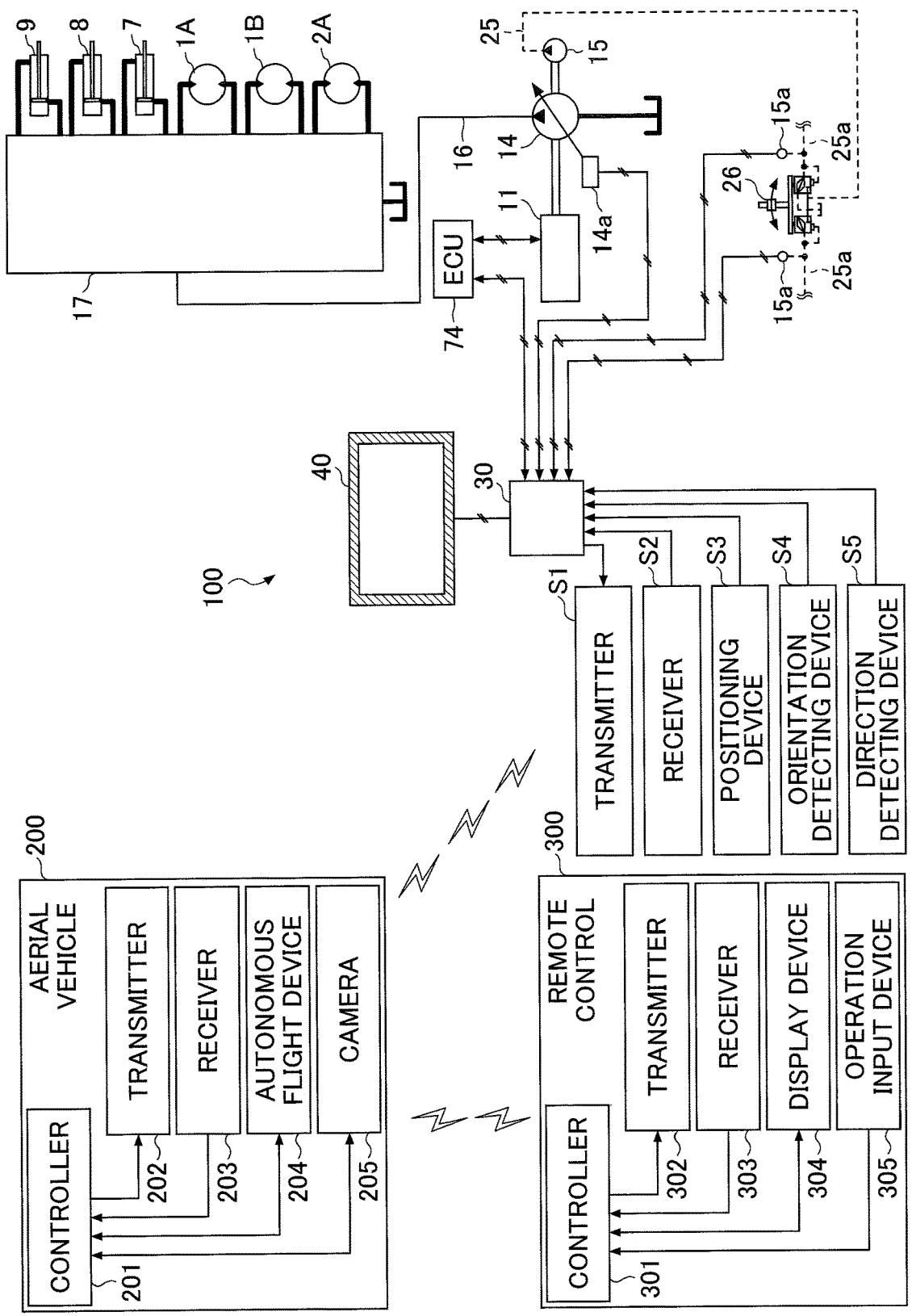
FIG. 2 is a system configuration diagram of the work support system.

Next, referring to FIG. 2, a configuration of the work support system will be described. FIG. 2 is a system configuration diagram of the work support system.

The shovel 100 is configured with an engine 11, a main pump 14, a pilot pump 15, a control valve 17, an operating unit 26, a controller 30, and an engine control unit 74.

The engine 11 is a driving source of the shovel 100. The engine 11 is, for example, a diesel engine operated at a predetermined rotation speed. An output shaft of the engine 11 is connected to an input shaft of the main pump 14 and an input shaft of the pilot pump 15.

The main pump 14 is a variable volume swash plate type hydraulic pump configured to supply hydraulic oil to the control valve 17 via a high-pressure hydraulic line 16. The discharge flow rate of the main pump 14 per rotation changes according to the change in an inclination angle of a swash plate. The inclination angle of the swash plate is controlled by a regulator 14a. The regulator 14a changes the inclination angle of the swash plate according to the change in controlled electric current from the controller 30.

The pilot pump 15 is a fixed volume hydraulic pump configured to supply hydraulic oil to various types of hydraulic control units such as the operating unit 26 via a pilot line 25.

The control valve 17 is a set of flow rate control valves that control the flow of hydraulic oil supplied to hydraulic actuators. The control valve 17 selectively supplies hydraulic oil, received from the main pump 14 via the high-pressure hydraulic line 16, to the one or more hydraulic actuators in accordance with the change in pilot pressure that corresponds to an operation direction and an operation amount of the operating unit 26. The hydraulic actuator includes, for example, the boom cylinder 7, the arm cylinder 8, the bucket cylinder 9, a left-side traveling hydraulic motor 1A, a right-side traveling hydraulic motor 1B, and a turning hydraulic motor 2A.

An operating unit 26 is used by an operator of the shovel 100 to operate the hydraulic actuators. The operating unit 26 generates pilot pressure upon receiving supply of hydraulic oil from the pilot pump via the pilot line 25. The operating unit 26 applies the pilot pressure to each pilot port of the corresponding flow rate control valve via a pilot line 25a. The pilot pressure changes in accordance with an operation direction and an operation amount of the operating unit 26. The pilot pressure sensor 15a detects pilot pressure and outputs a detection value to the controller 30.

The controller 30 is a control unit that controls the shovel 100. In the present embodiment, the controller 30 is configured with a computer including a CPU, random access memory (RAM), and read-only memory (ROM). The CPU of the controller 30 reads programs corresponding to various types of functions from the ROM and loads the programs into the RAM, so as to execute the functions corresponding to the respective programs.

The engine control unit 74 is a device that controls the engine 11. The engine control unit 74 controls the amount of fuel injection so as to achieve an engine rotation speed set via an input device.

The transmitter S1, the receiver S2, the positioning device S3, the orientation detecting device S4, and the direction detecting device S5 are each connected to the controller 30. The controller performs computation based on information output from each of the receiver S2, the positioning device S3, the orientation detecting device S4, and the direction detecting device S5, and causes the transmitter S1 to transmit information generated based on a computation result to the outside.

The aerial vehicle 200 is configured with a controller 201, a transmitter 202, a receiver 203, an autonomous flight device 204, and a camera 205, for example.

The controller 201 is a control unit that controls the aerial vehicle 200. In the present embodiment, the controller 201 is configured with a computer including RAM and ROM. A CPU of the controller 201 reads programs corresponding to various types of functions from the ROM and loads the programs into the RAM so as to execute the functions corresponding to the respective programs.

The transmitter 202 transmits information to the outside of the aerial vehicle 200. For example, the transmitter 202 repeatedly transmits, at predetermined intervals, information that can be received by the shovel 100 or the remote control 300. In the present embodiment, the transmitter 202 repeatedly transmits, at predetermined intervals, information that can be received by the shovel 100 and the aerial vehicle 200. The information that can be received by the shovel 100 and the aerial vehicle 200 is, for example, an image captured by the camera 205.

The receiver 203 receives information transmitted from the outside of the aerial vehicle 200. For example, the receiver 203 receives information transmitted from each of the shovel 100 and the remote control 300.

The autonomous flight device 204 is a device that achieves autonomous flight of the aerial vehicle 200. In the present embodiment, the autonomous flight device 204 includes a flight control unit, an electric motor, and a battery. Further, the aerial vehicle 200 may be equipped with a GNSS receiver such that the aerial vehicle 200 can determine a position of the aerial vehicle 200 on its own. Further, the aerial vehicle 200 may be equipped with a plurality of GNSS receivers such that the aerial vehicle 200 can determine a position and a direction of the aerial vehicle 200 on its own. Further, instead of the battery, when an external power source on the ground is used via a wired connection, the aerial vehicle 200 may also include a converter for voltage conversion. The aerial vehicle 200 may also include solar panels. The flight control unit includes various types of sensors such as a gyro-sensor, an acceleration sensor, a geomagnetic field sensor (orientation sensor), an atmospheric pressure sensor, a positioning sensor, and an ultrasonic sensor. The flight control unit implements an orientation maintaining function, an altitude maintaining function, and the like. The electric motor rotates propellers upon receiving power supplied from the battery. For example, upon receiving information related to a target flight position from the controller 201, the autonomous flight device 204 moves the aerial vehicle 200 to a target flight position by separately controlling rotational speeds of the four propellers while maintaining the orientation and the altitude of the aerial vehicle 200. The information related to the target flight position includes, for example, the latitude, the longitude, and the altitude of the target flight position. For example, the controller 201 obtains information related to the target flight position from the outside through the receiver 203. The autonomous flight device 204 may change the direction of the aerial vehicle 200 upon receiving information related to a target direction from the controller 201.

The camera 205 is an object detection device that obtains an image as object detection information. In the present embodiment, the camera 205 is attached to the aerial vehicle 200 such that an image vertically below the aerial vehicle 200 is captured. The image captured by the camera 205 includes information related to an imaging position that is a flight position of the aerial vehicle 200, and is used to generate three-dimensional topographic data. Further, as an object detection device, a laser range finder, an ultrasonic sensor, a millimeter-wave sensor, and the like may be used.

The remote control 300 is configured with a controller 301, a transmitter 302, a receiver 303, a display device 304, an operation input device 305, and the like.

The controller 301 is a control unit that controls the shovel 100. In the present embodiment, the controller 30 is configured with a computer including RAM and ROM. A CPU of the controller 301 reads programs corresponding to various types of functions from the ROM and loads the programs into the RAM so as to execute the functions corresponding to the respective programs.

The transmitter 302 transmits information to the outside of the remote control 300. For example, the transmitter 302 repeatedly transmits, at predetermined intervals, information that can be received by the aerial vehicle 200. The transmitter 302 may transmit information that can be received by the shovel 100. In the present embodiment, the transmitter 302 repeatedly transmits, at predetermined intervals, information that can be received by the aerial vehicle 200. The information that can be received by the aerial vehicle 200 includes, for example, information related to a target flight position of the aerial vehicle 200.

The receiver 303 receives information transmitted from the outside of the remote control 300. The receiver 303 receives information transmitted from the shovel 100 or the aerial vehicle 200. In the present embodiment, the receiver 303 receives information transmitted from the aerial vehicle 200. The information transmitted from the aerial vehicle 200 includes, for example, an image captured by the camera 205 of the aerial vehicle 200.

The display device 304 is a device that displays various types of information. In the present embodiment, the display device 304 is a liquid crystal display, and displays information related to operations of the aerial vehicle 200. The display device 304 may display an image captured by the camera 205 of the aerial vehicle 200.

The operation input device 305 is a device that receives an operation input performed by a pilot of the aerial vehicle 200. In the present embodiment, the operation input device 305 is a touch panel placed on the liquid crystal display.

Figure 3:
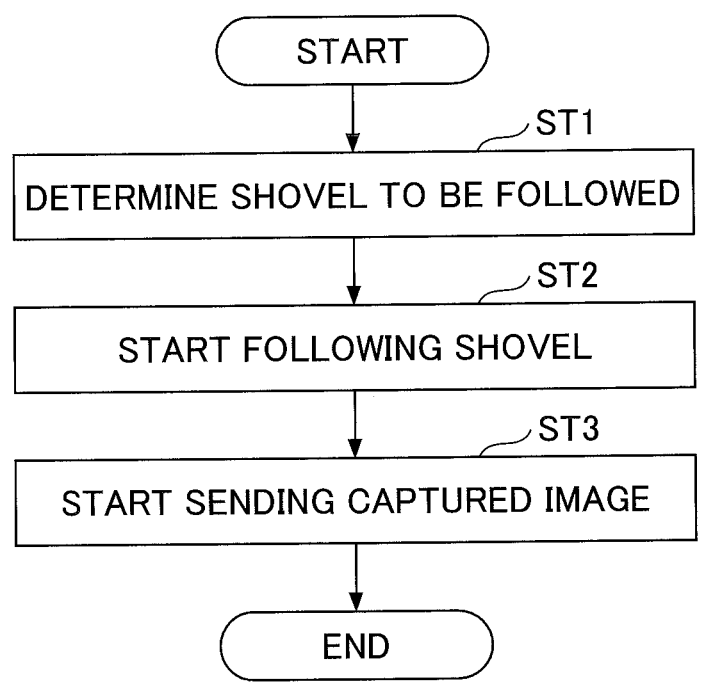
FIG. 3 is a flowchart of a process for starting following of a shovel.

Next, referring to FIG. 3, a function of the work support system will be described. FIG. 3 is a flowchart of a process in which the work support system starts a following-shovel function (hereinafter referred to as a "process for starting following a shovel"). The following-shovel function is a function that allows the aerial vehicle 200 to capture an image around the shovel 100 and send the image to the shovel 100 while automatically following the shovel 100.

First, a pilot of the aerial vehicle 200 determines a shovel to be followed (step ST1). For example, the pilot uses the operation input device 305 of the remote control 300 to determine a shovel to be followed by the aerial vehicle 200.

When a shovel to be followed is determined, a process for causing the aerial vehicle 200 to follow the shovel (hereinafter referred to as a "following process") is started (step ST2). The aerial vehicle 200 starts sending a captured image (step ST3). For example, the aerial vehicle 200 repeatedly transmits, at predetermined intervals, information including an image captured by the camera 205.

Referring now to FIGS. 4A and 4B, a method for the pilot to determine a shovel to be followed by using the remote control 300 will be explained. FIGS. 4A and 4B are front views of examples of the remote control 300. In the examples of FIGS. 4A and 4B, the remote control 300 is a smartphone that includes a liquid crystal display serving as the display device 304 and also includes a touch panel serving as the operation input device 305.

FIG. 4A illustrates a case in which three shovels exist in a receivable range of the aerial vehicle 200. The aerial vehicle 200 receives a shovel ID number via wireless communication so as to authenticate the shovel. Selection buttons G1 through G3 are software buttons corresponding to respective authenticated shovels. The remote control 300 displays selection buttons corresponding to the number of authenticated shovels. The shovel ID numbers are placed on the selection buttons. An operation button G5 is a software button for causing the aerial vehicle 200 to go up, go down, rotate to the left, and rotate to the right. By touching an upper portion (a portion displaying "up") of the operation button G5, the pilot can transmit a going-up instruction from the remote control 300 to the aerial vehicle 200 so as to cause the aerial vehicle 200 to go up. Going down, rotating to the left, and rotating to the right operations are also similarly performed. An operation button G6 is a software button for causing the aerial vehicle 200 to go forward, go backward, turn left, and turn right. By touching an upper portion (a portion displaying "forward") of the operation button G6, the pilot can transmit a going-forward instruction from the remote control 300 to the aerial vehicle 200 so as to cause the aerial vehicle 200 to go forward. Going backward, turning left, and turning right operations are also similarly performed.

By performing touch operations of the operation buttons G5 and G6, the pilot can cause the aerial vehicle 200 to fly above the work site. When the aerial vehicle 200 authenticates shovels, the remote control 300 displays the selection buttons G1 through G3 corresponding to the respective authenticated shovels based on information received from the aerial vehicle 200. The pilot determines a target shovel to be followed by touching one of the selection buttons G1 through G3. For example, by using the information received from the aerial vehicle 200, the aerial vehicle 200 approaches the target shovel to be followed. The aerial vehicle 200 flies and follows the target shovel while maintaining a relative positional relationship with the target shovel.

FIG. 4B illustrates a case in which four shovels exist in an imaging range of the camera 205 of the aerial vehicle 200. For example, the aerial vehicle 200 identifies shovels existing in the imaging range of the camera 205 by applying image processing to an image captured by the camera 205. A camera image G10 is an image captured by the camera 205, and includes shovel images G11 through G14 corresponding to the respective four shovels existing in the imaging range of the camera 205. The remote control 300 displays the camera image G10 in real time by using information received from the aerial vehicle 200.

The pilot determines a target shovel to be followed by touching one of the shovel images G11 through G14. The aerial vehicle 200 flies and follows the target shovel in such a manner that the target shovel has a predetermined size at a predetermined position in a captured image. Namely, the aerial vehicle 200 flies and follows the target shovel while maintaining a predetermined relative positional relationship between the target shovel and the aerial vehicle 200.

Figure 5A:
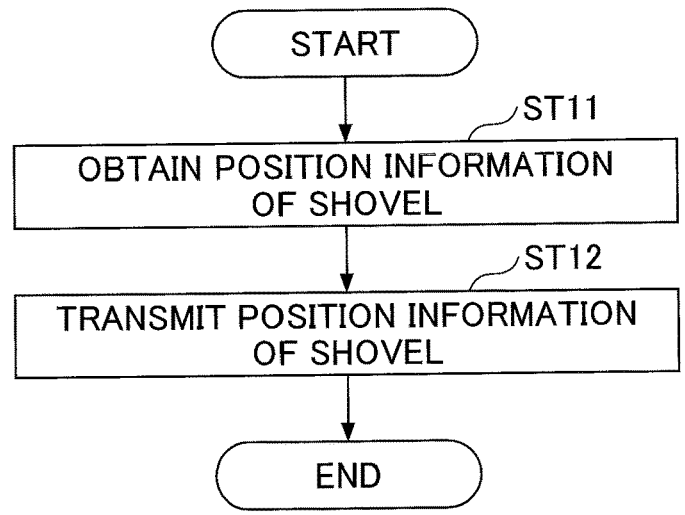
FIG. 5A is a flowchart illustrating an example flow of a following-shovel process.
Figure 5B:
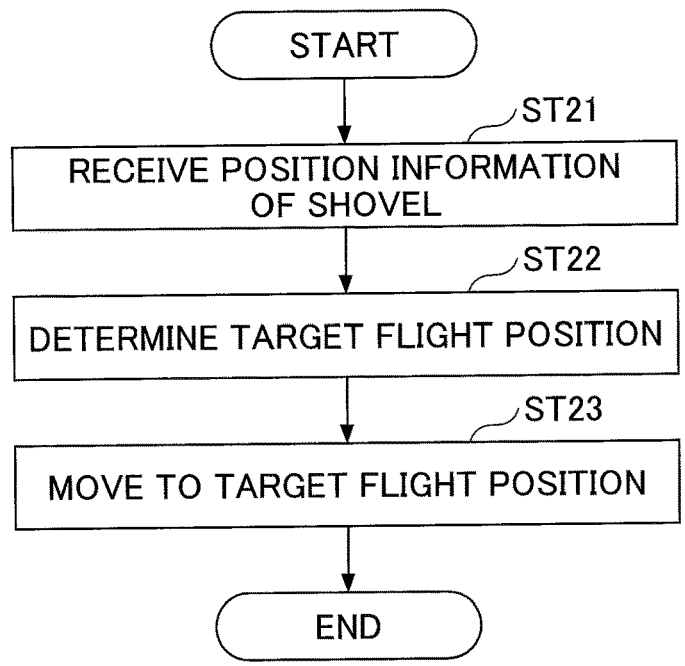
FIG. 5B is a flowchart illustrating an example flow of the following-shovel process.

Next, referring to FIGS. 5A and 5B, an example of the following-shovel process will be described. FIG. 5A is a flowchart illustrating a process flow performed by the shovel 100. FIG. 5B is a flowchart illustrating a process flow performed by the aerial vehicle 200.

First, the controller 30 of the shovel 100 obtains position information of the shovel 100 (step ST11). For example, the controller 30 obtains latitude, longitude, and altitude of the shovel 100 based on an output from the positioning device S3. Further, the controller 30 may additionally obtain orientation information of the excavation attachment, direction information of the shovel 100, and operation information of the shovel 100. For example, the controller 30 may obtain a boom angle, an arm angle, a bucket angle, and a body inclination angle based on an output from the orientation detecting device S4. Further, the controller 30 may obtain an absolute azimuth of the shovel 100 based on an output from the direction detecting device S5. Further, the controller 30 may obtain operation details of the shovel 100 based on an output from the pilot pressure sensor 15a.

Next, the controller 30 transmits the position information to the outside (step ST12). For example, the controller 30 transmits the position information to the aerial vehicle 200 via the transmitter S1. Further, the controller 30 may transmit, to the aerial vehicle 200, the direction information of the shovel 100, the operation information of the shovel 100, and the orientation information of the excavation attachment.

By repeatedly performing step ST11 and step ST12 at predetermined control intervals, the controller 30 can continuously provide position information of the shovel 100 to the aerial vehicle 200.

The controller 201 of the aerial vehicle 200 receives the position information of the shovel 100 (step ST21). For example, the controller 201 receives, via the receiver 203, the position information transmitted from the controller 30 of the shovel 100. The controller 201 may additionally receive the direction information of the shovel 100, the operation information of the shovel 100, and the orientation information of the excavation attachment. Subsequently, the controller 201 determines a target flight position (step ST22). For example, the controller 201 determines a target flight position of the aerial vehicle 200 based on the position information of the shovel 100. For example, the target flight position is a position that is higher with respect to a predetermined point on the shovel 100 by a predetermined height and is away with respect to the predetermined point by a predetermined distance. For example, the predetermined point is a point on the turning axis of the shovel 100. In this case, position coordinates of the predetermined point is calculated based on the current position of the shovel 100, namely based on the current position of the positioning device S3.

The controller 201 may calculate a single target flight position or may calculate a plurality of target flight positions based on the position coordinates of the predetermined point. For example, the controller 201 may calculate all positions as target flight positions that satisfy a condition. The condition is that a position is higher with respect to the predetermined point on the shovel 100 by the predetermined height and is away from the turning axis by the predetermined distance. In a case where the orientation information of the excavation attachment is obtained, the controller 201 may set the current rotation radius of the excavation attachment as the above-described predetermined distance. Further, in a case where the direction information of the shovel 100 is obtained, the controller 201 may determine, among the positions satisfying the above-described condition, a position located in front of the shovel 100 when viewed from the top as a target flight position. Further, in a case where the operation information of the shovel 100 is obtained, target flight positions may be switched according to the operation of the shovel 100. For example, target flight positions may be switched between when the shovel 100 is traveling and when the shovel 100 is excavating.

In a case where the plurality of target flight positions are calculated, the controller 201 may determine, among the plurality of target flight positions, a target flight position by taking into account the current position of the aerial vehicle 200 output from the autonomous flight device 204. For example, the controller 201 may determine, among the plurality of target flight positions, a target flight position located nearest to the current position of the aerial vehicle 200 as a final target flight position.

Subsequently, the controller 201 moves the aerial vehicle 200 to the target flight position (step ST23). For example, the controller 201 outputs information related to the target flight position to the autonomous flight device 204. The autonomous flight device 204 uses GNSS (GPS) navigation, inertial navigation, or hybrid navigation combining GPS navigation with inertial navigation to move the aerial vehicle 200 to the target flight position. When GPS navigation is used, the autonomous flight device 204 may obtain an absolute position (latitude, longitude, and altitude) as information related to the target flight position. When inertial navigation is used, the autonomous flight device 204 may obtain, as information related to the target flight position, information related to a change in position of the shovel 100 between position information received at a previous time and position information received at a current time. In this case, the receiver 203 of the aerial vehicle 200 may continuously receive position information from the shovel 100.

By repeatedly performing step ST22 and step ST23 each time the controller 201 receives position information of the shovel 100, the controller 201 can cause the aerial vehicle 200 to continuously follow the shovel 100.

Further, when the aerial vehicle 200 is equipped with a plurality of GNSS receivers, the controller 201 can identify a position and a direction (a rotation angle with respect to a reference orientation) of the aerial vehicle 200. In this case, by obtaining position information and direction information of the shovel 100, the controller 201 can compare a position and a direction of the shovel 100 with those of the aerial vehicle 200. By changing the position and the direction of the aerial vehicle 200 in accordance with changes in the position and the direction of the shovel 100, the controller 201 can cause the aerial vehicle 200 to follow the shovel 100.

Next, referring to FIGS. 6A1 through 6B2, specific examples of target flight positions of the aerial vehicle 200 will be described. FIGS. 6A1 and 6A2 illustrate a state in which a position away from a turning axis L1 is set as a target flight position. FIGS. 6B1 and 6B2 illustrate a state in which a position on the turning axis L1 is set as a target flight position. FIGS. 6A1 and 6B1 are side views of the shovel 100 and the aerial vehicle 200. FIGS. 6A2 and 6B2 are top views of the shovel 100 and the aerial vehicle 200.

In the examples of FIGS. 6A1 and 6A2, the target flight position is set at a position that is on a front-back axis L2 of the upper turning body 3, is higher with respect to a predetermined point P1 by a height H, and is backwardly away from the turning axis L1 by a distance T. The predetermined point P1 is a point of intersection between a ground contact plane and the turning axis L1 of the shovel 100 (lower traveling body 1). In this case, the front-back axis L2 of the upper turning body 3 rotates as the shovel 100 turns. Therefore, the target flight position moves as the shovel 100 turns. When the front-back axis L2 rotates around the turning axis L1 and the target flight position is changed accordingly, the aerial vehicle 200 moves to a new target flight position that is on the front-back axis L2 and is backwardly away from the turning axis L1 by the distance T while maintaining the height H.

A target flight position may be set at a position that is on the front-back axis L2 of the upper turning body 3, is higher with respect to the predetermined point P1 of the shovel 100 by a predetermined height, and is forwardly away from the turning axis L1 by a predetermined distance. For example, the predetermined distance is a distance from a position directly above an arm end position. Such a target flight position is suitable when the shovel 100 performs excavation work or rolling compaction work.

In the examples of FIGS. 6B1 and 6B2, a target flight position is set at a position that is on the turning axis L1 and is higher from the predetermined point 21 by the height H. In this case, the target flight position does not move even when the shovel 100 turns. This is because the position of the turning axis L1 of the shovel 100 does not change. Therefore, the aerial vehicle 200 continues to fly while staying on the turning axis L1. Such a target flight position is suitable when the shovel 100 is traveling.

Figure 7A:
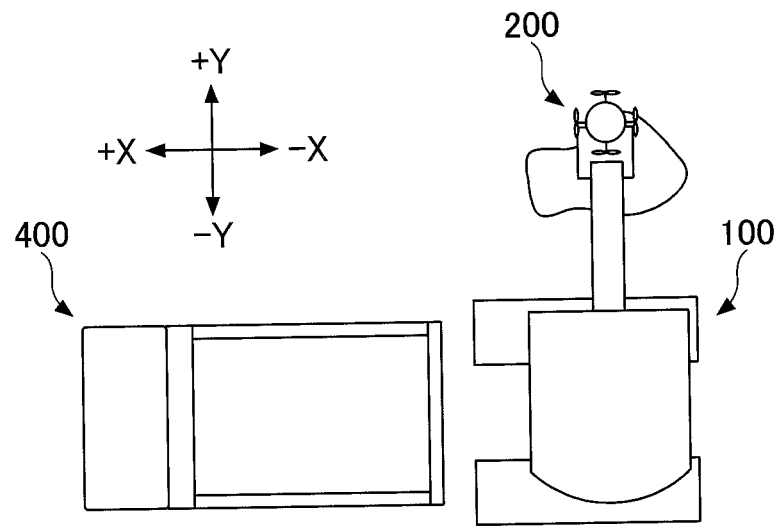
FIG. 7A is a drawing illustrating another example of a target flight position of the aerial vehicle.
Figure 7B:
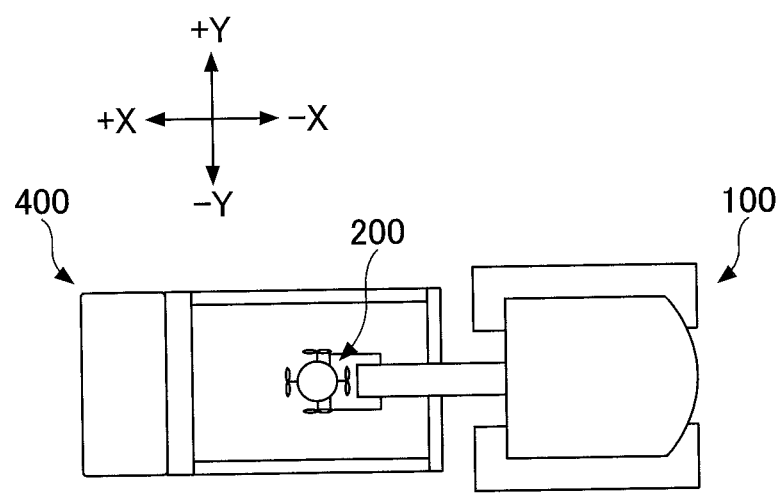
FIG. 7B is a drawing illustrating another example of a target flight position of the aerial vehicle.

Next, referring to FIGS. 7A and 7B, specific examples of a target flight position of the aerial vehicle 200 will be described. FIGS. 7A and 7B are top views illustrating the shovel 100 performing excavation work and loading work, the aerial vehicle 200 flying and following the shovel 100, and a dump truck 400 receiving sediment discharged from the shovel 100. FIG. 7A illustrates a state in which the shovel 100 is performing the excavation work with the excavation attachment being turned in a +Y direction. FIG. 7B illustrates a state in which the excavation attachment is turned in a +X direction by being turned left after the excavation work.

In the examples of FIGS. 7A and 7B, the target flight position is set at a position directly above the arm end position. In this case, the arm end position changes as the orientation of the excavation attachment changes or as the shovel 100 turns. Therefore, the target flight position moves as the orientation of the excavation attachment changes or as the shovel 100 turns. When the orientation of the excavation attachment or the direction of the shovel 100 changes, and the target flight position is changed accordingly, the aerial vehicle 200 moves to a new target flight position that corresponds to a new arm end position while maintaining the height H.

In the above-described configurations, the shovel 100 allows an image captured by the camera 205, which is mounted on the aerial vehicle 200 and is capable of capturing an image of a space that is unable to be captured by a camera mounted on the upper turning body 3, to be displayed on the display device 40 in the cabin 10 and presented to the operator of the shovel 100.

Further, the shovel 100 can cause the aerial vehicle 200 to follow the shovel 100 by transmitting, from the transmitter S1, information related to a target flight position of the aerial vehicle 200. For example, the shovel 100 can cause the aerial vehicle 200 to fly and follow the shovel 100 in such a manner that a horizontal distance between the aerial vehicle 200 and a predetermined position of the excavation attachment such as a boom end position and an arm end position can maintain a predetermined distance.

Further, the shovel 100 can cause the aerial vehicle 200 to follow the shovel 100 without receiving information transmitted from the aerial vehicle 200. Based on position information of the shovel 100, the aerial vehicle 200 can determine a target flight position. Therefore, the shovel 100 is only required to transmit position information of the shovel 100.

Further, the aerial vehicle 200 can follow the shovel 100 while maintaining a predetermined relative positional relationship between the shovel 100 and the aerial vehicle 200. Therefore, by using various types of sensors including the camera 205, the aerial vehicle 200 can detect topographical changes made by the shovel 100 performing work. As a result, a situation of construction by the shovel 100 can be accurately identified based on data obtained by the aerial vehicle 200.

Figure 8A:
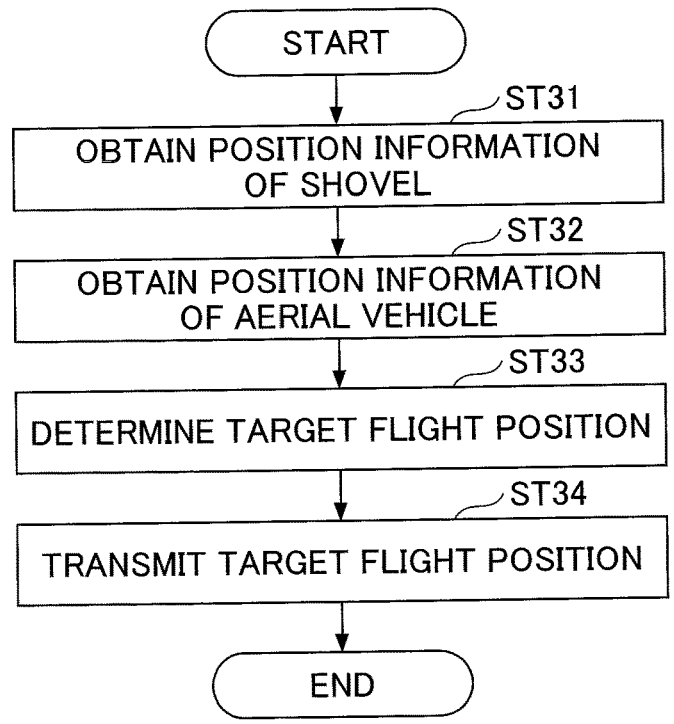
FIG. 8A is a flowchart illustrating another example flow of the following-shovel process.
Figure 8B:
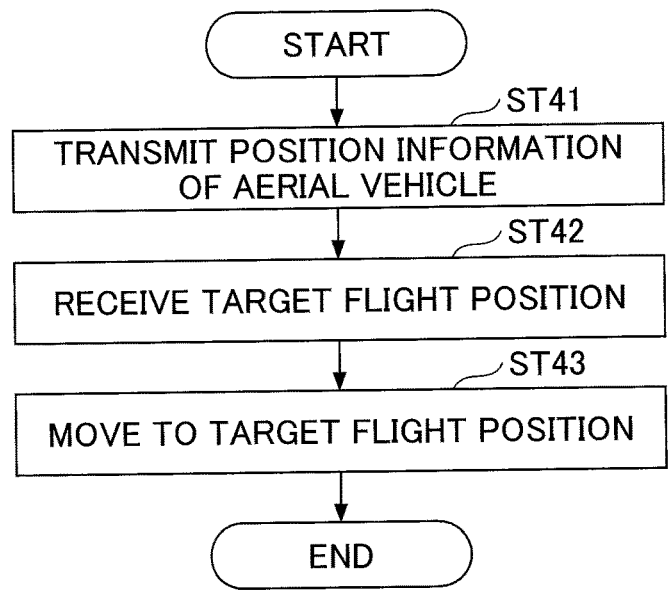
FIG. 8B is a flowchart illustrating another example flow of the following-shovel process.

Next, referring to FIGS. 8A and 8B, another example of the following-shovel process will be described. FIG. 8A is a flowchart illustrating a process flow performed by the shovel 100. FIG. 8B is a flowchart illustrating a process flow performed by the aerial vehicle 200. The example of FIGS. 8A and 8B differs from the example of FIGS. 5A and 5B in that the controller 30 of the shovel 100 calculates and transmits a target flight position. In the example of FIGS. 5A and 5B, the controller 30 transmits position information of the shovel 100, and the controller 201 of the shovel 100 calculates a target flight position based on the position information of the shovel 100.

First, the controller 30 obtains position information of the shovel 100 (step ST31). For example, the controller 30 obtains latitude, longitude, and altitude of the shovel 100 based on an output from the positioning device S3. Further, the controller 30 may additionally obtain orientation information of the excavation attachment, direction information of the shovel 100, and the like.

Next, the controller 30 obtains position information of the aerial vehicle 200 (step ST32). For example, the controller 30 receives, via the receiver S2, position information of the aerial vehicle 200.

Next, the controller 30 determines a target flight position of the aerial vehicle 200 (step ST33). For example, the controller 30 determines a target flight position of the aerial vehicle 200 based on the position information of the shovel 100 and the position information of the aerial vehicle 200. To be more specific, the controller 30 calculates all positions as target flight positions that satisfy a condition. The condition is that a position is higher with respect to the predetermined point on the shovel 100 by the predetermined height and is away from the turning axis by the predetermined distance. The controller 30 determines, among the target flight positions satisfying the above-described condition, a target flight position located nearest to the current position of the aerial vehicle 200 as a final target flight position. In a case where the direction information of the shovel 100 is obtained, the controller 30 may determine, among the positions satisfying the above-described condition, a position located in front of the shovel 100 when viewed from the top as a target flight position. In this case, step ST32 for obtaining position information of the aerial vehicle 200 may be omitted.

Next, the controller 30 transmits the target flight position to the outside (step ST34). For example, the controller 30 transmits, via the transmitter S1, the target flight position to the aerial vehicle 200.

By repeatedly performing steps ST31 through step ST34 at predetermined control intervals, the controller 30 can continuously send a target flight position to the aerial vehicle 200.

The controller 201 of the aerial vehicle 200 repeatedly transmits position information of the aerial vehicle 200 at a predetermined control interval (step ST41). For example, the controller 201 transmits position information of the aerial vehicle 200 to the shovel 100.

The controller 201 receives the target flight position (step ST42). For example the controller 201 receives, via the receiver 203, the target flight position transmitted from the controller 30 of the shovel 100.

Next, the controller 201 moves the aerial vehicle 200 to the target flight position (step ST43). For example, the controller 201 outputs information related to the target flight position to the autonomous flight device 204. The autonomous flight device 204 uses radio navigation, GNSS (GPS) navigation, inertial navigation, or hybrid navigation combining GPS navigation with inertial navigation to move the aerial vehicle 200 to the target flight position.

By repeatedly performing step ST43 each time the controller 201 receives a target flight position, the controller 201 can cause the aerial vehicle 200 to continuously follow the shovel 100.

In the above-described configuration, the shovel 100 allows an image captured by the camera 205 mounted on the aerial vehicle 200 to be displayed on the display device 40 in the cabin 10 and presented to the operator of the shovel 100.

Further, the shovel 100 can cause the aerial vehicle 200 to follow the shovel 100 by transmitting, via the transmitter S1, information related to a target flight position of the aerial vehicle 200.

Further, the shovel 100 can cause the aerial vehicle 200 to follow the shovel 100 without the aerial vehicle 200 calculating a target flight position of the aerial vehicle 200. Based on information related to a target flight position generated by the shovel 100, the aerial vehicle 200 can follow the shovel.

Figure 9:
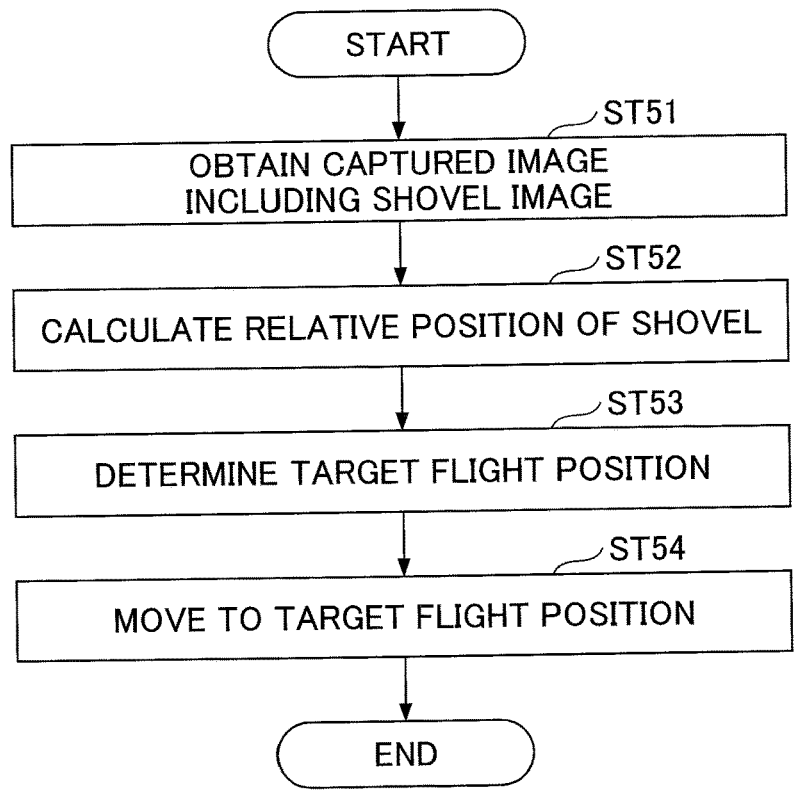
FIG. 9 is a flowchart illustrating yet another example flow of the following-shovel process.

Next, referring to FIG. 9, yet another example of the following-shovel process will be described. FIG. 9 is a flowchart illustrating a process flow performed by the aerial vehicle 200. The example of FIG. 9 differ from the examples of FIGS. 5A and 5B is that the controller 201 of the aerial vehicle 200 determines a target flight position without receiving information from the shovel 100.

First, the controller 201 of the aerial vehicle 200 obtains a captured image including a shovel image (step ST51). For example, the controller 201 obtains an image captured by the camera 205 of the aerial vehicle 200 flying above the shovel 100. The captured image includes a shovel image that is an image of the shovel 100.

Next, the controller 201 calculates a relative position of the shovel 100 (step ST52). For example, the controller 201 identifies the shovel image included in the captured image by applying image processing such as pattern matching to the captured image. Based on a positional relationship between the position of the identified shovel image and the center of the captured image, the controller 201 can calculate a relative position of the shovel 100 with respect to the position of the aerial vehicle 200 in real space. The position and the direction of the shovel image with respect to the center of the captured image correspond to the position and the direction of the shovel 100 with respect to the position of the aerial vehicle 200. The relative position of the shovel 100 includes a vertical distance and a horizontal distance between the shovel 100 and the aerial vehicle 200. The vertical distance is calculated based on the size of the shovel image in the captured image. The horizontal distance is calculated based on the position of the shovel image in the captured image.

The controller 201 may calculate a relative direction of the shovel 100 with respect to a direction of the aerial vehicle 200 based on the identified shovel image. The relative direction of the shovel 100 with respect to the direction of the aerial vehicle 200 is calculated based on an angle between an extending direction of an excavation attachment image included in the captured image and a vertical axis of the captured image. The vertical axis of the captured image corresponds to the direction of the aerial vehicle 200.

Next, the controller 201 determines a target flight position (step ST53). For example, the controller 201 determines a target flight position based on the relative position of the shovel 100 calculated in step ST52. To be more specific, the controller 201 obtains motions (required movements) of the aerial vehicle 200 required to display the shovel image in a predetermined size at a predetermined position in the captured image. For example, when the shovel image can be displayed in the predetermined size at the predetermined position in the captured image by moving the aerial vehicle 200 up by 1 meter and moving the aerial vehicle 200 to the north by 2 meters, the required movements are "moving up by 1 meter" and "moving to the north by 2 meters". This means that a target flight position is set at a position that is 1 meter higher than and 2 meters away from the current position of the aerial vehicle 200. Namely, by obtaining required movements of the aerial vehicle 200, a target flight position can be determined.

For example, the predetermined position in the captured image is a single area or a plurality of areas apart from the center of the captured image by the predetermined number of pixels. When the shovel image is positioned in the center of the captured image, this means that the shovel 100 exists directly below the aerial vehicle 200.

In addition to the relative position of the shovel 100, when the relative direction is calculated, the controller 201 can identify an area apart from the center of the captured image by the predetermined number of pixels in a predetermined direction as a predetermined position in the captured image.

Next, the controller 201 moves the aerial vehicle 200 to the target flight position (step ST54). For example, the controller 201 outputs information related to the target flight position to the autonomous flight device 204. The autonomous flight device 204 uses GNSS (GPS) navigation, inertial navigation, or hybrid navigation combining GPS navigation with inertial navigation to move the aerial vehicle 200 to the target flight position.

By repeatedly performing steps ST52 through ST54 each time the controller 201 receives a captured image, the controller 201 can cause the aerial vehicle 200 to continuously follow the shovel 100.

In the above-described configuration, the shovel 100 allows an image captured by the camera 205 mounted on the aerial vehicle 200 to be displayed on the display device 40 in the cabin 10 and presented to the operator of the shovel 100.

Because the aerial vehicle 200 can obtain a position of the shovel 100 based on an image captured by the camera 205, the aerial vehicle 200 can follow the shovel 100 without receiving information generated by the shovel 100.

Further, in the example of FIG. 9, the camera 205 is used as an object detection device, but a laser range finder, an ultrasonic sensor, a millimeter-wave sensor, and the like may be used as an object detection device. In this case, instead of a camera image, information such as laser-based information, ultrasonic-based information, or millimeter-wave-based information is employed as object detection information.

Figure 10A:
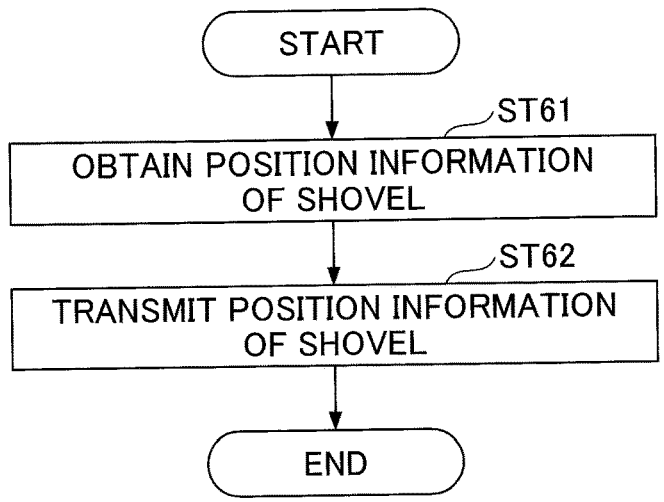
FIG. 10A is a flowchart illustrating an example flow of a contact avoiding process.
Figure 10B:
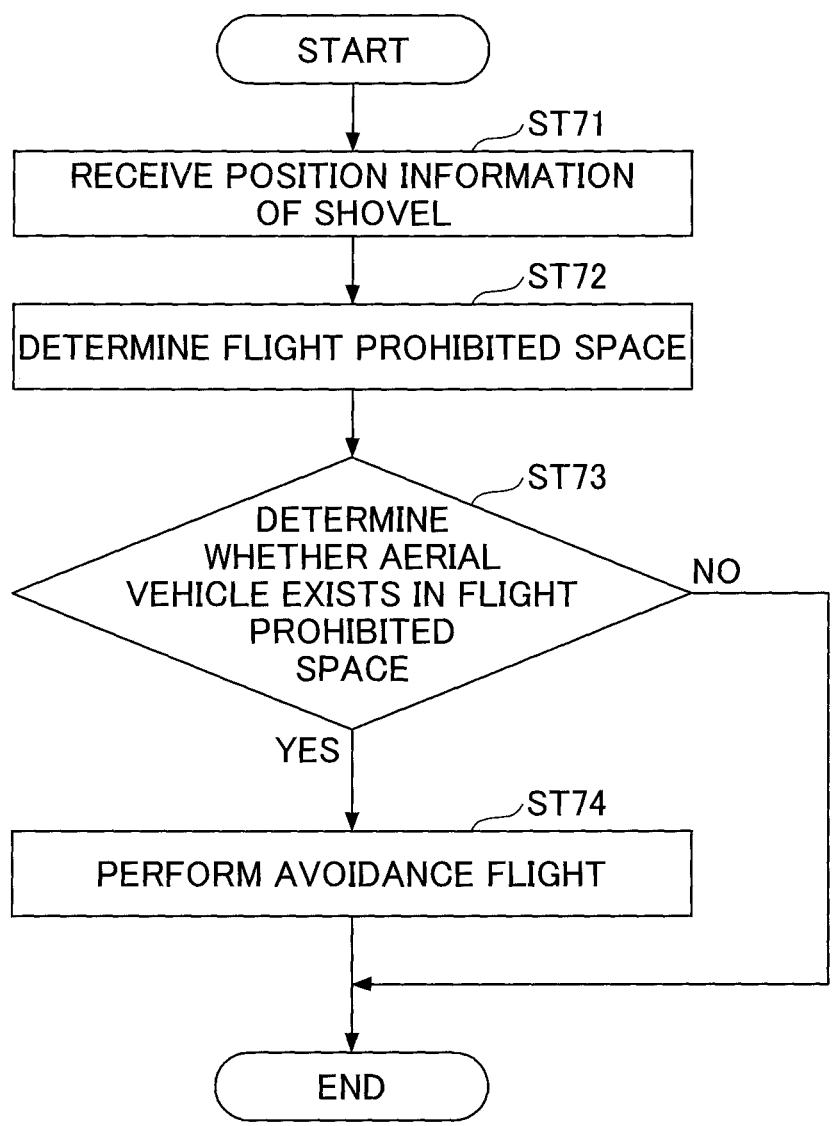
FIG. 10B is a flowchart illustrating an example flow of the contact avoiding process.

Next, referring to FIGS. 10A and 10B, another function of the work support system will be described. FIGS. 10A and 10B are flowcharts illustrating example flows of a process in which the work support system avoids contact between the shovel 100 and the aerial vehicle 200 (hereinafter referred to as a "contact avoiding process"). FIG. 10A is a flowchart illustrating a process flow performed by the shovel 100. FIG. 10B is a flowchart illustrating a process flow performed by the aerial vehicle 200. In the example of FIGS. 10A and 10B, the aerial vehicle 200 is remotely operated by the pilot via the remote control 300. However, the description below also applies to a case in which the aerial vehicle 200 autonomously flies without being remotely operated by the pilot.

First, the controller 30 of the shovel 100 obtains position information of the shovel 100 (step ST61). For example, the controller 30 obtains latitude, longitude, and altitude of the shovel 100 based on an output from the positioning device S3. Further, the controller 30 may additionally obtain orientation information of the excavation attachment, direction information of the shovel 100, and operation information of the shovel 100. For example, the controller 30 may obtain a boom angle, an arm angle, a bucket angle, and a body inclination angle based on an output from the orientation detecting device S4. Further, the controller 30 may obtain an absolute azimuth of the shovel 100 based on an output from the direction detecting device S5. Further, the controller 30 may obtain operation details of the shovel 100 based on an output from the pilot pressure sensor 15a.

Next, the controller 30 transmits the position information to the outside (step ST62). For example, the controller 30 transmits the position information to the aerial vehicle 200 via the transmitter S1, Further, the controller 30 may transmit the direction information of the shovel 100, the operation information of the shovel 100, and the orientation information of the excavation attachment to the aerial vehicle 200.

By repeatedly performing steps ST61 and ST62 at predetermined control intervals, the controller 30 can continuously transmit position information of the shovel 100 to the aerial vehicle 200.

The controller 201 of the aerial vehicle 200 receives the position information of the shovel 100 (step ST71). For example, the controller 201 receives the position information of the shovel 100 transmitted from the controller 30 of the shovel 100 via the shovel 100. The controller 201 may additionally receive the direction information of the shovel 100, the operation information of the shovel 100, and the orientation information of the excavation attachment.

Next, the controller 201 determines a flight prohibited space (step ST72). For example, the controller 201 determines a flight prohibited space based on the position information of the shovel 100. The flight prohibited space is a space within a range of a predetermined distance from a predetermined point on the shovel 100. For example, the predetermined point is a point on the turning axis of the shovel 100. Position coordinates of the predetermined point are calculated based on the current position of the shovel 100, namely based on the current position of the positioning device S3. In this case, the flight prohibited space may be a reachable range of the excavation attachment, for example.

In a case where the orientation information of the excavation attachment is obtained, the controller 201 may determine the above-described predetermined distance based on the current rotation radius of the excavation attachment. In this case, the flight prohibited space may be a reachable range of the excavation attachment when the excavation attachment is turned while maintaining the current orientation.

Further, in a case where the direction information of the shovel 100 is obtained, the controller 201 may determine a shape of the flight prohibited space based on the direction of the shovel 100. For example, the flight prohibited space having a fan shape when viewed from the top may be set, with the turning axis of the shovel 100 being the center. In this case, the fan-shaped flight prohibited space may be divided into two spaces by a plane including the central axis of the excavation attachment.

Further, in a case where the operation information of the shovel 100 is obtained, the controller 201 may change the shape of the flight prohibited space according to the operation of the shovel 100. For example, when a turn-left operation is performed, the flight prohibited space having a fan shape when viewed from the top may be set in such a manner that a plane including the central axis of the excavation attachment becomes the right side surface. Further, the flight prohibited space may be set in such a manner that the angular range of the fan shape becomes larger as an operation amount (angle) of a turning operation lever increases.

Next, the controller 201 determines whether the aerial vehicle 200 exists in the flight prohibited space (step ST73). For example, the controller 201 calculates the current position of the aerial vehicle 200 based on an output from the autonomous flight device 204, and calculates a distance between the predetermined point on the shovel 100 and the current position of the aerial vehicle 200. When the distance is less than or equal to the predetermined distance, the controller 201 determines that the aerial vehicle 200 exists in the flight prohibited space. In a case where the flight prohibited space is determined by taking into account the direction information, the operation information, and the orientation information of the shovel 100, the controller 201 may additionally calculate a presence direction of the aerial vehicle 200 relative to the predetermined point on the shovel 100 based on an output from the autonomous flight device 204.

When the controller 201 determines that the aerial vehicle 200 exists in the flight prohibited space (yes in step ST73), the controller 201 performs avoidance flight (step ST74). For example, the controller 201 moves the aerial vehicle 200 to a target avoidance position. To be more specific, the controller 201 outputs information related to the target avoidance position to the autonomous flight device 204. The autonomous flight device 204 uses GNSS (GPS) navigation, inertial navigation, or hybrid navigation combining GPS navigation with inertial navigation to move the aerial vehicle 200 to the target avoidance position.

The target avoidance position is a target flight position set outside the flight prohibited space. For example, the target avoidance position is, among positions located outside the flight prohibited space, a position nearest to the current position of the aerial vehicle 200. Further, when a plurality of flight prohibited spaces are set around a plurality of shovels, and the aerial vehicle 200 is located in an overlapped area of the flight prohibited spaces, a position nearest to the current position of the aerial vehicle 200 among all positions located outside the flight prohibited spaces is set as the target avoidance position. However, information related to the target avoidance position may only be a target flight direction and a target flight distance. For example, the target avoidance position may be an instruction for moving the aerial vehicle 200 vertically upward by a predetermined height.

In order to perform the avoidance flight, the controller 201 forcibly moves the aerial vehicle 200 to the target avoidance position, regardless of the pilot's remote operation via the remote control 300. For example, even when the pilot is making the aerial vehicle 200 hover, the controller 201 forcibly moves the aerial vehicle 200 to the target avoidance position.

The controller 201 may transmit a movement restriction command to the shovel 100. The shovel 100 that has received the movement restriction command forcibly slows or stops the movement of the hydraulic actuator. This securely prevents the shovel 100 and the aerial vehicle 200 from contacting each other.

As part of the avoidance flight, the controller 201 may control the aerial vehicle 200 so as to prevent the aerial vehicle 200 from entering the flight prohibited space. For example, even when the pilot is making the aerial vehicle 200 enter the flight prohibited space through a remote operation, the controller 201 causes the aerial vehicle 200 to hover and prevents the aerial vehicle 200 from entering the flight prohibited space.

When the avoidance flight is performed, the remote control 300 may indicate, to the pilot, that the avoidance flight is performed. For example, the remote control 300 causes the display device 304 to display a text message indicating that the avoidance flight is performed.

Similarly, when the avoidance flight is performed, specifically when the movement of the hydraulic actuator is restricted along with the avoidance flight, the controller 30 of the shovel 100 may indicate, to the operator of the shovel 100, that the avoidance flight is performed. For example, the controller 30 causes the display device 40 to display a text message indicating that the avoidance flight is performed.

By repeatedly performing steps ST72 through ST74 each time the controller 201 receives position information, the controller 201 can cause the aerial vehicle 200 to continuously fly outside the flight prohibited space.

In a case where the contact avoiding process illustrated in FIGS. 10A and 10B is employed, the receiver S2 of the shovel 100 may be omitted.

FIG. 11 is a drawing illustrating a relationship between the shovel 100 and the aerial vehicle 200 when avoidance flight is performed. FIG. 11 illustrates a state in which the operator of the shovel 100 is to perform a turning operation so as to cause the shovel 100 in a +X direction to turn in a −X direction. When the shovel 100 is turned in the −X direction, the aerial vehicle 200 is likely to contact the excavation attachment as the aerial vehicle 200 is located in a flight prohibited space.

When the controller 201 determines that the aerial vehicle 200 exists in the flight prohibited space, the controller 201 forcibly moves the aerial vehicle 200 to a target avoidance position located outside the flight prohibited space. An arrow AR1 of FIG. 11 illustrates a state in which the aerial vehicle 200 is to be forcibly moved to the target avoidance position.

When the controller 201 determines that the aerial vehicle 200 does not exist in the flight prohibited space (no in step ST73), the controller 201 ends the process without performing avoidance flight.

In the above-described configuration, it is possible to prevent the shovel 100 and the aerial vehicle 200 from contacting each other. To be more specific, the shovel 100 can cause the aerial vehicle 200 to perform avoidance flight as necessary by providing information related to a flight prohibited space set around the shovel 100. Further, the shovel 100 may restrict the movement of the hydraulic actuator when the aerial vehicle 200 exists in the flight prohibited space. Accordingly, the operator of the shovel 100 can focus on operating the shovel 100 without worry of the shovel 100 making contact with the aerial vehicle 200. The aerial vehicle 200 autonomously flies so as not to enter the flight prohibited space belonging to the shovel 100. Also, when the aerial vehicle 200 is located in the flight prohibited space, the aerial vehicle 200 autonomously flies so as to promptly move out of the flight prohibited space. Accordingly, the pilot of the aerial vehicle 200 can focus on piloting the aerial vehicle 200 without worry of the aerial vehicle 200 making contact with the shovel 100.

Figure 12A:
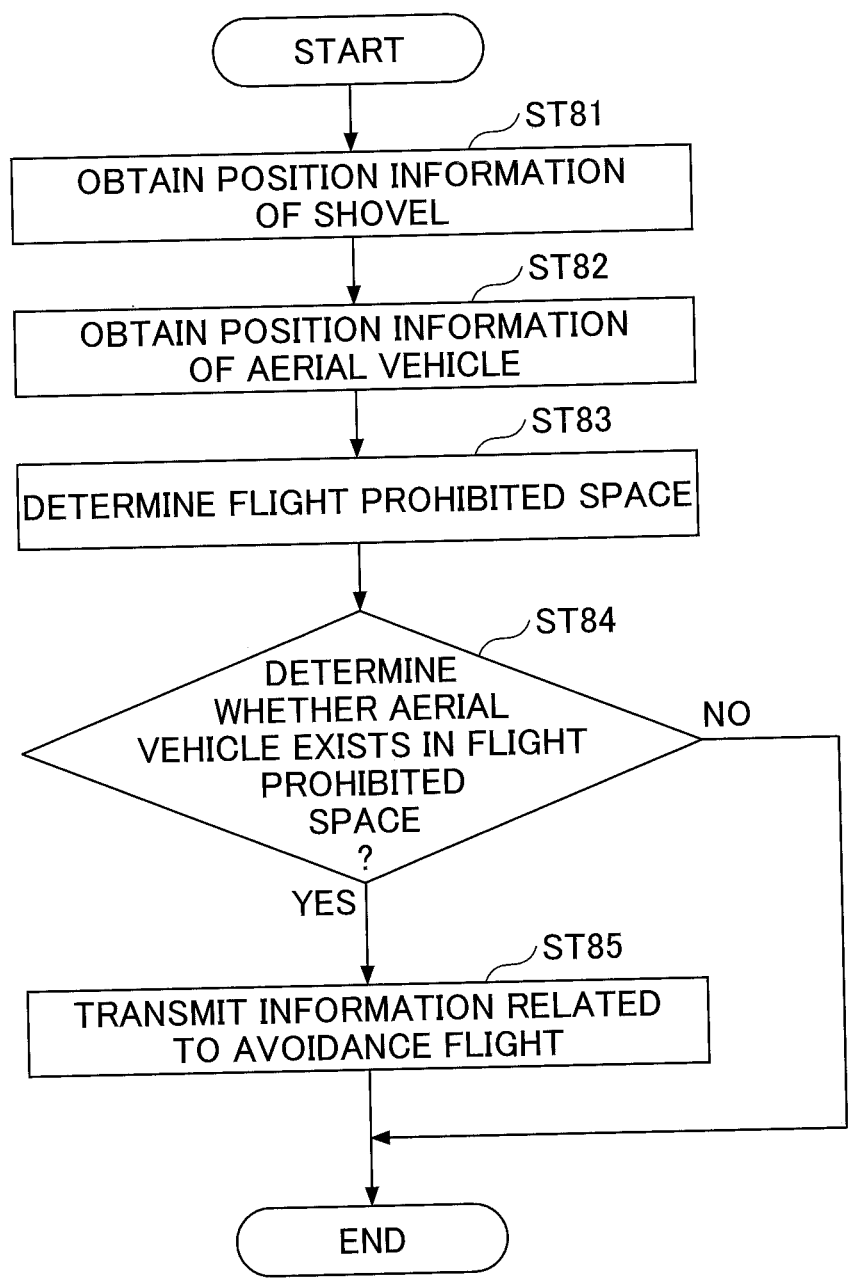
FIG. 12A is a flowchart illustrating another example flow of the contact avoiding process.
Figure 12B:
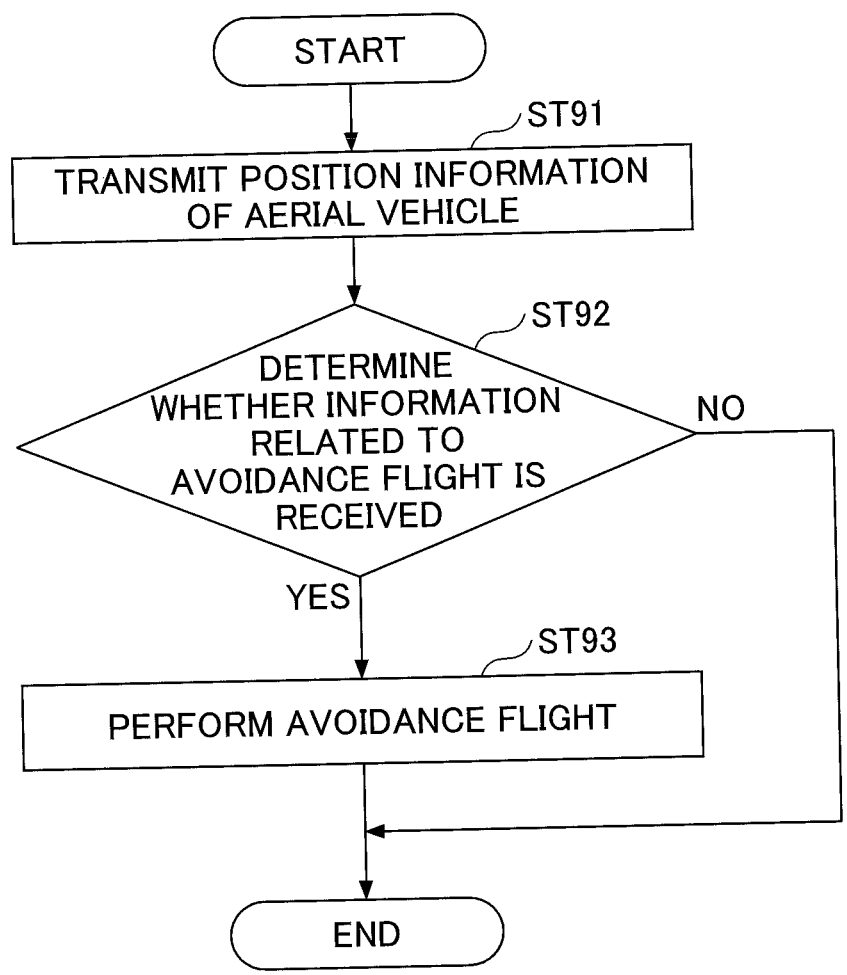
FIG. 12B is a flowchart illustrating another example flow of the contact avoiding process.

Next, referring to FIGS. 12A and 12B, another example of the contact avoiding process will be described. FIGS. 12A and 12B are flowcharts illustrating example flows of the contact avoiding process. FIG. 12A is a flowchart illustrating a process flow performed by the shovel 100. FIG. 12B is a flowchart illustrating a process flow performed by the aerial vehicle 200. The example of FIGS. 12A and 12B differs from the example of FIGS. 10A and 10B in that the controller 30 of the shovel 100 determines a flight prohibited space. In the example of FIGS. 10A and 10B, the controller 30 transmits position information of the shovel 100, and the controller 201 of the aerial vehicle 200 determines a flight prohibited space based on the position information of the shovel 100.

First, the controller 30 of the shovel 100 obtains position information of the shovel 100 (step ST81). For example, the controller 30 obtains latitude, longitude, and altitude of the shovel 100 based on an output from the positioning device S3. Further, the controller 30 may additionally obtain orientation information of the excavation attachment, direction information of the shovel 100, and operation information of the shovel 100. For example, the controller 30 may obtain a boom angle, an arm angle, a bucket angle, and a body inclination angle based on an output from the orientation detecting device S4. Further, the controller 30 may obtain an absolute azimuth of the shovel 100 based on an output from the direction detecting device S5. Further, the controller 30 may obtain operation details of the shovel 100 based on an output from the pilot pressure sensor 15a.

Next, the controller 30 obtains position information of the aerial vehicle 200 (step ST82). For example, the controller 30 receives position information of the aerial vehicle 200 via the receiver S2.

Next, the controller 30 determines a flight prohibited space around the shovel 100 (step ST83). For example, the controller 30 determines a flight prohibited space based on the position information of the shovel 100. Similarly, the controller 30 may determine a flight prohibited space by additionally taking into account the direction information of the shovel 100, the operation information of the shovel 100, and the orientation information of the excavation attachment.

Next, the controller 30 determines whether the aerial vehicle 200 exists in the flight prohibited space (step ST84). For example, when a distance between the predetermined point on the shovel 100 and the current position of the aerial vehicle 200 is less than or equal to the predetermined distance, the controller 30 determines that the aerial vehicle 200 exists in the flight prohibited space.

When the controller 30 determines that the aerial vehicle 200 exists in the flight prohibited space (yes in step ST84), the controller 30 transmits information related to avoidance flight (step ST85). For example, the controller 30 transmits information related to avoidance flight via the transmitter S1 to the aerial vehicle 200. The information related to avoidance flight includes information related to a target avoidance position, for example.

In this case, the controller 30 may forcibly restrict the movement of the hydraulic actuator. For example, when the shovel 100 is turning, the controller 30 may slow or stop the turning of the shovel 100. This securely prevents the shovel 100 and the aerial vehicle 200 from contacting each other.

In a case where the controller 30 restricts the movement of the hydraulic actuator in response to the aerial vehicle 200 being determined to exist in the flight prohibited space, the controller 30 may indicate that the aerial vehicle 200 exists in the flight prohibited space to the operator of the shovel 100. For example, the controller 30 may cause the display device 40 to display a text message indicating that the aerial vehicle 200 exists in the flight prohibited space.

When the controller 30 determines that the aerial vehicle 200 does not exist in the flight prohibited space (no in step ST84), the controller 30 ends the process without transmitting information related to avoidance flight.

By repeatedly performing steps ST81 through ST85 at predetermined control intervals, the controller 30 can continuously send information related to avoidance flight to the aerial vehicle 200 while the aerial vehicle 200 exists in the flight prohibited space.

The controller 201 of the aerial vehicle 200 repeatedly transmits position information of the aerial vehicle 200 at predetermined control intervals (step ST91). For example, the controller 201 transmits position information of the aerial vehicle 200 to the shovel 100.

The controller 201 determines whether information related to avoidance flight is received (step ST92).

When the controller 201 determines that information related to avoidance flight is received (yes in step ST92), the controller 201 performs avoidance flight (step ST93). For example, the controller 201 moves the aerial vehicle 200 to a target avoidance position. To be more specific, the controller 201 outputs information related to a target avoidance position to the autonomous flight device 204. The autonomous flight device 204 uses GNSS (GPS) navigation, inertial navigation, or hybrid navigation combining GPS navigation with inertial navigation to move the aerial vehicle 200 to the target avoidance position.

When avoidance flight is performed, the controller 201 forcibly moves the aerial vehicle 200 to the target avoidance position, regardless of the pilot's remote operation via the remote control 300. For example, even when the pilot is making the aerial vehicle 200 hover, the controller 201 forcibly moves the aerial vehicle 200 to the target avoidance position.

As part of avoidance flight, the controller 201 may control the aerial vehicle 200 so as to prevent the aerial vehicle 200 from entering the flight prohibited space. For example, even when the pilot is making the aerial vehicle 200 enter the flight prohibited space through a remote operation, the controller 201 causes the aerial vehicle 200 to hover and prevents the aerial vehicle 200 from entering the flight prohibited space.

When avoidance flight is performed, the controller 201 forcibly moves the aerial vehicle 200 to the target avoidance position, regardless of the pilot's remote operation via the remote control 300. For example, even when the pilot is making the aerial vehicle 200 hover, the controller 201 forcibly moves the aerial vehicle 200 to the target avoidance position.

The remote control 300 may indicate, to the pilot, that the avoidance flight is performed. For example, the remote control 300 causes the display device 304 to display a text message indicating that the avoidance flight is performed.

When the controller 201 determines that information related to avoidance flight is not received (no in step ST92), the controller 201 ends the process without performing avoidance flight.

By repeatedly performing step ST93 each time the controller 201 receives information related to avoidance flight, the controller 201 prevents the aerial vehicle 200 from entering the flight prohibited space or causes the aerial vehicle 200 to promptly move out of the flight prohibited space.

In the above-described configuration, it is possible to prevent the shovel 100 and the aerial vehicle 200 from contacting each other. To be more specific, unlike the example of FIGS. 10A and 10B, instead of transmitting position information of the shovel 100, the shovel 100 transmits information related to avoidance flight generated based on the position information. Therefore, the controller 201 of the aerial vehicle 200 can perform avoidance flight without performing a process for generating information related to avoidance flight.

Further, when the aerial vehicle 200 is equipped with a plurality of GNSS receivers, the controller 201 can identify a position and a direction (a rotation angle with respect to a reference orientation) of the aerial vehicle 200. In this case, by obtaining position information and direction information of the shovel 100 and orientation information of the excavation attachment, the controller 201 can compare a position of a predetermined portion of the excavation attachment with a position of the aerial vehicle 200 and can also compare a direction of the excavation attachment with a direction of the aerial vehicle 200. Accordingly, avoidance flight of the aerial vehicle 200 can be performed in accordance with changes in the orientation and the direction of the excavation attachment.

Figure 13:
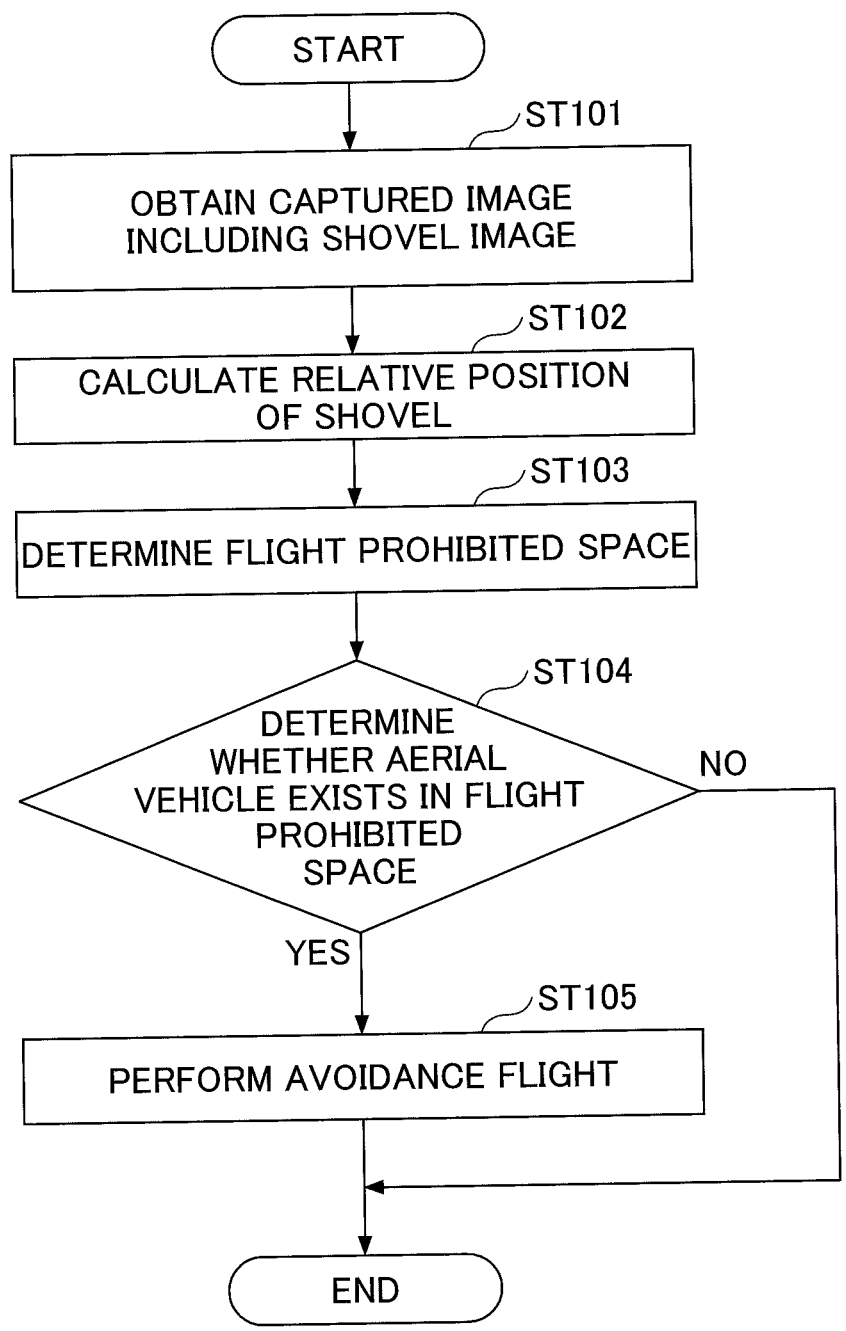
FIG. 13 is a flowchart illustrating yet another example flow of the contact avoiding process.

Next, referring to FIG. 13, yet another example of the contact avoiding process will be described. FIG. 13 is a flowchart illustrating yet another example flow of the contact avoiding process. The example of FIG. 13 differs from the examples of FIGS. 10A and 10B and FIGS. 12A and 12B in that the controller 201 of the aerial vehicle 200 determines a flight prohibited space without receiving information from the shovel 100.

First, the controller 201 of the aerial vehicle 200 obtains a captured image including a shovel image (step ST101). For example, the controller 201 obtains an image captured by the camera 205 of the aerial vehicle 200. The captured image includes a shovel image that is an image of the shovel 100.

Next, the controller 201 calculates a relative position of the shovel 100 (step ST102). For example, the controller 201 identifies the shovel image included in the captured image by applying image processing such as pattern matching to the captured image. Based on a positional relationship between the position of the identified shovel image and the center of the captured image, the controller 201 can calculate a relative position of the shovel 100 with respect to the position of the aerial vehicle 200 in real space. The position and the direction of the shovel image with respect to the center of the captured image correspond to the position and the direction of the shovel 100 with respect to the position of the aerial vehicle 200. The relative position of the shovel 100 includes a vertical distance and a horizontal distance between the shovel 100 and the aerial vehicle 200. The vertical distance is calculated based on the size of the shovel image in the captured image. The horizontal distance is calculated based on the position of the shovel image in the captured image.

The controller 201 may calculate a relative direction of the shovel 100 with respect to a direction of the aerial vehicle 200 based on the identified shovel image. The relative direction of the shovel 100 with respect to the direction of the aerial vehicle 200 is calculated based on an angle between an extending direction of an excavation attachment image included in the captured image and a vertical axis of the captured image. The vertical axis of the captured image corresponds to the direction of the aerial vehicle 200.

Next, the controller 201 determines a flight prohibited space (step ST103). For example, the controller 201 determines a flight prohibited space based on the relative position of the shovel 100 calculated in step ST102. To be more specific, the controller 201 obtains a point of intersection between a ground contact plane and the turning axis of the shovel 100 as a relative position. Based on the point of intersection, the controller 201 obtains a space within a range of a predetermined distance as a flight prohibited space.

Next, the controller 201 determines whether the aerial vehicle 200 exists in the flight prohibited space (step ST104). For example, the controller 201 determines whether the aerial vehicle 200 exists in the flight prohibited space based on the position and the size of the shovel image in the captured image. To be more specific, when the shovel image of the shovel 100 exists within a range of a predetermined number of pixels from the center of the captured image and also when the size of the shovel image is greater than or equal to a predetermined size, the controller 201 determines that the aerial vehicle 200 exists in the flight prohibited space belonging to the shovel 100. This is because, when the aerial vehicle 200 exists in the flight prohibited space belonging to the shovel 100, the shovel image of the shovel 100 appears in a size greater than or equal to the predetermined size in a predetermined range.

Alternatively, the controller 201 may calculate the current position of the aerial vehicle 200 based on an output from the autonomous flight device 204, and calculate a distance between the above-described point of intersection and the current position of the aerial vehicle 200. When the distance is less than or equal to the predetermined distance, the controller 201 may determine that the aerial vehicle 200 exists in the flight prohibited space. In a case where the flight prohibited space is determined by taking into account the direction information, the operation information, and the orientation information of the shovel 100, the controller 201 may additionally calculate a presence direction of the aerial vehicle 200 relative to the point of intersection based on an output from the autonomous flight device 204.

When the controller 201 determines that the aerial vehicle 200 exists in the flight prohibited space (yes in step ST104), the controller 201 performs avoidance flight (step ST105). For example, the controller 201 moves the aerial vehicle 200 to a target avoidance position.

In order to perform the avoidance flight, the controller 201 forcibly moves the aerial vehicle 200 to the target avoidance position, regardless of the pilot's remote operation via the remote control 300. Further, the controller 201 may transmit the movement restriction command to the shovel 100. Further, as part of the avoidance flight, the controller 201 may control the aerial vehicle 200 so as to prevent the aerial vehicle 200 from entering the flight prohibited space.

The remote control 300 may indicate, to the pilot, that the avoidance flight is performed. Similarly, when the avoidance flight is performed, specifically when the movement of the hydraulic actuator is restricted along with the avoidance flight, the controller 30 of the shovel 100 may indicate, to the operator of the shovel 100, that the avoidance flight is performed.

When the controller 201 determines that the aerial vehicle 200 does not exist in the flight prohibited space (no in step ST104), the controller 201 ends the process without performing avoidance flight.

By repeatedly performing steps ST102 through ST105 each time the controller 201 receives a captured image, the controller 201 prevents the aerial vehicle 200 from entering the flight prohibited space or causes the aerial vehicle 200 to promptly move out of the flight prohibited space.

In a case where the contact avoiding process of FIG. 13 is employed, the receiver S2 of the shovel 100 may be omitted.

In the above-described configuration, it is possible to prevent the shovel 100 and the aerial vehicle 200 from contacting each other. To be more specific, unlike the examples of FIGS. 8A and 8B and FIGS. 10A and 10B, the aerial vehicle 200 can identify a flight prohibited space belonging to the shovel 100 without receiving information generated by the shovel 100. Further, the aerial vehicle 200 can autonomously fly so as not to enter the flight prohibited space belonging to the shovel 100. Also, when the aerial vehicle 200 is located in the flight prohibited space, the aerial vehicle 200 autonomously flies so as to promptly move out of the flight prohibited space.

Next, referring to FIG. 14 and FIGS. 15A1 through 15C2, an image rotation function that is yet another function of the work support system will be described. The image rotation function is a function for rotating an image captured by the camera 205 of the aerial vehicle 200, such that the captured image is displayed in a predetermined direction on the display device 40 of the shovel 100. FIG. 14 is a side view illustrating the shovel 100 performing excavation work and loading work, the aerial vehicle 200 flying and following the shovel 100, and the dump truck 400 receiving sediment discharged from the shovel 100. FIGS. 15A1 through 15C2 illustrate relative positional relationships between the shovel 100, the aerial vehicle 200, and the dump truck 400, and also illustrate three combinations of captured images displayed on the display device 40. FIG. 15A1, FIG. 15B1, and FIG. 15C1 illustrate relative positional relationships, and FIG. 15A2, FIG. 15B2, and FIG. 15C2 illustrate captured images displayed on the display device 40. Further, FIGS. 15A1 and 15A2 correspond, FIG. 15B1 and FIG. 15B2 correspond, and FIG. 15C1 and FIG. 15C2 correspond.

In the examples illustrated in FIG. 14 and FIG. 15A1, the shovel 100 performs excavation work with the excavation attachment being turned in a +Y direction. Further, as illustrated in arrow AR2 of FIG. 14, the shovel 100 performs loading work for loading sediment onto a deck of the dump truck 400 with the excavation attachment turned in a +X direction by being turned left as indicated by an arrow AR2. The aerial vehicle 200 flies and follows the shovel 100 by flying directly above the arm end position of the excavation attachment while maintaining a predetermined flight altitude.

Further, as illustrated in FIG. 15A1, when the shovel 100 is performing the excavation work with the excavation attachment being turned in the +Y direction, the aerial vehicle 200 is facing the same +Y direction as the direction of the excavation attachment. A black triangle marked in the aerial vehicle 200 in the FIG. 15A1 indicates that the aerial vehicle 200 is facing the +Y direction. In this case, as illustrated in FIG. 15A2, the display device 40 displays a captured image such that an arm end position image is located in the center of the screen and an excavation attachment image extends in parallel to the vertical axis of the display device 40.

When the excavation attachment is turned in the +X direction by being turned left after the excavation work, the arm front end position moves directly above the deck of the dump truck 400 as illustrated in FIG. 15B1. At this time, when the direction of the aerial vehicle 200 following the movement the arm end position is fixed, the display device 40 displays a captured image such that an excavation attachment image extends in parallel to the horizontal axis of the display device 40.

However, if the direction of the excavation attachment image displayed on the display device 40 changes in accordance with the turning angle of the upper turning body 3, the operator looking at the image may be confused.

Accordingly, in the example illustrated in FIG. 15C1, the aerial vehicle 200 following the movement of the arm end position changes its direction in accordance with the change in the turning angle of the upper turning body 3. Therefore, when the excavation attachment is turned in the +X direction, the aerial vehicle 200 also faces the +X direction. As a result, as illustrated in FIG. 15C2, the display device 40 displays a captured image such that an excavation attachment image extends in parallel to the vertical axis of the display device 40. Namely, regardless of changes in the turning angle of the upper turning body 3, the display device can display a captured image such that an excavation attachment image extends in parallel to the vertical axis of the display device 40.

Figure 16A:
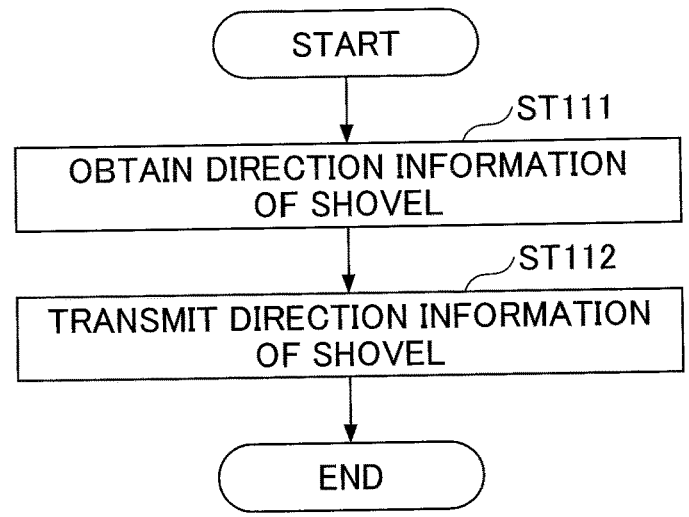
FIG. 16A is a flowchart illustrating an example flow of an image rotation process.
Figure 16B:
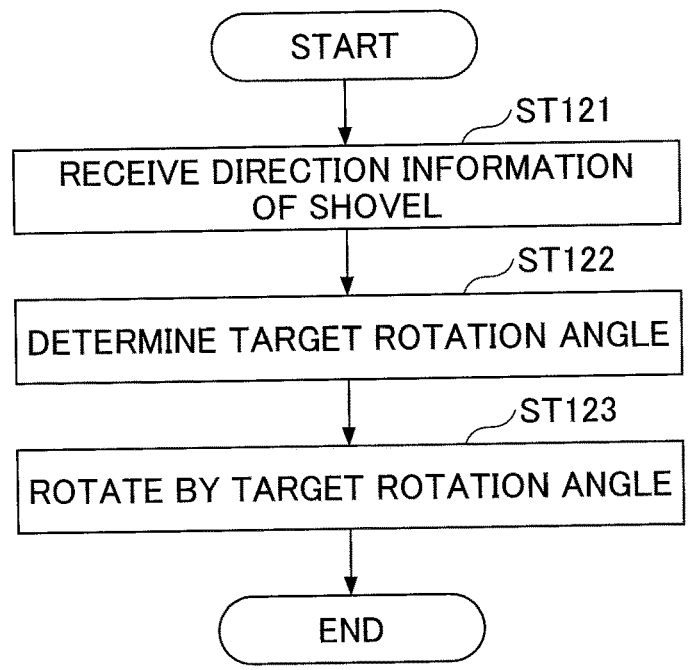
FIG. 16B is a flowchart illustrating an example flow of the image rotation process.

Next, referring to FIGS. 16A and 16B, an example of a process for performing the image rotation function (hereinafter referred to as an "image rotation process") will be described. FIG. 16A is a flowchart illustrating a process flow performed by the shovel 100. FIG. 16B is a flowchart illustrating a process flow performed by the aerial vehicle 200. In the example of FIGS. 16A and 16B, by using position information of the shovel 100 and orientation information of the excavation attachment, the aerial vehicle 200 follows the shovel 100 by autonomously flying directly above the arm end position. However, the description below also applies to a case in which the aerial vehicle 200 is remotely operated by the pilot via the remote control 300.

First, the controller 30 of the shovel 100 obtains direction information of the shovel 100 (step ST111). The controller 30 obtains an absolute azimuth of the shovel 100 based on an output from the direction detecting device S5, for example.

Next, the controller 30 transmits the direction information to the outside (step ST112). For example, the controller 30 transmits the direction information to the aerial vehicle 200 via the transmitter S1.

By repeatedly performing Steps ST111 and ST112 at predetermined control intervals, the controller 30 can continuously send direction information of the shovel 100 to the aerial vehicle 200.

The controller 201 of the aerial vehicle 200 receives the direction information of the shovel 100 (step ST121). For example, the controller 201 receives, via the receiver 203, the direction information of the shovel 100 transmitted from the controller 30 of the shovel 100.

Next, the controller 201 determines a target rotation angle (step ST122). For example, the controller 201 determines a target rotation angle based on the direction information of the shovel 100 and direction information of the aerial vehicle 200. The target rotation angle is a target angle by which the aerial vehicle 200 rotates when changing directions. For example, in order to change the direction of the aerial vehicle 200 in accordance with the direction of the shovel 100 (excavation attachment), an angle between the direction of the shovel 100 and the direction of the aerial vehicle 200 is set as a target rotation angle. The controller 201 calculates direction information of the aerial vehicle 200 based on an output from the autonomous flight device 204.

Alternatively, the controller 201 may determine a target rotation angle of the aerial vehicle 200 based on a change in direction of the shovel 100. For example, an angle between a direction of the shovel 100 received in the previous process and a direction of the shovel 100 received in the current process may be set as a target rotation angle.

Next, the controller 201 causes the aerial vehicle 200 to rotate by the target rotation angle (step ST123). For example, the controller 201 transmits information related to the target rotation angle to the autonomous flight device 204. For example, among the four propellers, by adjusting the rotational speed of two propellers rotating in the same rotating direction, the autonomous flight device 204 rotates the aerial vehicle 200 by the target rotation angle. The controller 201 forcibly causes the aerial vehicle 200 to rotate by the target rotation angle even when the aerial vehicle 200 is remotely operated.

By repeatedly performing step ST122 and step ST123 each time the controller 201 receives direction information of the shovel 100, the controller 30 can continuously change the direction of the aerial vehicle according to the direction of the shovel 100.

In the above-described configuration, the shovel 100 can cause the display device 40 in the cabin 10 to display, in a predetermined direction, an image captured by the camera 205 mounted on the aerial vehicle 200 so as to present the image to the operator of the shovel 100. The predetermined direction is a direction in which an excavation attachment image extends in parallel to the vertical axis of the display device 40, and the predetermined direction changes according to the turning angle of the upper turning body 3.

Further, the shovel 100 can cause the aerial vehicle 200 to rotate by transmitting information related to the direction of the aerial vehicle 200 via the transmitter S1. For example, the shovel 100 can rotate the aerial vehicle 200 such that the direction of the shovel 100 and the direction of the aerial vehicle 200 match. As a result, the aerial vehicle 200 can fly and follow the shovel 100 while maintaining a relative angle between the direction of the shovel 100 and the direction of the aerial vehicle 200. Accordingly, the display device 40 can display an excavation attachment image such that the excavation attachment image always extends in parallel to or vertical to the vertical axis of the display device 40.

Further, the shovel 100 can rotate the aerial vehicle 200 without receiving information transmitted from the aerial vehicle 200. As the aerial vehicle 200 can determine a target rotation angle of the aerial vehicle 200 based on direction information of the shovel 100, the shovel 100 may only be required to transmit the direction information of the shovel 100.

Further, in the example of FIGS. 16A and 16B, the aerial vehicle 200 follows the shovel 100 by autonomously flying directly above the arm end position in such a manner that there is no positional shift between the arm end position (XY coordinates or XYZ coordinates) and the position (XY coordinates or XYZ coordinates) of the aerial vehicle 200. Accordingly, an arm end position image is always displayed in the center of the screen of the display device 40. However, even if there is a positional shift, such a positional shift can be handled by the work support system.

For example, in step ST121, in a case where position information of the shovel 100 and orientation information of the excavation attachment are received in addition to the direction information of the shovel 100, the controller 201 can calculate a direction and a size of a positional shift. To be more specific, based on the position information of the shovel 100 and the orientation information of the excavation attachment and also based on position information of the aerial vehicle 200 output from the autonomous flight device 204, the controller 201 can calculate the direction and the size of the positional shift. Further, based on the direction and the size of the positional shift, the controller 201 can calculate the position of a pixel that is expected to be located in the center of a captured image. Accordingly, the controller 201 can generate the captured image such that the pixel is located in the center of the captured image. The pixel located in the center of the captured image is, for example, a pixel forming an image of the arm end position. Therefore, even if there is a positional shift, the image of the arm end position can be displayed in the center of the screen of the display device 40.

Figure 17A:
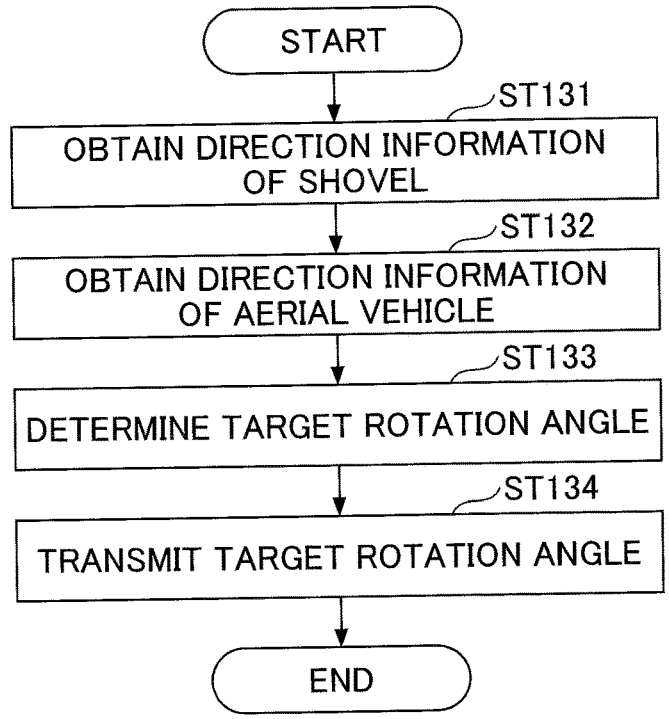
FIG. 17A is a flowchart illustrating another example flow of the image rotation process.
Figure 17B:
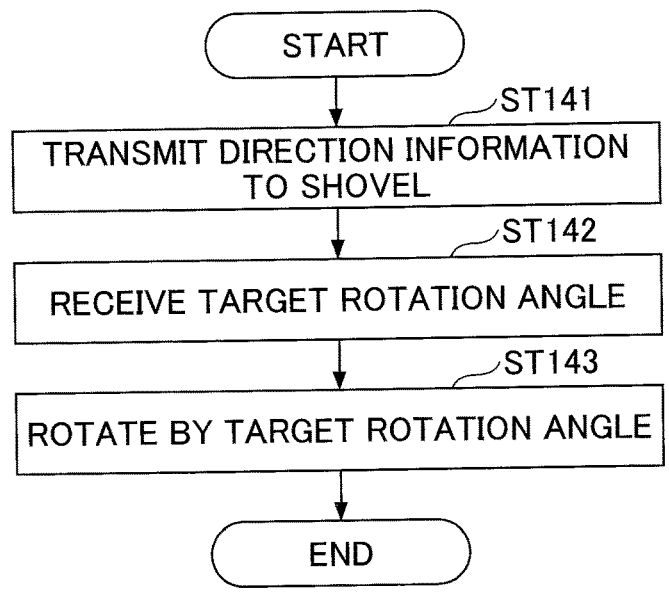
FIG. 17B is a flowchart illustrating another example flow of the image rotation process.

Next, referring to FIGS. 17A and 17B, another example of the image rotation process will be described. FIG. 17A is a flowchart illustrating a process flow performed by the shovel 100. FIG. 17B is a flowchart illustrating a process flow performed by the aerial vehicle 200. The example of FIGS. 17A and 17B differs from the example of FIGS. 16A and 16B in that the controller 30 of the shovel 100 calculates and transmits a target rotation angle. In the example of FIGS. 16A and 16B, the controller 30 transmits direction information of the shovel 100, and the controller 201 of the aerial vehicle 200 calculates a target rotation angle based on the direction information of the shovel 100. Also, in the example of FIGS. 17A and 17B, the aerial vehicle 200 follows the shovel 10 by flying directly above the arm end position by using position information of the shovel 10 and orientation information of the excavation attachment.

First, the controller 30 obtains direction information of the shovel 100 (step ST131). For example, the controller 30 obtains an absolute azimuth of the shovel 100 based on an output from the direction detecting device S5.

Next, the controller 30 obtains direction information of the aerial vehicle 200 (step ST132). For example, the controller 30 receives direction information of the aerial vehicle 200 via the receiver S2. The aerial vehicle 200 transmits the direction information of the aerial vehicle 200, obtained based on the output from the autonomous flight device 204, to the shovel 100.

Next, the controller 30 determines a target rotation angle (step ST133). For example, the controller 30 determines a target rotation angle based on the direction information of the shovel 100 and the direction information of the aerial vehicle 200. Alternatively, the controller 30 may determine a target rotation angle of the aerial vehicle 200 based on a change in direction of the shovel 100.

Next, the controller 30 transmits the target rotation angle to the outside (step ST134). For example, the controller 30 transmits the target rotation angle to the aerial vehicle 200 via the transmitter S1.

By repeatedly performing steps ST131 through ST134 at predetermined control intervals, the controller 30 can continuously send information related to the target rotation angle to the aerial vehicle 200.

The controller 201 of the aerial vehicle 200 repeatedly transmits direction information of the aerial vehicle 200 at predetermined control intervals (step ST141). For example, the controller 201 transmits direction information of the aerial vehicle 200 to the shovel 100.

The controller 201 receives the target rotation angle (step ST142). For example, the controller 201 receives, via the receiver 203, the target rotation angle transmitted from the controller 30 of the shovel 100.

Next, the controller 201 causes the aerial vehicle 200 to rotate by the target rotation angle (step ST143).

By repeatedly performing step ST143 each time the controller 201 receives target rotation angle, the controller 201 can continuously change the direction of the aerial vehicle according to the direction of the shovel 100.

In the above-described configuration, similarly to the example of FIGS. 16A and 16B, the shovel 100 can cause the display device 40 in the cabin 10 to display, in a predetermined direction, an image captured by the camera 205 mounted on the aerial vehicle 200 so as to present the image to the operator of the shovel 100.

Further, the shovel 100 can cause the aerial vehicle 200 to rotate by transmitting information related to the target rotation angle of the aerial vehicle 200 via the transmitter S1. Therefore, the shovel 100 can cause the aerial vehicle 200 to rotate without causing the aerial vehicle 200 to calculate the target rotation angle of the aerial vehicle 200. This is because the aerial vehicle 200 can simply rotate according to information related to the target rotation angle generated by the shovel 100.

Further, similarly to the example of FIGS. 16A and 16B, in the example of FIGS. 17A and 17B, even if there is a positional shift, such a positional shift can be handled by the work support system.

For example, in step ST132, in a case where position information of the aerial vehicle 200 is received in addition to the direction information of the shovel 100, the controller 30 can calculate a direction and a size of a positional shift based on the position information of the shovel 100, the orientation information of the excavation attachment, and the position information of the aerial vehicle 200. Further, based on the direction and the size of the positional shift, the controller 30 can calculate the position of a pixel that is expected to be located in the center of a captured image. The controller 30 transmits information related to the position of the pixel to the aerial vehicle 200. Upon the controller 201 of the aerial vehicle 200 receiving the information related to the position of the pixel, the controller 201 can generate the captured image such that the pixel is located in the center of the captured image. Therefore, even if there is a positional shift, a desired image can be displayed in the center of the screen of the display device 40.

Figure 18A:
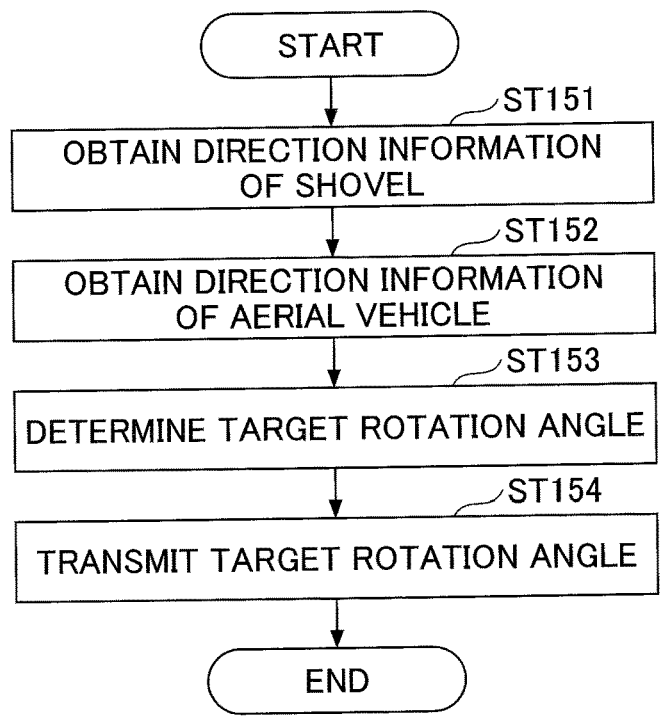
FIG. 18A is a flowchart illustrating yet another example flow of the image rotation process.
Figure 18B:
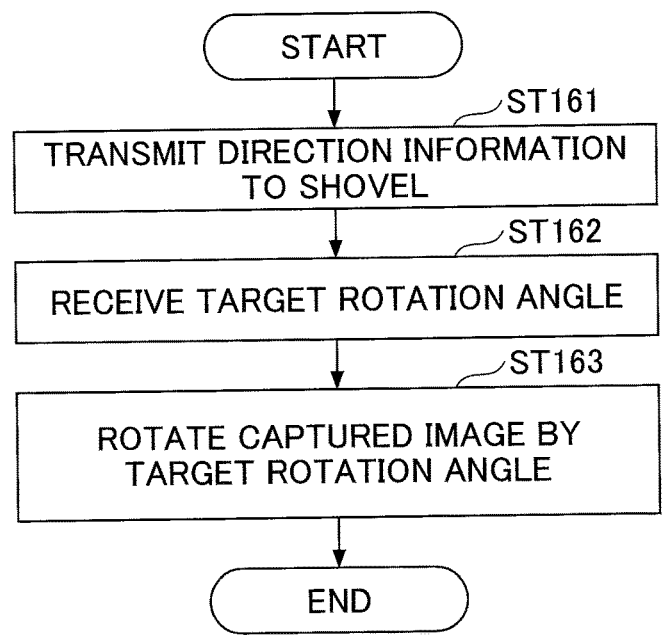
FIG. 18B is a flowchart illustrating yet another example flow of the image rotation process.

Next, referring to FIGS. 18A and 18B, yet another example of the image rotation process will be described. FIG. 18A is a flowchart illustrating a process flow performed by the shovel 100. FIG. 18B is a flowchart illustrating a process flow performed by the aerial vehicle 200. The example of FIGS. 18A and 18B differs from the example of FIGS. 17A and 17B in that the controller 201 of the aerial vehicle 200 rotates a captured image by a target rotation angle (step ST163), instead of rotating the aerial vehicle 200 by the target rotation angle (step ST143). Steps ST151 through ST154 are the same as steps ST131 through ST134, and steps ST161 through ST162 are the same as steps ST141 through ST142. Therefore, in the example of FIGS. 18A and 18B, by using position information of the shovel 100 and orientation information of the excavation attachment, the aerial vehicle 200 follows the shovel 100 by flying directly above the arm end position without changing directions.

In the above-described configuration, similarly to the examples of FIGS. 16A and 16B and FIGS. 17A and 17B, the shovel 100 can cause the display device 40 in the cabin 10 to display, in a predetermined direction, an image captured by the camera 205 mounted on the aerial vehicle 200 so as to present the image to the operator of the shovel 100. Further, it is possible for the aerial vehicle 200 to implement the image rotation function by only performing image processing without actually rotating the aerial vehicle 200.

Figure 19:
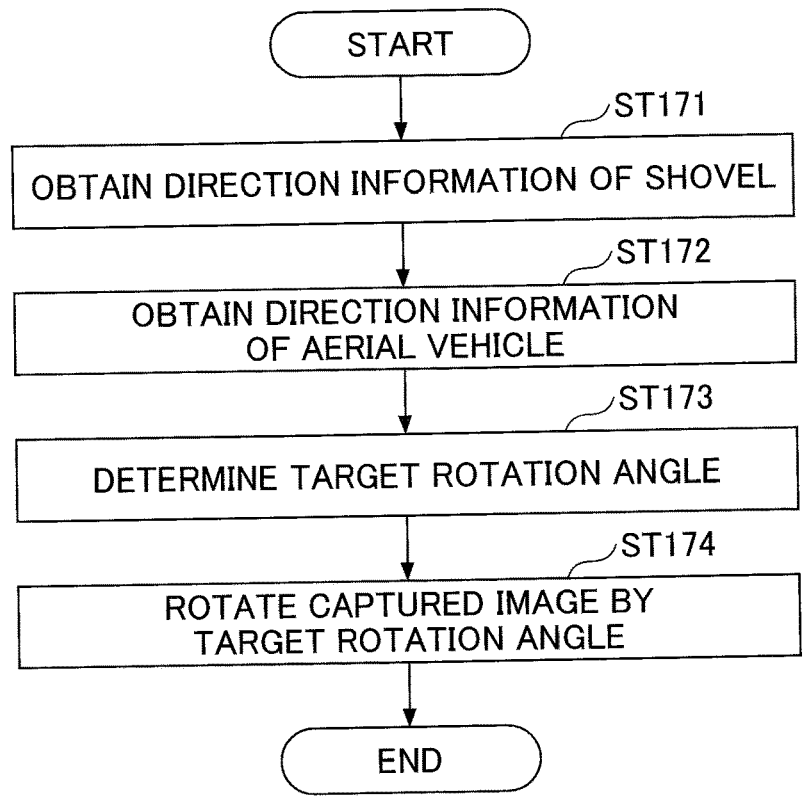
FIG. 19 is a flowchart illustrating yet another example flow of the image rotation process.

Next, referring to FIG. 19, yet another example of the image rotation process will be described. The example of FIG. 19 differs from the examples of FIG. 16A through FIG. 18B in that the shovel 100 performs all steps related to the image rotation function without causing the aerial vehicle 200 to perform any of the steps related to the image rotation function. To be more specific, the example of FIG. 19 differs from the example of FIGS. 18A and 18B in that the controller 30 rotates a captured image by the target rotation angle (step ST174) instead of transmitting a target rotation angle (step ST154). Steps ST151 through ST153 are the same as steps ST171 through ST173. Therefore, in the example of FIG. 19, information is not required to be transmitted from the shovel 100, and thus the transmitter S1 may be omitted.

In the above-described configuration, similarly to the examples of FIG. 16A through FIG. 18B, the shovel 100 can cause the display device 40 in the cabin 10 to display, in a predetermined direction, an image captured by the camera 205 mounted on the aerial vehicle 200 so as to present the image to the operator of the shovel 100. Further, it is possible for the shovel 100 to implement the image rotation function by only performing image processing without actually rotating the aerial vehicle 200.

Further, the controller 30 may identify the excavation attachment by analyzing object detection information obtained by the aerial vehicle 200 flying and following the shovel 100. For example, the controller 30 may identify an excavation attachment image by analyzing an image captured by the camera 205. Further, the controller 30 may rotate and display the captured image, such that the extending direction of the identified excavation attachment image becomes parallel to the vertical axis of the captured image and also the end position of the excavation attachment image faces the upper portion of the screen of the display device 40. This is because the operator of the shovel faces the excavation attachment side. This configuration allows the controller 30 to implement the image rotation function without comparing direction information of the shovel 100 with direction information of the aerial vehicle 200.

Further, the work support system may cause the shovel 100 to perform all the steps related to the image rotation function without causing the aerial vehicle 200 to perform any of the steps related to the image rotation function.

Figure 20A:
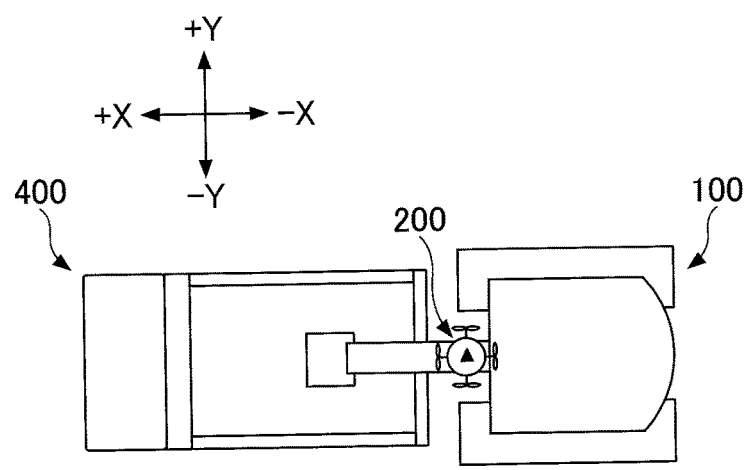
FIG. 20A is a drawing illustrating a relative positional relationship between the shovel, the aerial vehicle, and the dump truck.

Next, referring to FIGS. 20A through 20B2, another example of the image rotation function will be described. FIG. 20A is a top view illustrating the shovel 100 performing excavation work and loading work, the aerial vehicle 200 flying and following the shovel 100, and the dump truck 400 receiving sediment discharged from the shovel 100. FIG. 20B1 and FIG. 20B2 illustrate images captured by the camera 205 of the aerial vehicle 200 in FIG. 20A.

In the example of FIG. 20A, in order to identify a loading state of the dump truck 400, the aerial vehicle 200 hovers while maintaining a predetermined flight altitude so as to remain in a predetermined position between the shovel 100 and the dump truck 400. For example, the predetermined position is an intermediate position between the rear end position of the dump truck 400 and the turning axis of the shovel 100. The rear end position of the dump truck 400 is obtained by applying image processing to a captured image of the camera 205. Further, the aerial vehicle 200 hovers while staying in a predetermined direction regardless of whether the shovel 100 turns. In the example of FIG. 20A, the aerial vehicle 200 hovers while facing a +Y direction. A black triangle marked in the aerial vehicle 200 of FIG. 20A indicates that the aerial vehicle 200 is facing the +Y direction. In this case, as illustrated in FIG. 20B1, the display device 40 displays an captured image such that an image of the excavation attachment performing loading work to the dump truck extends in parallel to the horizontal axis of the display device 40.

However, when the image of the excavation attachment performing loading work to the dump truck is displayed so as to extend in parallel to the horizontal axis of the display device 40, the operator looking at the image may be confused. This is because the actual direction of the excavation attachment greatly differs from the direction of the image of the excavation attachment displayed on the display device 40.

Therefore, the controller 30 of the shovel 100 or the controller 201 of the aerial vehicle 200 rotates the captured image such that the direction of the image of the excavation attachment performing loading work to the dump truck becomes the same as the actual direction of the excavation attachment. As a result, the display device 40 can display the captured image such that the image of the excavation attachment performing loading work to the dump truck extends in parallel to the vertical axis of the display device 40.

Next, referring to FIGS. 21A through 23B, a machine guidance function that is yet another function of the work support system will be described. The machine guidance function is a function for guiding an operation of the shovel 100 based on an image captured by the camera 205 of the aerial vehicle 200.

Figure 21A:
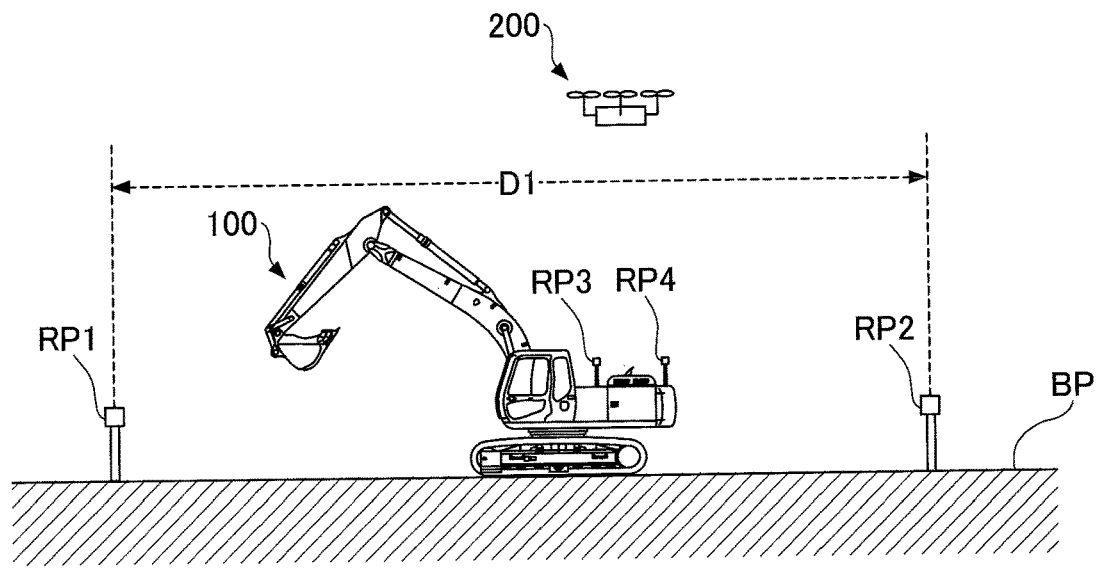
FIG. 21A is a drawing illustrating a method for obtaining a position and a direction of the shovel based on an image captured by the aerial vehicle.
Figure 21B:
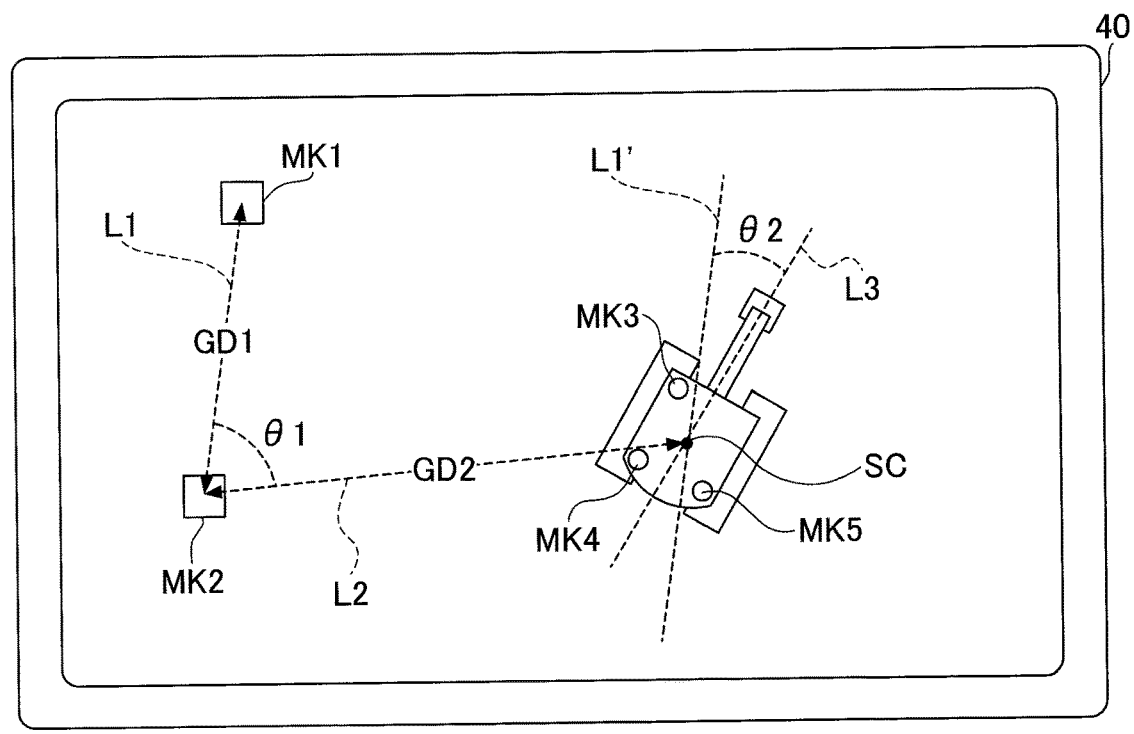
FIG. 21B is a drawing illustrating the method for obtaining the position and the direction of the shovel based on the image captured by the aerial vehicle.

FIGS. 21A and 21B are drawings for explaining a method for obtaining a position and a direction of the shovel 100 based on an image captured by the camera 205 of the aerial vehicle 200. FIG. 21A is a side view illustrating the shovel 100 and the aerial vehicle 200 flying above the shovel 100. FIG. 21B illustrates a captured image displayed on the display device. Dash lines illustrated in FIG. 21B are not actually displayed on the display device 40.

As illustrated in FIG. 21A, the shovel 100 is located on a reference plane BP. The reference plane BP is a plane defined by reference points RP1 and RP2. The reference points RP1 and RP2 are accurately measured absolute positions (latitude, longitude, and altitude), and for example, are electronic reference points (GNSS continuous observation points). In this example, D1 denotes a distance in meter between the reference point RP1 and the reference point RP2. The reference points RP1 and RP2 correspond to marker images MK1 and MK2, respectively, in a captured image illustrated in FIG. 21B. Namely, in the display device 40, the reference point RP1 is represented as a marker MK1. Similarly, in the display device 40, the reference point RP2 is represented as a marker MK2. The marker images MK1 and MK2 are used to calculate a distance (the number of pixels) between two points in a captured image.

On the upper turning body 3 of the shovel 100, three marks RP3 through RP5 are placed (the mark RP5 is not illustrated). The marks RP3 through RP5 correspond to marker images MK3 through MK5, respectively, in the captured image illustrated in FIG. 21B. Namely, in the display device 40, the mark RP3 is represented as a marker MK3. Similarly, in the display device 40, the mark RP4 is represented as a marker MK4. Similarly, in the display device 40, the mark RP5 is represented as a marker MK5. The marker images MK3 through MK5 are used to identify a direction of a shovel image (an image of the shovel 100). The number of marks placed on the upper turning body 3 may be less than or equal to three or greater than or equal to four, as long as the direction of the shovel image (the image of the shovel 100) can be identified in the captured image. Further, marks corresponding to marker images may be existing shovel components such as the cabin 10 and an engine hood, or may be the upper turning body 3 itself. A combination of marker images corresponding to marks may form a symbol such as a QR code (registered trademark).

By using a known image processing technique, the marker images MK1 through MK5 are extracted, and coordinates in the captured image are identified.

To be more specific, based on the known distance D1 between the reference point RP1 and the reference point RP2 and a distance (the number of pixels) GD1 between the marker image MK1 and the marker image MK2 in the captured image illustrated in FIG. 21B, the controller 30 can calculate an actual distance corresponding to a unit distance (the number of pixels) in the captured image. For example, a distance of 100 pixels in a captured image can correspond to 1 meter in real space. As a result, based on a distance (the number of pixels) GD2 between the center point SC of the shovel 100 and the marker image MK2 in the captured image, a distance between the center point SC of the shovel 100 and the reference point RP2 in real space can be calculated. The center point SC is, for example, a point of intersection between the turning axis of the shovel 100 and the reference plane BP. The center point SC can be calculated based on the coordinates of the three marker images MK3 through MK5.

Further, based on a known orientation of the reference point RP1 relative to the reference point RP2 and also based on an angle 91 between a line segment L1 and a line segment L2 in the captured image illustrated in FIG. 21B, the controller 30 can calculate an orientation of the center point SC of the shovel 100 relative to the reference point RP2. The line segment L1 is a line segment connecting the marker image MK1 and the marker image MK2. The line segment L2 is a line segment connecting the marker image MK2 and the center point SC.

In this way, the controller 30 can calculate a distance between the center point SC of the shovel 100 and the reference point RP2 in real space, and calculate an orientation of the center point SC of the shovel 100 relative to the reference point RP2. Further, based on the absolute position of the reference point RP2, the controller 30 can calculate an absolute position of the center point SC of the shovel 100.

Further, based on the coordinates of the three marker images MK3 through MK5, the controller 30 can calculate a line segment L3 on the reference plane BP. The line segment L3 indicates a longitudinal direction of the excavation attachment. Accordingly, the controller 30 can calculate an angle 82 between the line segment L3 and a line segment L1' parallel to the line segment L1 and passing through the center point SC.

As a result, based on the known orientation of the reference point RP1 relative to the reference point RP2, the controller 30 can obtain an orientation indicated by the longitudinal direction of the excavation attachment. Further, a turning angle can be calculated based on changes in orientation indicated by the longitudinal direction of the excavation attachment. For example, a turning angle can be calculated based on an orientation indicated by the longitudinal direction of the excavation attachment at a time when the excavation attachment starts turning and also based on an orientation indicated by the longitudinal direction of the excavation attachment at a time when the excavation attachment stops turning.

Further, the controller 30 can obtain an orientation of the excavation attachment based on an output from the orientation detecting device S4 so as to calculate a relative position of the front edge of the bucket 6. Further, based on the relative position of the front edge of the bucket 6 and the absolute position of the center point SC, the controller 30 can calculate an absolute position of the front edge of the bucket 6.

Further, by referring to design data stored in a non-volatile storage medium, the controller 30 can calculate a distance between a target construction surface and the front edge of the bucket 6. The target construction surface is a target surface after construction and is represented by latitude, longitude, and altitude.

Figure 22A:
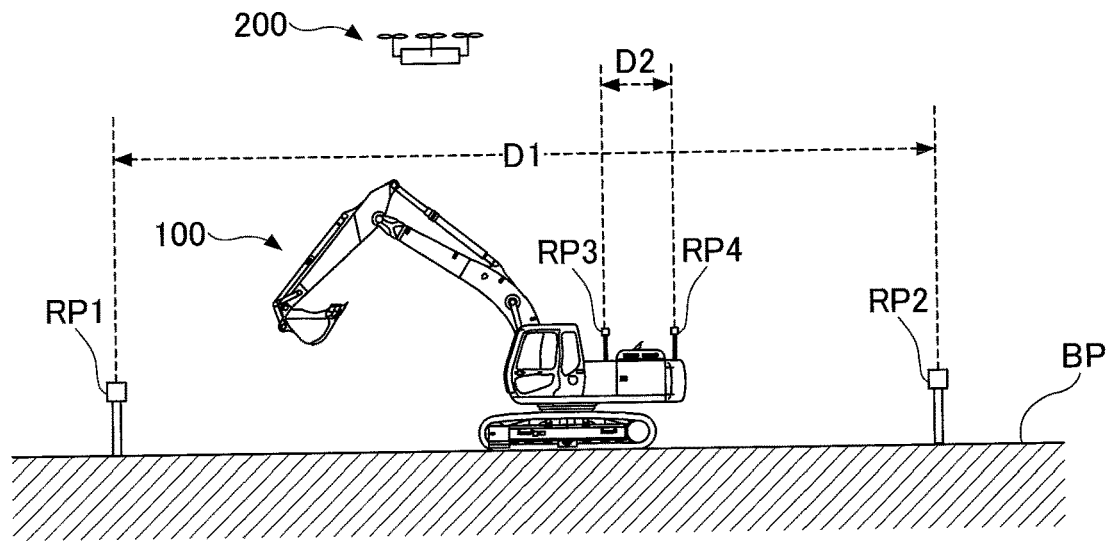
FIG. 22A is a drawing illustrating a method for obtaining the height or the depth of a ground contact plane of the shovel with respect to a reference plane based on an image captured by the aerial vehicle.
Figure 22B:
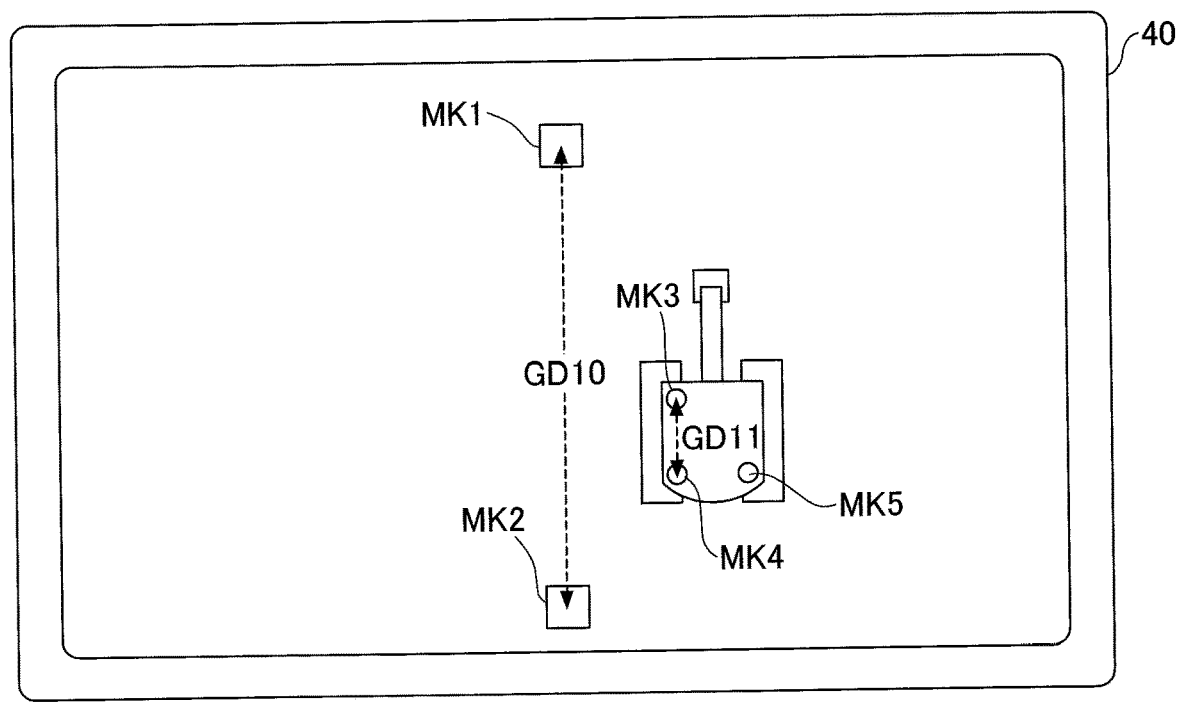
FIG. 22B is a drawing illustrating a method for obtaining the height or the depth of the ground contact plane of the shovel with respect to the reference plane based on the image captured by the aerial vehicle.
Figure 22C:
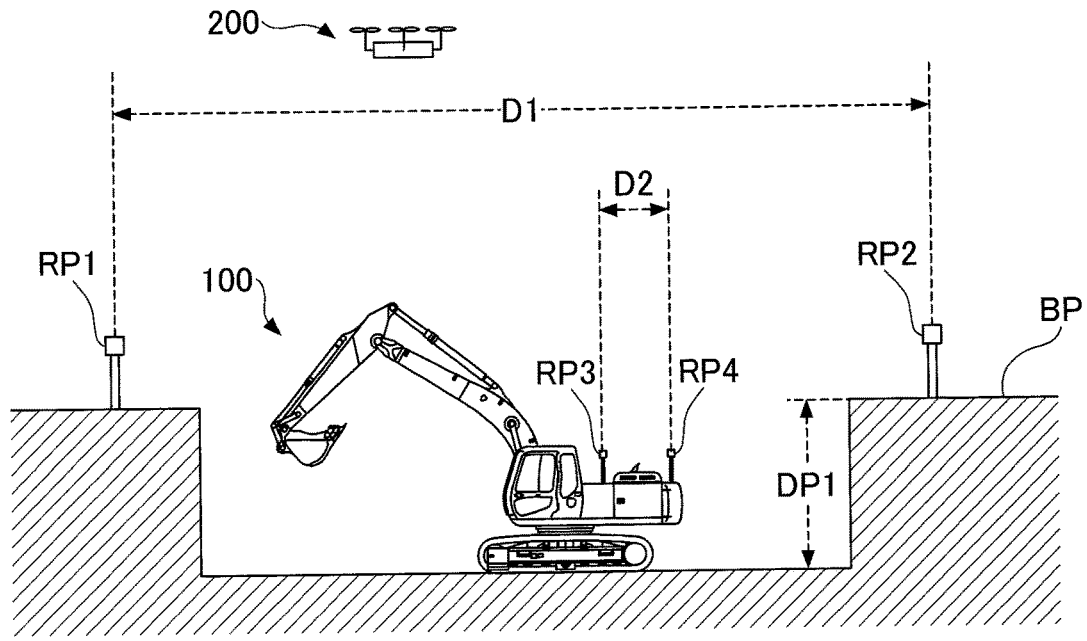
FIG. 22C is a drawing illustrating a method for obtaining the height or the depth of the ground contact plane of the shovel with respect to the reference plane based on the image captured by the aerial vehicle.

FIGS. 22A through 22C are drawings for explaining a method for obtaining the height or the depth of a ground contact plane of the shovel 100 with respect to the reference plane BP based on an image captured by the aerial vehicle 200. FIG. 22A is a side view illustrating the shovel 100 located on the reference plane BP and the aerial vehicle 200 flying above the shovel 100. FIG. 22B illustrates a captured image displayed on the display device 40. Dash lines illustrated in FIG. 22B are not actually displayed on the display device 40. FIG. 22C is a side view illustrating the shovel 100 located on a ground contact plane deeper than the reference plane BP by depth DP1 and the aerial vehicle 200 flying above the shovel 100.

The controller 30 obtains the height or the depth of the ground contact plane of the shovel 100 based on a distance (the number of pixels) GD10 between a marker image MK1 and a marker image MK2 and also based on a distance (the number of pixels) GD11 between a marker image MK3 and a marker image MK4. The distance (the number of pixels) GD10 corresponds to the actual distance D1 between the reference point RP1 and the reference point RP2. A distance (the number of pixels) GD11 corresponds to an actual distance D2 between the mark RP3 and the mark RP4.

For example, when a distance ratio of the distance (the number of pixels) GD10 to the distance (the number of pixels) GD11 is equal to a preliminarily stored predetermined value, the controller 30 determines that the shovel 100 is located on the reference plane BP as illustrated in FIG. 22A. Also, as the distance ratio becomes larger than the predetermined value, the controller 30 determines that the ground contact plane of the shovel 100 becomes lower than the reference plane BP as illustrated in FIG. 22C. This is because, in the captured image, as the ground contact plane of the shovel 100 becomes lower than the reference plane BP, a shovel image becomes smaller in appearance. Thus, the distance (the number of pixels) GD11 becomes relatively smaller with respect to the distance (the number of pixels) GD10.

Similarly, as the distance ratio becomes smaller than the predetermined value, the controller determines that the ground contact plane of the shovel 100 becomes higher than the reference plane BP. This is because, in the captured image, as the ground contact plane of the shovel 100 becomes higher than the reference plane BP, the shovel image becomes larger in appearance. Thus, the distance (the number of pixels) GD11 becomes relatively larger with respect to the distance (the number of pixels) GD10.

The controller 30 obtains the depth or the height of the ground contact plane based on the distance ratio. Correspondence relationships between each distance ratio and depth or height of the ground contact plane are preliminarily stored as a correspondence table in the non-volatile storage medium. By referring to the correspondence table, the controller 30 obtains the depth or the height of the ground contact plane based on the distance ratio.

In the above-described example, a monocular camera is employed as the camera 205 of the aerial vehicle 200, but a stereo camera may be employed. In this case, the controller 30 may obtain the depth or the height of the ground contact plane of the shovel 100 with respect to the reference plane BP based on a pair of captured images output from the stereo camera.

Figure 23A:
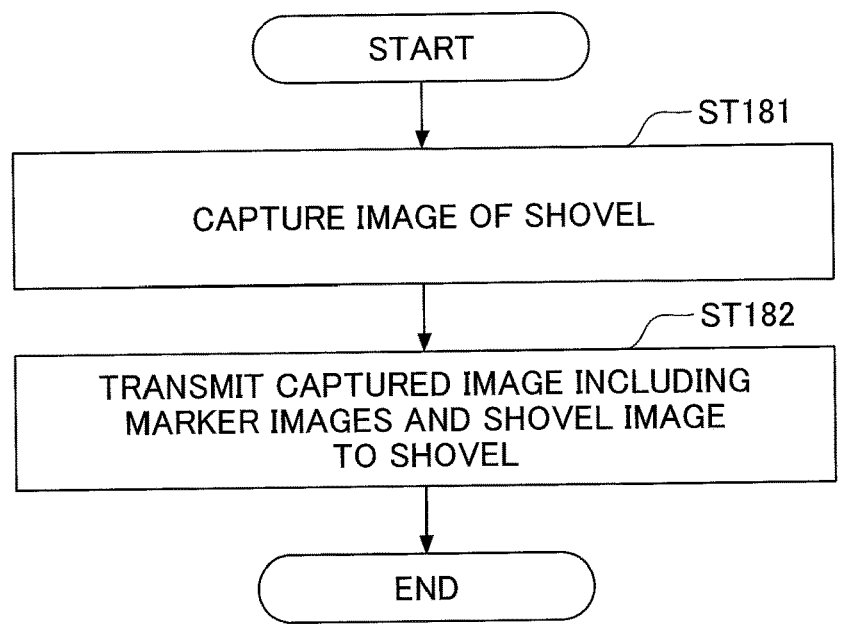
FIG. 23A is a flowchart illustrating an example of a machine guidance process.
Figure 23B:
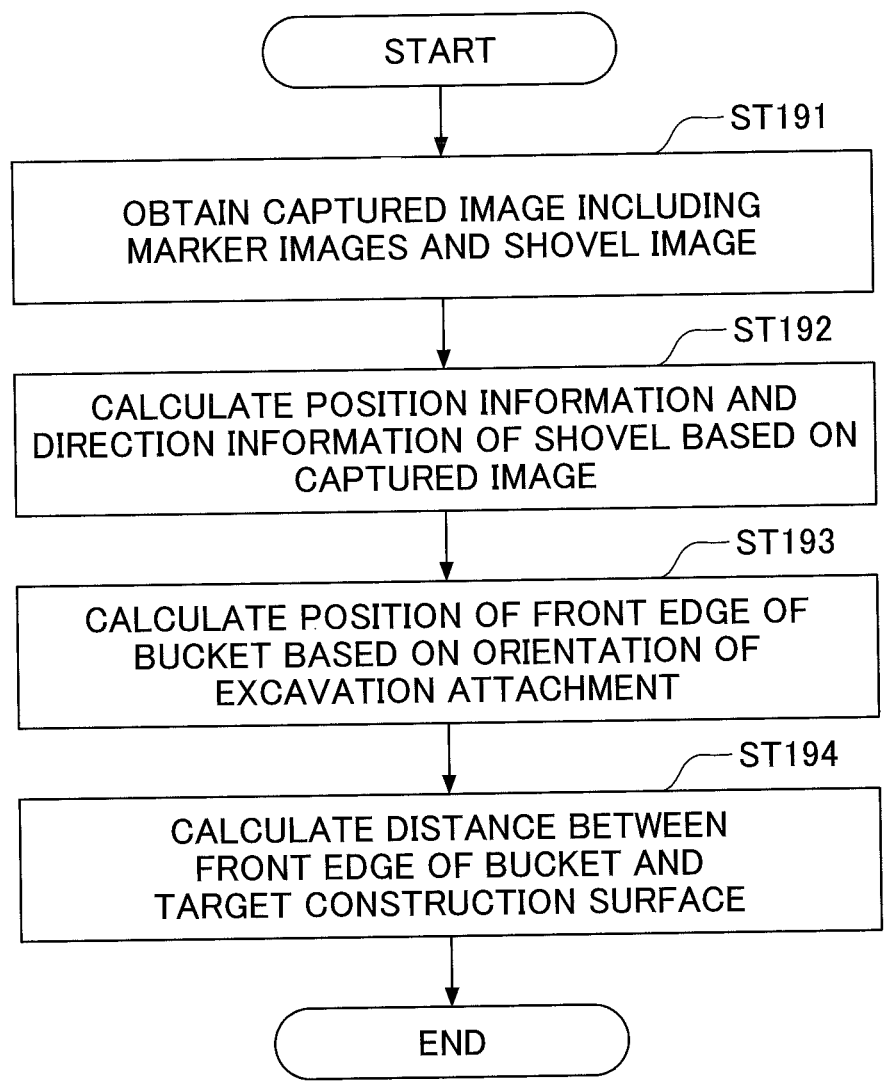
FIG. 23B is a flowchart illustrating the example of the machine guidance process.

Next, referring to FIGS. 23A and 23B, a process for performing the machine guidance function (hereinafter referred to as a "machine guidance process") by the work support system will be described. FIGS. 23A and 23B are flowcharts illustrating an example of the machine guidance process. To be more specific, FIG. 23A illustrates a process flow performed by the aerial vehicle 200. FIG. 23B illustrates a process flow performed by the shovel 100. The controller 201 of the aerial vehicle 200 repeatedly performs the process illustrated in FIG. 23A at predetermined control intervals. Similarly, the controller 30 of the shovel 100 repeatedly performs the process illustrated in FIG. 23B at predetermined control intervals. In the example of FIGS. 23A and 23B, by using an image processing technique, the aerial vehicle 200 follows the shovel 100 by autonomously flying directly above the shovel 100. However, the example below also applies to a case in which the aerial vehicle 200 is remotely operated by the pilot via the remote control 300.

First, the controller 201 of the aerial vehicle 200 captures an image of the shovel 100 (step ST181). For example, the controller 201 obtains an image captured by the camera 205 of the aerial vehicle 200 flying above the shovel 100. As illustrated in FIG. 21B, the captured image includes a shovel image, which is an image of the shovel 100, marker images MK1 and MK2, which are images of reference points RP1 and RP2, and marker images MK3 through MK5, which are images of the marks RP3 through RP5 placed on the upper turning body 3.

Next, the controller 201 transmits the captured image including the marker images MK1 through MK5 and the shovel image to the shovel 100 (step ST182).

The controller 30 of the shovel 100 obtains the captured image including the marker images MK1 through MK5 and the shovel image (step ST191). For example, the controller 30 receives, via the receiver S2, the captured image transmitted from the controller 201 of the aerial vehicle 200 to the shovel 100.

Next, the controller 30 calculates position information and direction information of the shovel 100 based on the captured image (step ST192). For example, by using the method explained with reference to FIGS. 21A through 22C, the controller 30 calculates an absolute position of the center point SC of the shovel 100 and calculates an orientation indicated by the longitudinal direction of the excavation attachment.

Next, the controller 30 calculates a position of the front edge of the bucket 6 based on an orientation of the excavation attachment (step ST193). For example, the controller 30 obtains an orientation of the excavation attachment based on an output from the orientation detecting device S4, and calculates a relative position of the front edge of the bucket 6 with respect to the center point SC of the shovel 100. Based on the relative position, the absolute position of the center point SC, and the orientation indicated by the longitudinal direction of the excavation attachment, the controller 30 calculates an absolute position of the front edge of the bucket 6.

Next, the controller 30 calculates a distance between the front edge of the bucket 6 and the target construction surface (step ST194). For example, the controller 30 calculates a distance between the target construction surface and the front edge of the bucket 6 by referring to the design data stored in the non-volatile storage medium. The controller 30 can graphically display transition of distance between the target construction surface and the front edge of the bucket 6 on the display device in the cabin 10 and present the same to the operator of the shovel 100 so as to guide the operator through the operation of the shovel.

Figure 24A:
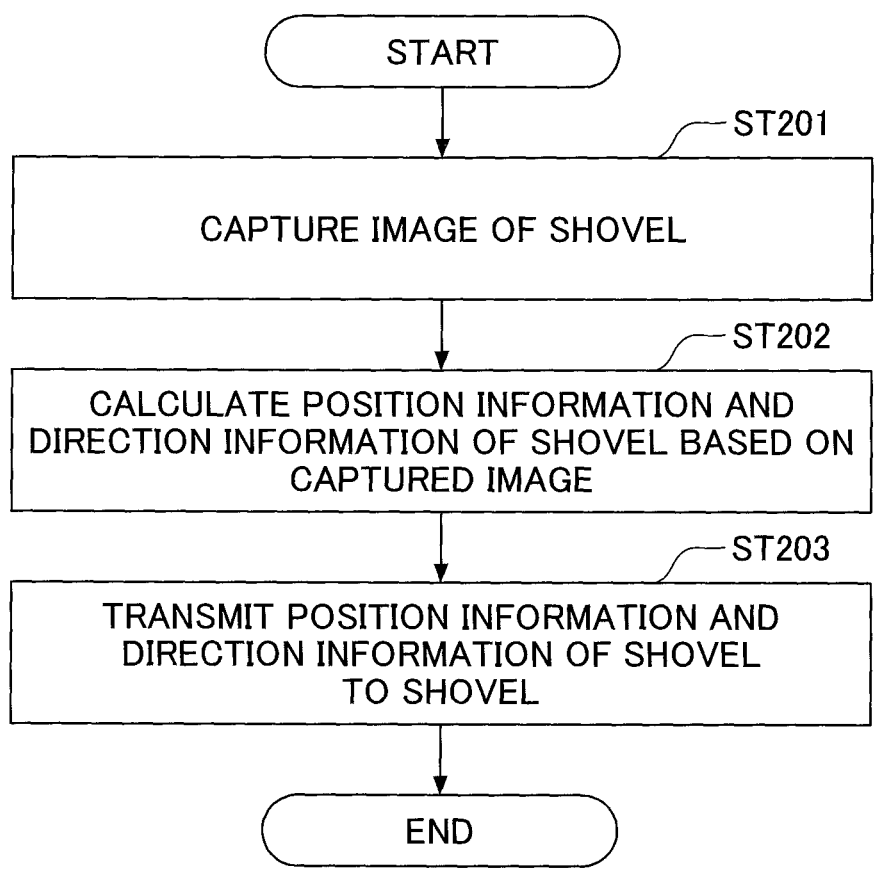
FIG. 24A is a flowchart illustrating another example of the machine guidance process.
Figure 24B:
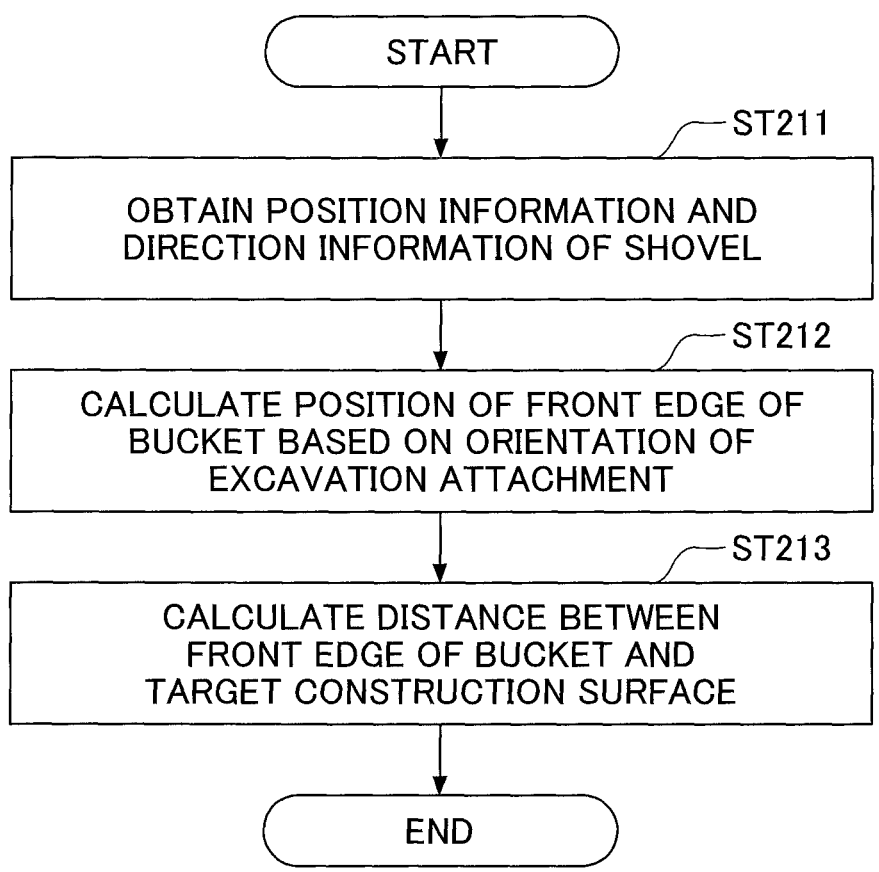
FIG. 24B is a flowchart illustrating another example of the machine guidance process.

Next, referring to FIGS. 24A and 24B, another example of the machine guidance process will be described. FIGS. 24A and 24B are flowcharts illustrating the example of the machine guidance process. Specifically, FIG. 24A illustrates a process flow performed by the aerial vehicle 200. FIG. 24B illustrates a process flow performed by the shovel 100.

The controller 201 of the aerial vehicle 200 repeatedly performs the process illustrated in FIG. 24A at predetermined control intervals. Similarly, the controller 30 of the shovel 100 repeatedly performs the process illustrated in FIG. 24B at predetermined control intervals. The example of FIGS. 24A and 24B differs from the example of FIGS. 23A and 23B in that the controller 201 of the aerial vehicle 200 calculates position information and direction information of the shovel 100. In the example of FIGS. 23A and 23B, the controller 30 of the shovel 100 calculates position information and direction information of the shovel 100.

First, the controller 201 of the aerial vehicle 200 captures an image of the shovel 100 (step ST201). For example, the controller 201 obtains an image captured by the camera 205 of the aerial vehicle 200 flying above the shovel 100. As illustrated in FIG. 21B, the captured image includes a shovel image, which is an image of the shovel 100, marker images MK1 and MK2, which are images of the reference points RP1 and RP2, and marker images MK3 through MK5, which are images of the marks RP3 through RP5 placed on the upper turning body 3.

Next, the controller 201 calculates position information and direction information of the shovel 100 based on the captured image (step ST202). For example, by using the method explained with reference to FIGS. 21A through 22C, the controller 30 calculates an absolute position of the center point SC of the shovel 100 and calculates an orientation indicated by the longitudinal direction of the excavation attachment.

Next, the controller 201 transmits the position information and the direction information of the shovel 100 to the shovel 100 (step ST203).

The controller 30 of the shovel 100 obtains the position information and the direction information of the shovel 100 (step ST211). For example, the controller 30 receives, via the receiver S2, the position information and the direction information of the shovel 100 transmitted from the controller 201 of the aerial vehicle 200 to the shovel 100.

Next, the controller 30 calculates a position of the front edge of the bucket 6 based on an orientation of the excavation attachment (step ST212). For example, the controller 30 obtains an orientation of the excavation attachment based on an output from the orientation detecting device S4, and calculates a relative position of the front edge of the bucket 6 with respect to the center point SC of the shovel 100. Based on the relative position, the absolute position of the center point SC, and the orientation indicated by the longitudinal direction of the excavation attachment, the controller 30 calculates an absolute position of the front edge of the bucket 6.

Next, the controller 30 calculates a distance between the front edge of the bucket 6 and the target construction surface (step ST213). For example, the controller 30 calculates a distance between the target construction surface and the front edge of the bucket 6 by referring to the design data stored in the non-volatile storage medium. The controller 30 can graphically display transition of distance between the target construction surface and the front edge of the bucket 6 on the display device in the cabin 10 and present the same to the operator of the shovel 100 so as to guide the operator through the operation of the shovel.

In the above described configuration, by using an image, including marker images, captured by the aerial vehicle 200, the controller 30 can perform the machine guidance function by identifying the position and the direction of the shovel 100 without using a positioning device such as a GNSS (GPS) receiver.

Figure 25A:
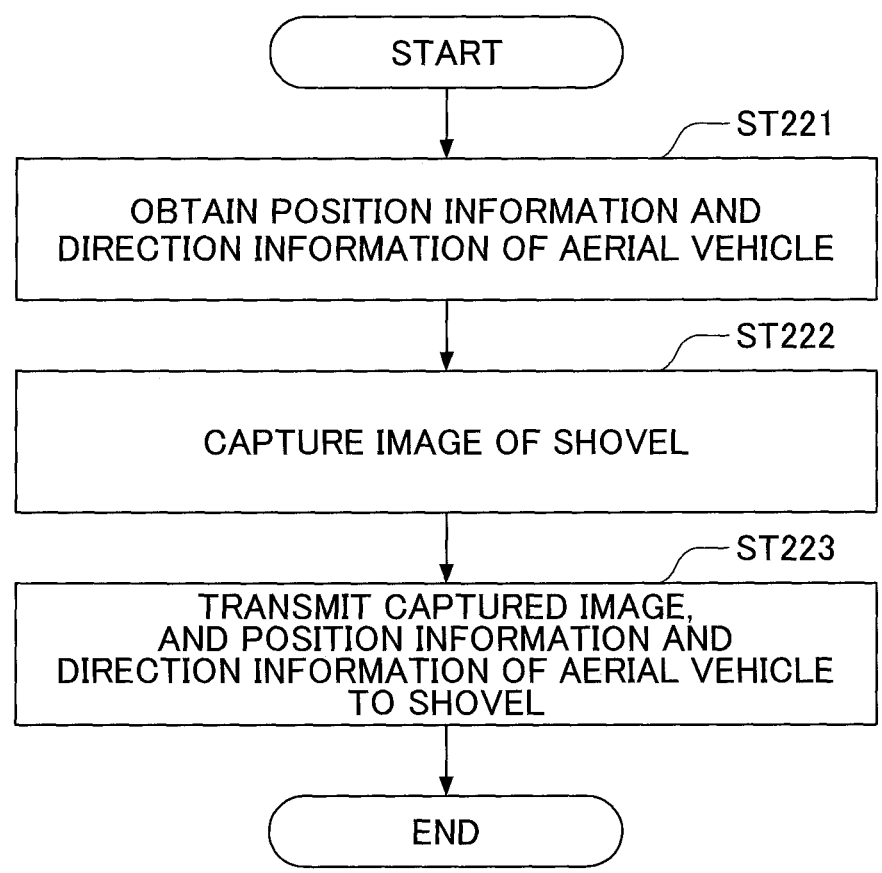
FIG. 25A is a flowchart illustrating yet another example of the machine guidance process.
Figure 25B:
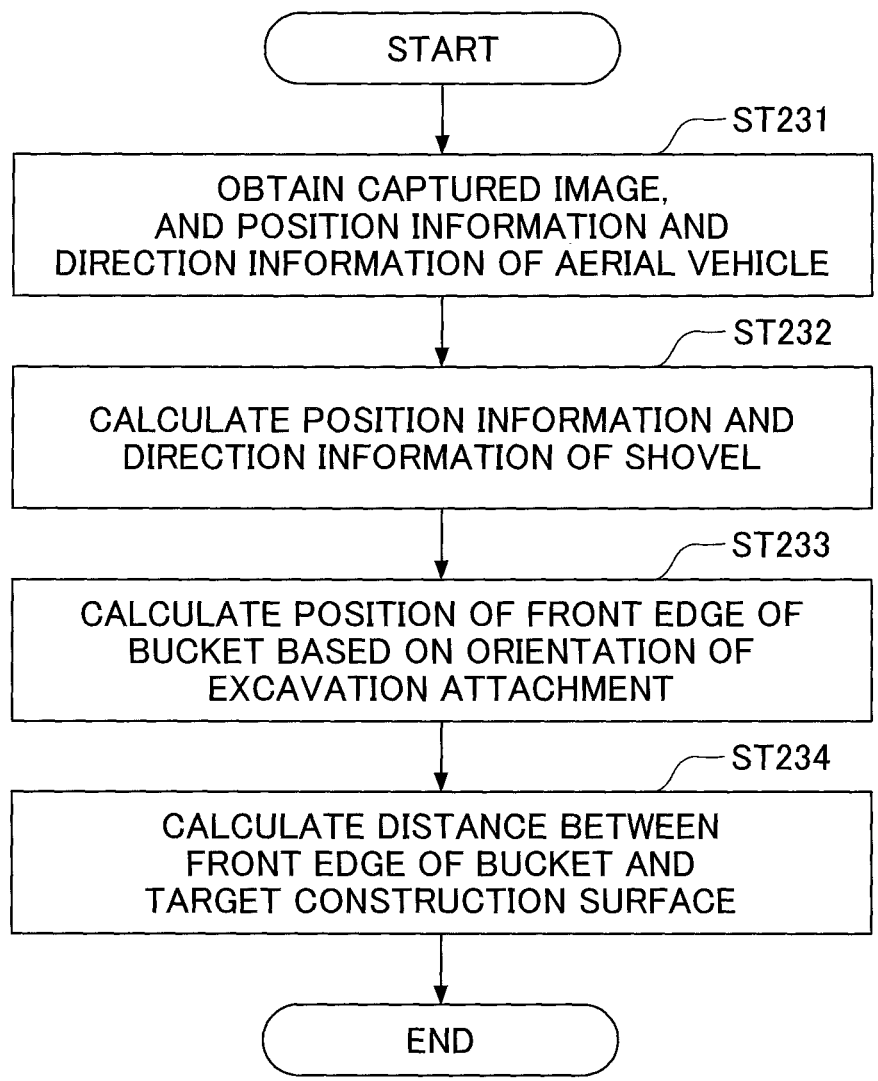
FIG. 25B is a flowchart illustrating yet another example of the machine guidance process.

Next, referring to FIGS. 25A and 25B, yet another example of the machine guidance process will be described. FIGS. 25A and 25B are flowcharts illustrating yet another example of the machine guidance process. Specifically, FIG. 25A illustrates a process flow performed by the aerial vehicle 200. FIG. 25B illustrates a process flow performed by the shovel 100. The controller 201 of the aerial vehicle 200 repeatedly performs the process illustrated in FIG. 25A at predetermined control intervals. Similarly, the controller 30 of the shovel 10 repeatedly performs the process illustrated in FIG. 25B at predetermined control intervals. The example of FIGS. 25A and 25B differs from the example of FIGS. 23A and 23B in that position information and direction information are calculated based on position information and direction information of the aerial vehicle 200, output from the autonomous flight device 204 of the aerial vehicle 200 that uses GPS navigation, and also based on a captured image. In the example of FIGS. 23A and 23B, the controller 30 of the shovel 100 uses a captured image including marker images MK1 and MK2, which are images of the reference points RP1 and RP2, to calculate position information and direction information of the shovel 100.

First, the controller 201 of the aerial vehicle 200 obtains position information and direction information of the aerial vehicle 200 (step ST221). For example, the controller 201 obtains position information and direction information of the aerial vehicle 200 based on outputs from various types of sensors such as the gyro-sensor, the acceleration sensor, the geomagnetic field sensor (orientation sensor), the atmospheric pressure sensor, the positioning sensor, and the ultrasonic sensor included in the flight control unit of the autonomous flight device 204.

Next, the controller 201 captures an image of the shovel 100 (step ST222). For example, the controller 201 obtains an image captured by the camera 205 of the aerial vehicle 200 flying above the shovel 100. As illustrated in FIG. 21B, the captured image includes a shovel image, which is an image of the shovel 100 and marker images MK3 through MK5, which are images of the marks RP3 through RP5 placed on the upper turning body 3. However, the captured image does not necessarily include marker images MK1 and MK2, which are images of reference points RP1 and RP2.

Next, the controller 201 transmits the captured image, and also the position information and the direction information of the aerial vehicle 200 to the shovel 100 (step ST223).

The controller 30 of the shovel 100 obtains the captured image and also obtains the position information and the direction information of the aerial vehicle 200 (step ST231). For example, the controller 30 receives, via the receiver S2, the captured image and also the position information and the direction information of the aerial vehicle 200 transmitted from the controller 201 of the aerial vehicle 200 to the shovel 100.

Next, the controller 30 calculates position information and direction information of the shovel 100 (step ST232). For example, the controller 30 calculates position information and direction information of the shovel 100 based on the captured image and also based on the position information and the direction information of the aerial vehicle 200.

To be more specific, based on the position information of the aerial vehicle 200, the controller 30 calculates an absolute position of a feature (center location) of real space corresponding to a center pixel of the captured image. Also, based on coordinates of the marker images MK3 through MK5 in the captured image, the controller 30 calculates coordinates of the center point SC of the shovel 100. Further, based on coordinates of the center pixel of the captured image, the controller 30 calculates a relative position of the center point SC with respect to the feature (center location). Based on the relative position of the center point SC and also based on the absolute position of the feature (center location), the controller 30 calculates an absolute position of the center point SC.

Further, based on the direction information of the aerial vehicle 200, the controller 30 obtains an orientation indicated by the vertical axis of the captured image. Also, as illustrated in FIG. 21B, based on the coordinates of the marker images MK3 through MK5, the controller 30 calculates a line segment L3, indicating the longitudinal direction of the excavation attachment, on the reference plane BP. Further, the controller 30 calculates an angle between the vertical axis of the captured image and the line segment L3.

Accordingly, based on the orientation of the vertical axis of the captured image, the controller 30 can obtain an orientation indicated by the longitudinal direction of the excavation attachment. Also, based on changes in orientation indicated by the longitudinal direction of the excavation attachment, the controller 30 can calculate a turning angle of the excavation attachment.

Next, the controller 30 calculates a position of the front edge of the bucket 6 based on an orientation of the excavation attachment (step ST233). For example, the controller 30 obtains an orientation of the excavation attachment based on an output from the orientation detecting device S4, and calculates a relative position of the front edge of the bucket 6 with respect to the center point SC of the shovel 100. Based on the relative position, the absolute position of the center point SC, and the orientation indicated by the longitudinal direction of the excavation attachment, the controller 30 calculates an absolute position of the front edge of the bucket 6.

Next, the controller 30 calculates a distance between the front edge of the bucket 6 and the target construction surface (step ST234). For example, the controller 30 calculates a distance between the target construction surface and the front edge of the bucket 6 by referring to the design data stored in the non-volatile storage medium. The controller 30 can graphically display transition of distance between the target construction surface and the front edge of the bucket 6 on the display device in the cabin 10 and present the same to the operator of the shovel 100 so as to guide the operator through the operation of the shovel.

In the above described configuration, the controller 30 can perform the machine guidance function by identifying the position and the direction of the shovel 100 based on position information and direction information of the aerial vehicle 200, which are output from the aerial vehicle 200 that uses GPS navigation, and also based on a captured image that does not include marker images corresponding to reference points.

Although the preferred embodiments of the present invention have been described above, the present invention is not limited to the above-described embodiments. Various modifications and variations may be made without departing from the scope of the present invention.

For example, in the above-described embodiments, the pilot causes the aerial vehicle 200 to fly above the work site by using the remote control 300. However, the present invention is not limited to the above-described configuration. For example, the aerial vehicle 200 may autonomously fly above the work site. For example, upon the operator of the shovel 100 pressing a predetermined button in the cabin 10, the aerial vehicle 200 standing by at a predetermined position may start autonomously flying above the work site.

Further, upon the pilot of the aerial vehicle 200 or the operator of the shovel 100 performing a predetermined operation, the aerial vehicle 200 may be released from following the shovel 100. Upon the aerial vehicle 200 being released from following the shovel 100, the aerial vehicle 200 may hover at a predetermined height or may return to a predetermined standby place, independently of the movement of the shovel 100.

Figure 26:
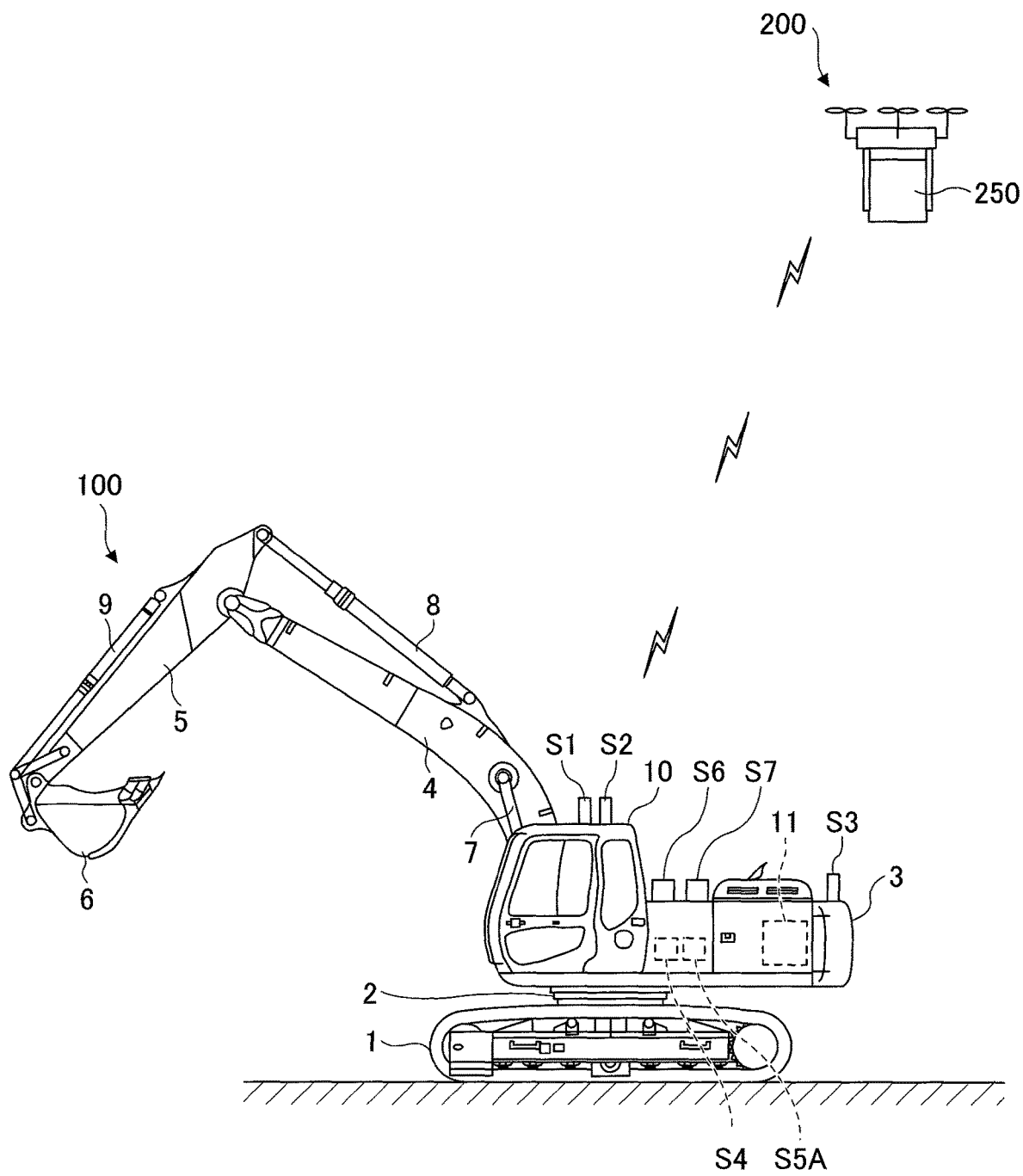
FIG. 26 is a drawing illustrating a work site in which a fluid supply system is used.
Figure 27:
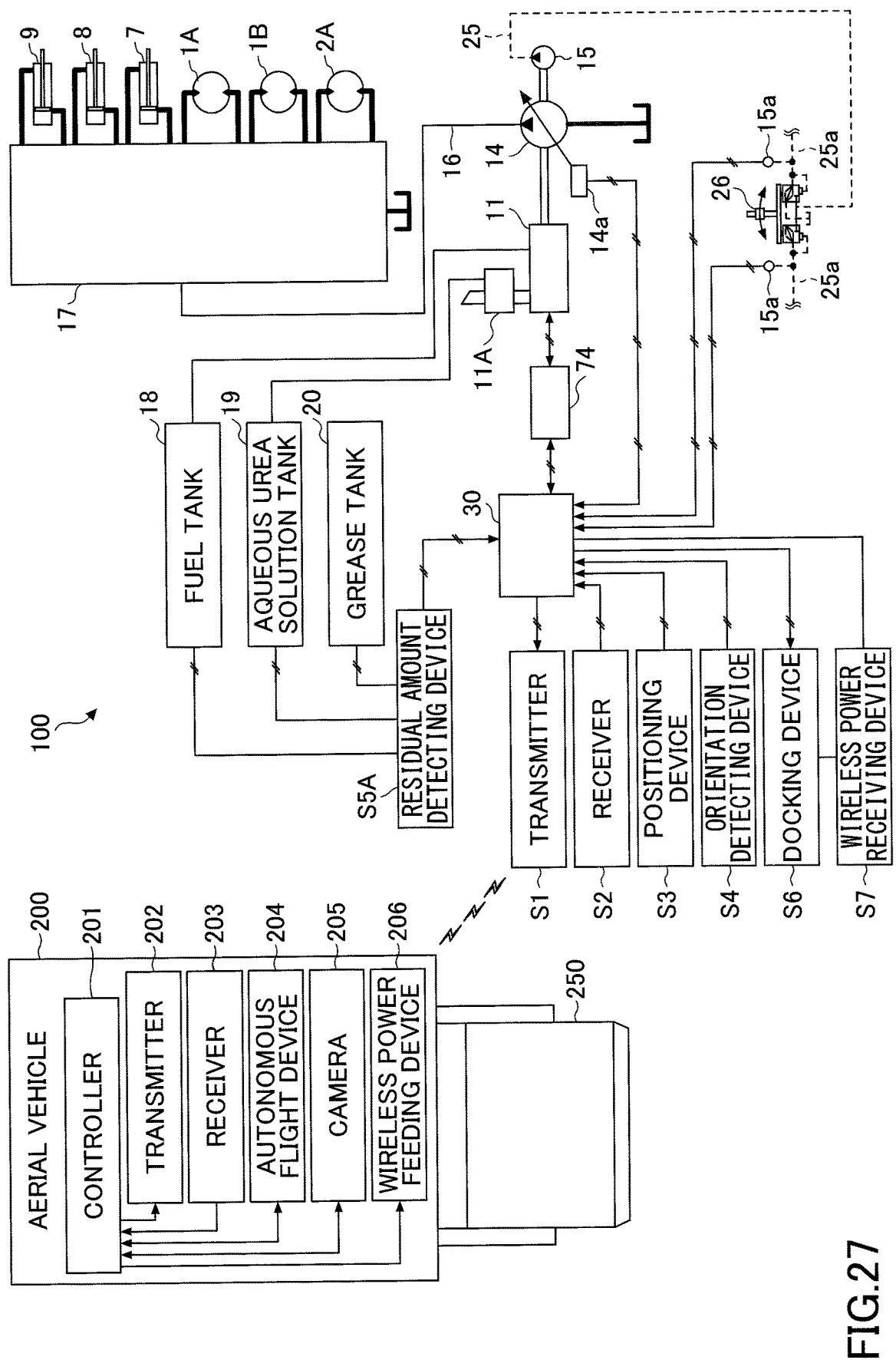
FIG. 27 is a system configuration diagram of the fluid supply system.

Next, referring to FIG. 26 and FIG. 27, a fluid supply system including a shovel (excavator) 100 and an aerial vehicle 200 according to another embodiment will be described. FIG. 26 is a drawing illustrating a work site in which the fluid supply system is used. FIG. 27 is a system configuration diagram of the fluid supply system.

The fluid supply system is a system that uses an aerial vehicle to effectively supply fluids consumed by a shovel. The fluid supply system is mainly configured with the shovel 100 and the aerial vehicle 200. The shovel 100 configuring the fluid supply system may be a single shovel or a plurality of shovels, and the aerial vehicle 200 configuring the fluid supply system may be a single aerial vehicle or a plurality of aerial vehicles. The example of FIG. 26 and FIG. 27 includes the single shovel 100 and the single aerial vehicle 200.

The aerial vehicle 200 is an autonomous aerial vehicle that can fly under remote control or under autopilot.

Examples of the aerial vehicle 200 include a multicopter and an airship. In the present embodiment, the aerial vehicle 200 is a quadcopter having a camera mounted.

The aerial vehicle 200 is configured to carry a container 250. The container 250 is a container that stores fluids consumed by the shovel 100. In the present embodiment, the container 250 has an approximately cylindrical shape. The fluids consumed by the shovel 100 includes fuel such as diesel fuel, a liquid reducing agent such as an aqueous urea solution, grease, lubricating oil, coolant, or engine oil.

An upper turning body 3 is rotatably mounted on a lower traveling body 1 of the shovel 100 via a turning mechanism 2. A boom 4 is mounted on the upper turning body 3. An arm 5 is attached to the end of the boom 4, and a bucket 6 is attached to the end of the arm 5. The boom 4, the arm 5, and the bucket 6 form an excavation attachment as an example of an attachment. A cabin 10 is mounted on the upper turning body 3. The boom 4, the arm 5, and the bucket 6 are hydraulically driven by a boom cylinder 7, an arm cylinder 8, and a bucket cylinder 9, respectively. A cabin 10 is mounted on the upper turning body 3 and power sources such as an engine 11 are also mounted on the upper turning body 3.

The shovel 100 includes an engine 11, a main pump 14, a pilot pump 15, a control valve 17, a fuel tank 18, an aqueous urea solution tank 19, a grease tank 20, an operating unit 26, a controller 30, and an engine control unit 74.

The engine 11 is a driving source of the shovel 100. The engine 11 is, for example, a diesel engine operated at a predetermined rotation speed. An output shaft of the engine 11 is connected to an input shaft of the main pump 14 and an input shaft of the pilot pump 15.

Exhaust gas from the engine 11 is released to the air after being purified by an exhaust gas processing device 11A. In the present embodiment, the exhaust gas processing device 11A includes a diesel particulate filter (DPF) and a selective catalytic reduction (SCR) system.

The main pump 14 is a variable volume swash plate type hydraulic pump configured to supply hydraulic oil to the control valve 17 via a high-pressure hydraulic line 16. The discharge flow rate of the main pump 1 per rotation changes according to the change in an inclination angle of a swash plate.

The inclination angle of the swash plate is controlled by a regulator 14a. The regulator 14a changes the inclination angle of the swash plate according to the change in controlled electric current from the controller 30.

The pilot pump 15 is a fixed volume hydraulic pump configured to supply hydraulic oil to various types of hydraulic control units such as the operating unit 26 via a pilot line 25.

The control valve 17 is a set of flow rate control valves that control the flow of hydraulic oil supplied to hydraulic actuators. The control valve 17 selectively supplies hydraulic oil, received from the main pump 14 via the high-pressure hydraulic line 16, to the one or more hydraulic actuators in accordance with the change in pilot pressure that corresponds to an operation direction and an operation amount of the operating unit 26. The hydraulic actuator includes, for example, the boom cylinder 7, the arm cylinder 8, the bucket cylinder 9, a left-side traveling hydraulic motor 1A, a right-side traveling hydraulic motor 1B, and a turning hydraulic motor 2A.

The fuel tank 18 is a tank that stores fuel. In the present embodiment, the fuel tank 18 stores diesel fuel used by the engine 11.

The aqueous urea solution tank 19 is a tank that stores aqueous urea solutions as liquid reducing agents. In the present embodiment, the aqueous urea solution tank 19 stores aqueous urea solutions used by the selective catalytic reduction system.

The grease tank 20 is a tank that stores grease. In the present embodiment, the grease tank 20 stores grease for lubricating moving parts.

An operating unit 26 is used by an operator of the shovel 100 to operate the hydraulic actuators. The operating unit 26 generates pilot pressure upon receiving supply of hydraulic oil from the pilot pump via the pilot line 25. The operating unit 26 applies the pilot pressure to each pilot port of the corresponding flow rate control valve via a pilot line 25a. The pilot pressure changes in accordance with an operation direction and an operation amount of the operating unit 26. The pilot pressure sensor 15a detects pilot pressure and outputs a detection value to the controller 30.

The controller 30 is a control unit that controls the shovel 100. In the present embodiment, the controller 30 is configured with a computer including a CPU, random access memory (RAM), and read-only memory (ROM). The CPU of the controller 30 reads programs corresponding to various types of functions from the ROM and loads the programs into the RAM so as to execute the functions corresponding to the respective programs.

The engine control unit 74 is a device that controls the engine 11. The engine control unit 74 controls the amount of fuel injection such that the rotation speed of the engine set through an input device is achieved.

The transmitter S1, the receiver S2, the positioning device S3, the orientation detecting device S4, a residual amount detecting device S5A, and a docking device S6 mounted on the upper turning body 3 are each connected to the controller 30. The controller 30 performs computation based on information output from each of the receiver S2, the positioning device S3, the orientation detecting device S4, and the residual amount detecting device S5A. The controller 30 causes the transmitter S1 to transmit information generated based on a computation result to the outside, or the controller 30 activates the docking device S6 based on the generated information.

The transmitter S1 transmits information to the outside of the shovel 100. In the present embodiment, in response to a request from the aerial vehicle 200, the transmitter S1 transmits, to the aerial vehicle 200, information that can be received by the aerial vehicle 200.

The receiver S2 receives information transmitted from the outside of the shovel 100. In the present embodiment, the receiver S2 receives information transmitted from the aerial vehicle 200.

The positioning device S3 obtains information related to a position of the shovel 100. In the present embodiment, the positioning device S3 is a Global Navigation Satellite System (GNSS) (Global Positioning System (GPS)) receiver and measures latitude, longitude, and altitude of the current position of the shovel 100.

The orientation detecting device S4 detects an orientation of the shovel. The orientation of the shovel is, for example, a degree of inclination of a body. In the present embodiment, the orientation detecting device S4 includes a body inclination angle sensor. The body inclination angle sensor is a sensor that obtains a body inclination angle. For example, the body inclination angle sensor is an acceleration sensor that detects an inclination angle of the upper turning body 3 relative to a horizontal plane.

The residual amount detecting device S5A detects residual amounts of various types of fluids. In the present embodiment, the residual amount detecting device S5A detects a residual amount of diesel fuel in the fuel tank 18, a residual amount of an aqueous urea solution in the aqueous urea solution tank 19, and a residual amount of grease in the grease tank 20.

The docking device S6 allows the shovel 100 to be docked (connected) to the aerial vehicle 200. In the present embodiment, the docking device S6 allows the fuel tank 18 mounted on the shovel 100 to be connected to the container 250 carried by the aerial vehicle 200. To be more specific, in response to a command from the controller 30, the docking device S6 switches between a docking enabled state that structurally allows the fuel tank 18 to be connected to the container 250 and a docking disabled state that does not structurally allow the fuel tank 18 to be connected to the container 250.

A wireless power receiving device S7 receives power from an external power feeding device in a contactless manner, and supplies the power to electric loads mounted on the shovel 100. In the present embodiment, the wireless power receiving device S7 receives power from a battery mounted on the aerial vehicle 200 in a contactless manner, and activates the controller 30, the transmitter S1, the receiver S2, the orientation detecting device S4, and the docking device S6. The wireless power receiving device S7 may charge the battery mounted on the shovel 100.

The aerial vehicle 200 is configured with a controller 201, a transmitter 202, a receiver 203, an autonomous flight device 204, a camera 205, and a wireless power feeding device 206, for example.

The controller 201 is a control unit that controls the aerial vehicle 200. In the present embodiment, the controller 201 is configured with a computer including RAM and ROM. A CPU of the controller 201 reads programs corresponding to various types of functions from the ROM and loads the programs into the RAM, so as to execute the functions corresponding to the respective programs.

The transmitter 202 transmits information to the outside of the aerial vehicle 200. In the present embodiment, the transmitter 202 transmits information that can be received by the shovel 100.

The receiver 203 receives information transmitted from the outside of the aerial vehicle 200. For example, the receiver 203 receives information transmitted from the shovel 100.

The autonomous flight device 204 is a device that achieves autonomous flight of the aerial vehicle 200. In the present embodiment, the autonomous flight device 204 includes a flight control unit, an electric motor, and a battery. The flight control unit includes various types of sensors such as a gyro-sensor, an acceleration sensor, geomagnetic field sensor (orientation sensor), an atmospheric pressure sensor, a positioning sensor, and an ultrasonic sensor. The flight control unit implements an orientation maintaining function, an altitude maintaining function, and the like. The electric motor rotates propellers upon receiving power supplied from the battery. However, the propellers may be rotated by other driving sources such as an internal combustion engine.

The autonomous flight device 204 moves the aerial vehicle 200 to a target flight position by separately controlling rotational speeds of the four propellers while maintaining the orientation and the altitude of the aerial vehicle 200. The information related to the target flight position includes, for example, latitude, longitude, and altitude of the target flight position. For example, the controller 201 obtains information related to the target flight position from the outside through the receiver 203. The autonomous flight device 204 may change the direction of the aerial vehicle 200 upon receiving information related to a target direction from the controller 201.

The camera 205 is a device that obtains an image. In the present embodiment, the camera 205 is attached to the aerial vehicle 200 such that an image vertically below the aerial vehicle 200 is captured. The image captured by the camera 205 includes information related to an imaging position that is a flight position of the aerial vehicle 200, and is used to generate three-dimensional topographic data.

The wireless power feeding device 206 supplies power from the battery mounted on the aerial vehicle 200 to an external power receiving device in a contactless manner. In the present embodiment, the wireless power feeding device 206 wirelessly supplies power to the wireless power receiving device S7 disposed on the upper surface of the shovel 100, and causes the various types of electric loads to operate by using the power.

Figure 28A:
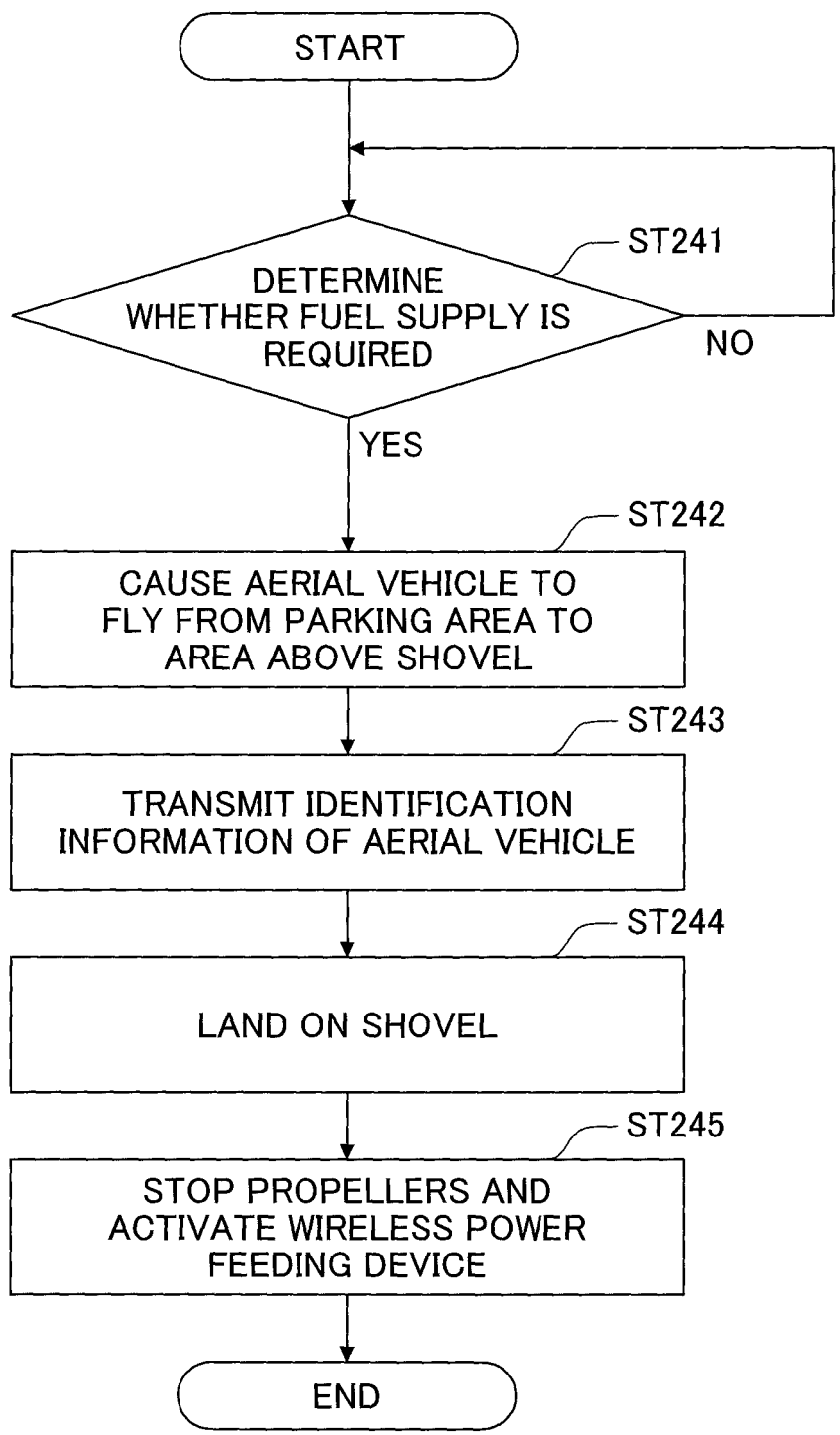
FIG. 28A is a flowchart illustrating a process flow performed before fuel supply.
Figure 28B:
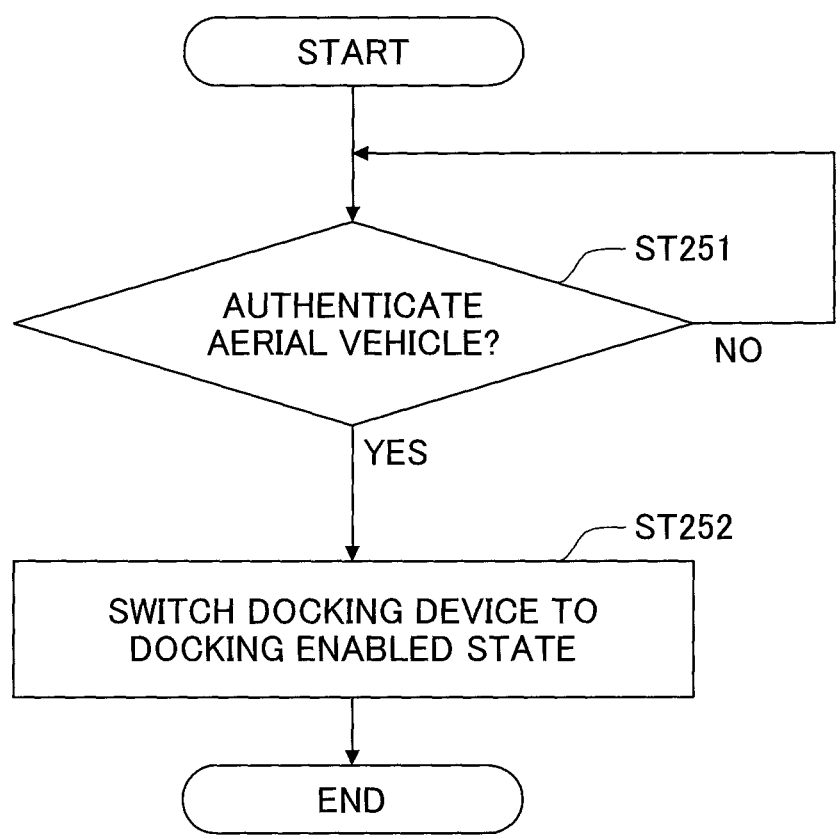
FIG. 28B is a flowchart illustrating a process flow performed before fuel supply.

Next, referring to FIGS. 28A and 28B, functions of the fluid supply system will be described. FIGS. 28A and 28B illustrate a process before the fluid supply system starts supplying fuel (hereinafter referred to as a "process performed before supplying fuel"). FIG. 28A is a flowchart illustrating a process flow performed by the aerial vehicle 200. FIG. 28B is a flowchart illustrating a process flow performed by the shovel 100.

The process performed before supplying fuel illustrated in FIGS. 28A and 28B is applied to a case where fuel is supplied to the fuel tank 18, and is also applied similarly to cases where an aqueous urea solution is supplied to the aqueous urea solution tank 19 and grease is supplied to the grease tank 20.

First, referring to FIG. 28A, the process flow performed by the aerial vehicle 200 will be described. Based on information transmitted from the shovel 100, the aerial vehicle 200 parked in a parking area determines whether fuel supply is required (step ST241). The parking area is an area where charging equipment for the aerial vehicle 200 is placed. In the parking area, fuel is injected into the container 250. Fuel injection may be automatically conducted or manually conducted. In the parking area, a parking space may be assigned to the aerial vehicle 200. Also, when the aerial vehicle 200 is parked in the parking space, charging may be automatically started.

The information transmitted from the shovel 100 includes information related to position information of the shovel and a residual amount of fuel. For example, the shovel 100 automatically transmits information related to position information of the shovel and a residual amount of fuel when the engine 11 is stopped by the operator. Body inclination information related to body inclination angles may also be included. In the present embodiment, the controller 201 of the aerial vehicle 200 determines whether fuel supply is required based on residual amount information transmitted from the shovel 100. To be more specific, the controller 201 uses the receiver 203 to receive information transmitted from the shovel 100. The controller 201 may receive the information directly from the shovel 100 or may receive the information indirectly via a communications center. When the residual amount information of fuel stored in the fuel tank 18 is less than a predetermined amount, the controller 201 determines that fuel supply is required. When the residual amount information of fuel is greater than or equal to the predetermined amount, the controller 201 determines that fuel supply is not required.

When it is determined that fuel supply is not required (no in step ST241), the controller 201 waits until receiving the next information from the shovel 100.

When it is determined that fuel supply is required (yes in step ST241), the controller 201 causes the aerial vehicle 200 to fly from the parking area to an area above the shovel 100 (step ST242).

When the aerial vehicle 200 flies above the shovel 100, the controller 201 transmits identification information of the aerial vehicle 200 (step ST243). For example, the controller 201 causes the transmitter 202 to transmit identification information of the aerial vehicle 200 to the receiver S2, and causes the controller 30 to authenticate the aerial vehicle 200.

Subsequently, the controller 201 causes the aerial vehicle 200 to land on the shovel 100 (step ST244). In the present embodiment, based on an image captured by the camera 205, the controller 201 identifies an image of the docking device S6 corresponding to the fuel tank 18 placed on the upper surface of the shovel 100.

Next, the controller 201 controls a flight position of the aerial vehicle 200 such that the identified image of the docking device S6 is displayed at a predetermined position of the captured image and the displayed image of the docking device S6 becomes gradually larger in size. As a result, the aerial vehicle 200 gradually approaches the docking device S6 and lands on the docking device S6.

The controller 201 may determine whether a landing is possible before the aerial vehicle 200 lands on the docking device S6. For example, when the engine 11 of the shovel 100 is being operated, the controller 201 may determine a landing is not possible. In order to determine whether the engine 11 is operated, the receiver 203 may receive information periodically transmitted from the transmitter S1 of the shovel 100 and the controller 201 may determine whether the engine 11 is operated based on the received information. For example, when the shovel 100 is determined to be in operation, the controller 30 may cause the transmitter S1 to transmit a command for prohibiting docking. Further, when the controller 201 determines that the shovel 100 is inclined based on body inclination information transmitted from the shovel 100, the controller 201 may determine that a landing is not possible. For example, when the controller 30 determines that the shovel 100 is located on a level surface based on an output from the orientation detecting device S4, the controller 30 may cause the transmitter S1 to transmit a command for permitting a landing. Conversely, when the controller 30 determines that the shovel 100 is not located on a level surface, the controller 30 may cause the transmitter S1 to transmit a command for prohibiting a landing. In this case, when the body inclination angle is less than a predetermined angle, the controller 201 may determine that the shovel 100 is located on a level surface. Alternatively, when the controller 30 determines that the shovel 100 is inclined based on an inclination angle of the shovel 100 calculated from a captured image, the controller 201 may determine that a landing is not possible. In this case, when the inclination angle of the shovel 100 is less than the predetermined angle, the controller 201 may determine that the shovel 100 is inclined. When the controller 201 determines that a landing is not possible, the controller 201 may cause the aerial vehicle 200 to return to the parking area, or may cause the aerial vehicle 200 to hover above the shovel 100 and stand by until the controller 201 determines that the landing is possible.

Upon the aerial vehicle 200 landing on the docking device S6, the controller 201 stops rotation of the propellers and activates the wireless power feeding device 206 (step ST245). Whether the aerial vehicle 200 has landed is determined based on, for example, an output from the acceleration sensor attached to the aerial vehicle 200.

The wireless power feeding device 206 supplies power from the battery mounted on the aerial vehicle 200 to the wireless power receiving device S7 of the shovel 100 in a contactless manner, and activates the controller 30 of the shovel 100 and the receiver S2.

The controller 201 may transmit identification information of the aerial vehicle 200 after the aerial vehicle 200 lands on the docking device S6. Further, when the controller 30 of the shovel 100 and the receiver S2 are already operated by power supplied from the battery mounted on the shovel 100, the controller 201 does not necessarily activate the wireless power feeding device 206.

Next, referring to FIG. 28B, the process flow performed by the shovel 100 will be described. Upon the controller 30 of the shovel 100 being activated by the power from the battery mounted on the aerial vehicle 200, the controller 30 of the shovel 100 authenticates the aerial vehicle 200 (step ST251).

When the aerial vehicle 200 is not authenticated as an authorized aerial vehicle (no in step ST251), the controller 30 waits without performing the process as of step ST251. The authorized aerial vehicle is an aerial vehicle having identification information that is preliminarily registered in the memory of the controller 30, for example. When the aerial vehicle 200 is not authenticated as an authorized aerial vehicle even after authentication is repeatedly attempted at a predetermined number of times, the controller 30 may stop the operation of the aerial vehicle. This is to prevent an unauthorized (unregistered) aerial vehicle from being supplied with fuel. In this configuration, the controller 30 can prevent an unauthorized (unregistered) aerial vehicle from being connected to the shovel 100.

When the aerial vehicle 200 is authenticated as an authorized aerial vehicle (yes in step ST251), the controller 30 switches the docking device S6 from the docking disabled state to the docking enabled state (step ST252).

Alternatively, the controller 30 may transmit identification information of the shovel 100 to the receiver 203 of the aerial vehicle 200 such that the controller 201 authenticates the shovel 100. In this case, when the controller 201 authenticates the shovel 100 as an authorized (registered) shovel, the controller 201 sends an authentication completion signal to the controller 30. The controller 30 waits until receiving the authentication completion signal without performing the process as of step ST251. Upon receiving the authentication completion signal, the controller 30 switches the docking device S6 from the docking disabled state to the docking enabled state.

Further, after the fuel tank 18 is connected to the container 250, the controller 30 may transmit, from the transmitter S1 to the aerial vehicle 200, a supply start command for starting supplying fuel. For example, the controller 30 may transmit the supply start command from the transmitter S1 to the aerial vehicle 200 when the docking device S6 is switched to the docking enabled state.

Figure 29A:
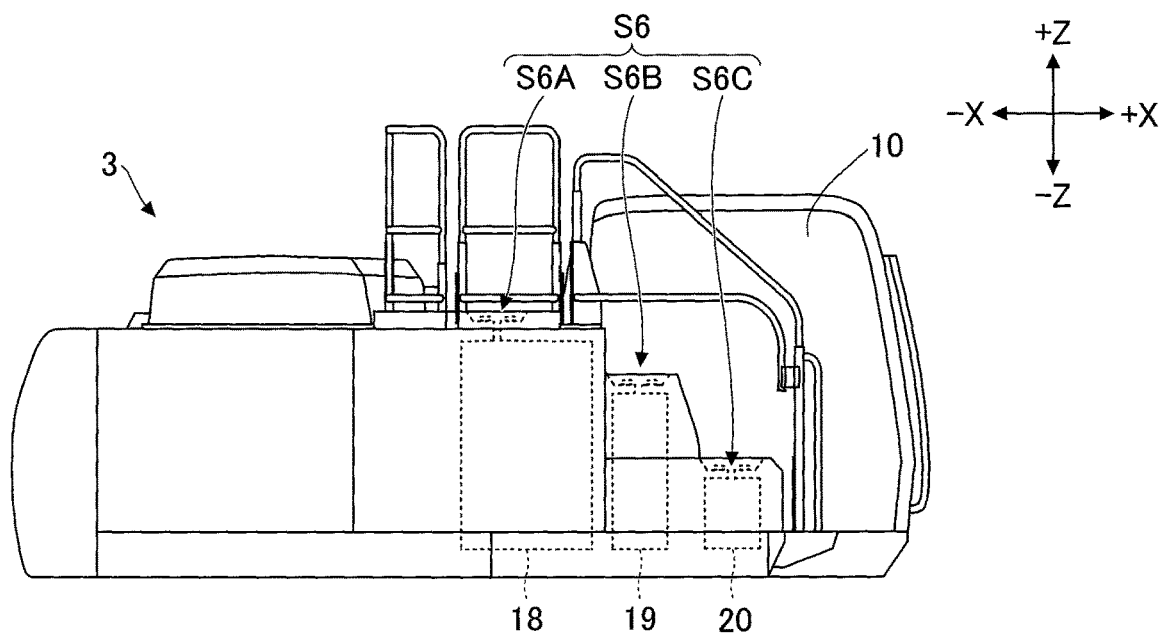
FIG. 29A is a drawing illustrating an upper turning body on which a docking device is arranged.
Figure 29B:
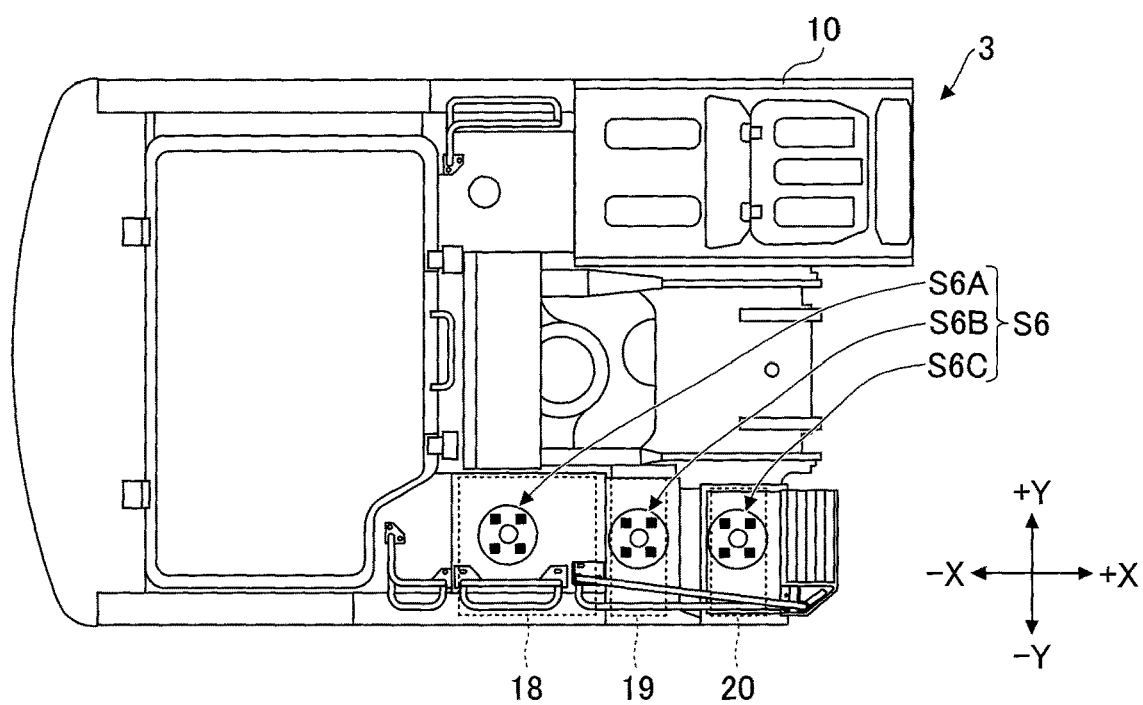
FIG. 29B is a drawing illustrating the upper turning body on which the docking device is arranged.

Next referring to FIGS. 29A and 29B, arrangement of the docking device S6 will be described. FIGS. 29A and 29B are drawings illustrating the arrangement of the docking device S6 on the upper turning body 3. FIG. 29A is a side view of the upper turning body 3. FIG. 29B is a top view of the upper turning body 3.

In the example of FIGS. 29A and 29B, the docking device S6 includes a docking device for fuel S6A corresponding to the fuel tank 18, a docking device for aqueous urea solutions S6B corresponding to the aqueous urea solution tank 19, and a docking device for grease S6C corresponding to the grease tank 20.

The fuel tank 18, the aqueous urea solution tank 19, and the grease tank 20 are disposed on the +X side (front side) of the upper turning body 3 and also on the −Y side of the cabin 10 across the boom mounting position. Further, the aqueous urea solution tank 19 is disposed on the +X side (front side) of the fuel tank 18 and the grease tank 20 is disposed on the +X side (front side) of the aqueous urea solution tank 19.

The docking devices S6A through S6C are each disposed on the top of the corresponding tank. This arrangement is to allow fluid in the container 250 to flow into the corresponding tank by the force of gravity when the container 250 carried by the aerial vehicle 200 is connected to the corresponding tank. The fluid in the container 250 may also be injected into the corresponding tank by using a pump mounted on the shovel 100 or the aerial vehicle 200.

In the present embodiment, the docking device S6 is configured to be recessed from the upper surface of the upper turning body 3. However, the docking device S6 may be configured to project from the upper surface of the upper turning body 3.

Next, referring to FIGS. 30A1 through 30B2, an operation of the docking device S6 will be described. FIGS. 30A1 through 30B2 illustrate the operation of the docking device S6. FIG. 30A1 and FIG. 30A2 illustrate the docking device S6 in the docking disabled state. FIG. 30B1 and FIG. 30B2 illustrate the docking device S6 in the docking enabled state. FIG. 30A1 and FIG. 30B1 are top views of the docking device S6. FIG. 30A2 and FIG. 30B2 are cross-sectional views of the docking device S6. FIG. 30A2 is a vertical cross-sectional view taken along a long-dash short-dash line L1 of FIG. 30A1. FIG. 30B2 is a vertical cross-sectional view taken along a long-dash short-dash line L2 of FIG. 30B1.

In the example of FIGS. 30A1 through 30B2, the docking device S6 is configured with a container receiving portion 60, a base 61, a coupling portion 62, and the like.

The container receiving portion 60 is a member that forms a recessed space having an inverted truncated cone shape and receiving the container 250 carried by the aerial vehicle 200. The inverted truncated cone has approximately the same inclination as that of a chamfered portion 250t formed at the bottom edge of the container 250 having an approximately cylindrical shape.

The base 61 supports the bottom surface of the container 250 within the container receiving portion 60. In the present embodiment, the base 61 has four movable base members 61A through 61D. The movable base members 61A through 61D are configured to be extendable in a Z-axis direction (in a vertical direction). The movable base members 61A through 61D are driven by an electric actuator. When the docking device S6 is in the docking disabled state, the movable base members 61A through 61D are in an extended state as illustrated in FIG. 30A2. When the docking device S6 is in the docking enabled state, the movable base members 61A through 61D are in a contracted state as illustrated in FIG. 30B2. In FIG. 30A1 and FIG. 30A2, the movable base members 61A through 61D that are in the extended state are colored in white. In FIG. 30B2, the movable base members 61A and 61B that were in the extended state are indicated by dashed lines.

The coupling portion 62 is a member that couples to a coupling portion 251 of the container 250. In the present embodiment, the coupling portion is a cylindrical member extending in a +Z direction (vertically upward) from the upper surface of the fuel tank 18 (see FIGS. 29A and 29B). As illustrated in FIG. 30A2, the coupling portion 251 is a cylindrical member that projects from the bottom surface of the container 250 in a −Z direction (vertically downward). When the coupling portion 62 and the coupling portion 251 are coupled to each other, a passage of fuel flowing from the container 250 to the fuel tank 18 is formed.

To be more specific, the coupling portion 62 is configured with an inflow prevention portion 62A, a central pin 62B, a circular portion 62C, and a cylindrical portion 62D. The inflow prevention portion 62A is a disc-shaped member that prevents fluid from entering the fuel tank 18 from the outside. The inflow prevention portion 62A makes contact with the circular portion 62C by being pushed in the +Z direction (upward) along the central pin 62B inside the cylindrical portion 62D by the force of a spring, so as to prevent fluid from flowing into the fuel tank 18 from the outside.

The central pin 62B is a fixed pin extending along the central axis of the cylindrical portion 62D. The central pin 62B extends into a central portion of the inflow prevention portion 62A.

The circular portion 62C is a member formed inside the cylindrical portion 62D. The circular portion 62C defines an upper limit position of the inflow prevention portion 62A. The inflow prevention portion 62A may be fixed by an electric stopper at the upper limit position. For example, the electric stopper is configured to fix the inflow prevention portion 62A at the upper limit position when not receiving power supply, and is configured to move (downward) the inflow prevention portion 62A from the upper limit position when receiving power supply.

The cylindrical portion 62D is a tubular member that forms a flow passage of fuel and extends to the upper surface of the fuel tank 18. The flow passage formed by the cylindrical portion 62D leads to the inside of the fuel tank 18.

The coupling portion 251 is configured with an outflow prevention portion 251A, a circular portion 251B, and a cylindrical portion 251C. The outflow prevention portion 251A is a disc-shaped member that prevents fluid from flowing out of the container 250 to the outside. The outflow prevention portion 251A makes contact with the circular portion 251B by being pushed in the −Z direction (downward) inside the cylindrical portion 251C by the force of a spring, so as to prevent fuel from flowing out of the container 250 to the outside.

Unless the outflow prevention portion 251A makes contact with the central pin 62B and is pushed upward by the central pin 62B, the outflow prevention portion 251A is in contact with the circular portion 251B so as to prevent fuel from flowing out. Upon the outflow prevention portion 251A being pushed upward by the central pin 62B, the outflow prevention portion 251A separates from the circular portion 251B, causing fuel to flow out.

The circular portion 251B is a member formed inside the cylindrical portion 251C. The circular portion 251B defines a lower limit position of the outflow prevention portion 251A. The outflow prevention portion 251A may be fixed by an electric stopper at the lower limit position. For example, the electric stopper is configured to fix the outflow prevention portion 251A at the lower limit position when not receiving power supply, and is configured to move (move upward) the outflow prevention portion 251A from the lower limit position when receiving power supply. For example, only when a supply start command is received from the shovel 100, the controller 201 may activate the electric stopper and start supplying fuel. Namely, the controller 201 keeps the outflow prevention portion 251A at the lower limit position until receiving the supply start command from the shovel 100. Accordingly, it is possible to prevent fuel from being supplied before the supply start command is received.

The cylindrical portion 251C is a tubular member that forms a flow passage of fuel and extends to the bottom surface of the container 250. The flow passage formed by the cylindrical portion 251C leads to the inside of the container 250.

When the aerial vehicle 200 lands on the docking device S6 in step ST244 of FIG. 28A after the controller 30 authenticates the aerial vehicle 200, the aerial vehicle 200 is in a state illustrated in FIG. 30A2. Namely, the aerial vehicle 200 is in a state supported by the movable base members 61A through 61D that are in the extended state.

Subsequently, as illustrated in step ST252, the controller 30 switches the docking device S6 from the docking disabled state to the docking enabled state. In the present embodiment, the controller 30 contracts the movable base members 61A through 61D by causing the electric actuator to be driven by power supplied from the battery mounted on the aerial vehicle 200 through the wireless power feeding device 206 and the wireless power receiving device S7. The controller 30 may contract the movable base members 61A through 61D before the aerial vehicle 200 lands.

In a case where the inflow prevention portion 62A is fixed by the electric stopper at the upper limit position, the electric stopper may be driven so as to move the inflow prevention portion 62A downward from the upper limit position. The same applies to the outflow prevention portion 251A.

Once the movable base members 61A through 61D are contracted, the container 250 slides down inside the container receiving portion 60 by its own weight. As a result, the coupling portion 251 and the coupling portion 62 are coupled to each other as illustrated in FIG. 30B2, and the container 250 leads to the fuel tank 18. To be more specific, the outflow prevention portion 251A is pushed upward by the central pin 62B and thus separates from the circular portion 251B. Further, the inflow prevention portion 62A is pushed downward by the cylindrical portion 251C and thus separates from the circular portion 62C. As a result, as indicated by an arrow AR1 of FIG. 30B2, fuel in the container 250 flows through a hole 251D formed near a lower end of the cylindrical portion 251C into the cylindrical portion 62D and further flows into the fuel tank 18.

Figure 31A:
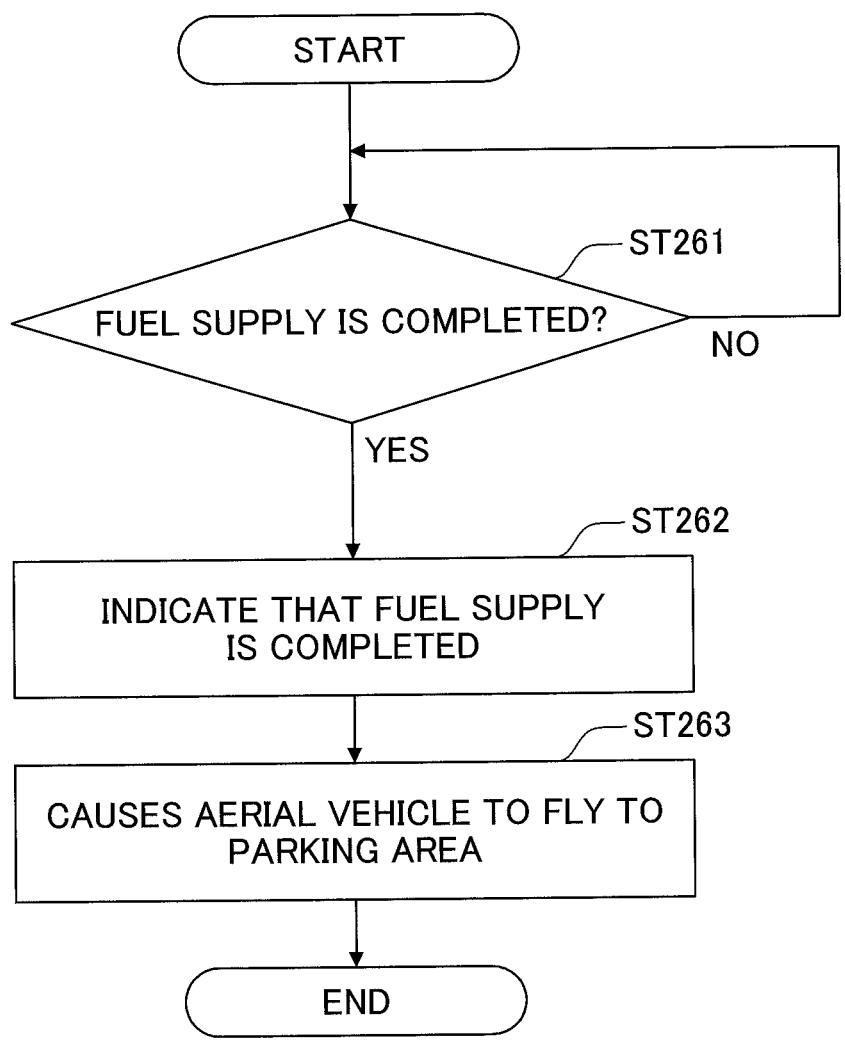
FIG. 31A is a flowchart illustrating a process performed after completing the fuel supply.
Figure 31B:
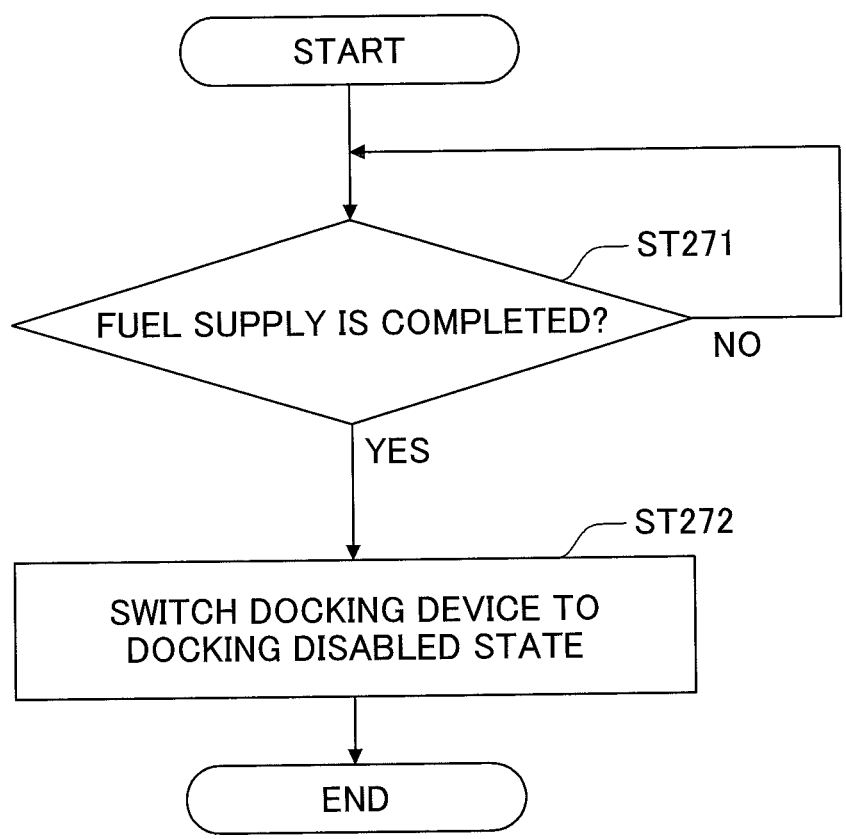
FIG. 31B is a flowchart illustrating a process performed after completing the fuel supply.

Next, referring to FIGS. 31A and 31B, another function of the fluid supply system will be described. FIGS. 31A and 31B illustrate a process performed after the fluid supply system completes the fuel supply (hereinafter referred to as a "process performed after completing the fuel supply"). FIG. 31A is a flowchart illustrating a process flow performed by the aerial vehicle 200. FIG. 31B is a flowchart illustrating a process flow performed by the shovel 100.

The process performed after completing the fuel supply of FIGS. 31A and 31B is applied to a case where fuel is supplied to the fuel tank 18, and is also applied similarly to cases where an aqueous urea solution is supplied to the aqueous urea solution tank 19 and grease is supplied to the grease tank 20.

First, referring to FIG. 31A, the process flow performed by the aerial vehicle 200 will be described. The controller 201 of the aerial vehicle 200 landing on the docking device S6 determines whether the fuel supply is completed (step ST261). For example, based on an output from the residual amount detecting device S5A that detects a residual amount of the container 250, the controller 201 determines whether the fuel supply is completed. Alternatively, based on information transmitted from the shovel 100, the controller 201 may determine whether the fuel supply is completed.

When it is determined that the fuel supply is not completed (no in step ST261), the controller 201 waits without performing the process as of step ST261.

When it is determined that the fuel supply is completed (yes in step ST261), the controller 201 indicates, to the shovel 100, that the fuel supply is completed (step ST262). For example, the controller 201 sends, from the transmitter 202 to the shovel 100, information indicating that the fuel supply is completed. When it is determined that the fuel supply is completed based on the information transmitted from the shovel 100, the controller 201 proceeds to the next step without indicating the completion of the fuel supply to the shovel 100. This is because the completion of the fuel supply is already detected by the shovel 100.

Next, the controller 201 causes the aerial vehicle 200 to fly to the parking area (step ST263).

Next, referring to FIG. 31B, the process flow performed by the shovel 100 will be described. The controller 30 of the shovel 100, which has switched the docking device S6 to the docking enabled state, determines whether the fuel supply is completed (step ST271). For example, based on information transmitted from the aerial vehicle 200, the controller 30 determines whether the fuel supply is completed. Alternatively, based on an output from the residual amount detecting device S5A, the controller 30 may determine whether the fuel supply is completed.

When the controller 30 determines that the fuel supply is not completed (no in step ST271), the controller 30 waits without performing the process as of step ST271.

When the controller 30 determines that the fuel supply is completed (yes in step ST271), the controller 30 switches the docking device S6 to the docking disabled state. For example, the controller extends the movable base members 61A through 61D by causing the electric actuator to be driven by power supplied from the battery mounted on the aerial vehicle 200 through the wireless power feeding device 206 and the wireless power receiving device S7.

Upon the movable base members 61A through 61D extending, the container 250 is pushed upward by the movable base members 61A through 61D. Thus, the coupling portion 251 and the coupling portion 62 separate from each other as illustrated in FIG. 30A2, causing the container 250 not to lead to the fuel tank 18. To be more specific, the outflow prevention portion 251A moves downward and makes contact with the circular portion 251B. Further, the inflow prevention portion 62A moves upward and makes contact with the circular portion 62C. As a result, fluid is prevented from flowing out of the container 250 to the outside, while also prevented from flowing into the fuel tank 18 from the outside. The inflow prevention portion 62A may be fixed by the electric stopper at the upper limit position. The same applies to the outflow prevention portion 251A.

When it is determined that the fuel supply is completed based on the output from the residual amount detecting device S5A, the controller 30 indicates, to the aerial vehicle 200, that the fuel supply is completed. For example, the controller 30 sends, from the transmitter S1 to the aerial vehicle 200, information indicating that the fuel supply is completed.

In the above-described configuration, the shovel 100 can effectively receive fuel by using the aerial vehicle 200. When the shovel 100 receives fuel from the aerial vehicle 200, the shovel 100 is not required to move from a work site to a place where fuel is supplied. Accordingly, it is particularly effective, for example, when the shovel 100 is operated at a work site such as a disaster recovery site where entering and exiting of the shovel 100 is difficult, or when the shovel 100 is remotely operated at a work site where a worker is prohibited to enter.

Further, only when the aerial vehicle 200 is authenticated, the shovel 100 is supplied with fuel. To be more specific, only when the aerial vehicle 200 is authenticated, the shovel 100 is supplied with fuel by operating the docking device S6 and the electric stopper. Namely, fuel supply from an aerial vehicle other than the authenticated aerial vehicle 200, including manual fuel supply, is restricted. Therefore, it is possible to prevent the shovel 100 from being supplied with irregular fuel or inferior fuel. Further, the shovel 100 may be supplied with fuel by the aerial vehicle 200 in response to two-way authentication in which the aerial vehicle 200 and the shovel 100 are authenticated by each other, instead of one-way authentication in which the aerial vehicle 200 is authenticated by the shovel 10.

When the wireless power feeding device 206 and the wireless power receiving device S7 are used in combination, the shovel 100 may be completely stopped while the engine is stopped. Completely stopping the shovel 100 means that power supplied to the electric loads such as the controller 30 is completely shut off. As a result, while the functions of the fluid supply system are implemented, it is possible to prevent the battery of the shovel 100 from being overdischarged.

Next, referring to FIGS. 32A1 through 32B2, another example of the docking device S6 will be described. FIGS. 32A1 through 32B2 illustrate another example of the docking device S6 and correspond to FIGS. 30A1 through 30B2. FIG. 32A1 and FIG. 32A2 illustrate the docking device S6 in the docking disabled state. FIG. 32B1 and FIG. 32B2 illustrate the docking device S6 in the docking enabled state. FIG. 32A1 and FIG. 32B1 are top views of the docking device S6. FIG. 32A2 and FIG. 32B2 are cross-sectional views of the docking device S6. FIG. 32A2 is a vertical cross-sectional view taken along a long-dash short-dash line L3 of FIG. 32A1. FIG. 32B2 is a vertical cross-sectional view taken along a long-dash short-dash line L4 of FIG. 30B1.

The example of FIGS. 32A1 through 32B2 differs from the example of FIGS. 30A1 through 30B2 in that the docking device S6 does not include the base 61 and includes a cover 63. Other elements are the same as those in the example of FIGS. 30A1 through 30B2 and thus a description thereof will be omitted, and only differences will be described in detail.

The cover 63 is an automatically openable and closable cover that covers the container receiving portion 60. In the present embodiment, the cover 63 has a left cover 63L and a right cover 63R. The left cover 63L and the right cover 63R are configured to be opened and closed by an electric actuator. Arrows AR2 illustrated in FIGS. 32A1 and 32A2 indicate an opening direction of the left cover 63L, and arrows AR3 illustrated in FIGS. 32A1 and 32A2 indicate an opening direction of the right cover 63R. When the docking device S6 is in the docking disabled state, the left cover 63L and the right cover 63R are in a closed state as illustrated in FIG. 32A2. When the docking device S6 is in the docking enabled state, the left cover 63L and the right cover 63R are in an open state as illustrated in FIG. 32B2. In the closed state, the left cover 63L and the right cover 63R can cover the coupling portion 62 such that the coupling portion 62 is not seen from the outside.

The controller 30 opens and closes the left cover 63L and the right cover 63R by causing the electric actuator to be driven by power supplied from the battery mounted on the aerial vehicle 200 through the wireless power feeding device 206 and the wireless power receiving device S7.

When the left cover 63L and the right cover 63R are opened, the container receiving portion 60 can receive the container 250. Thus, as illustrated in FIG. 32B2, the coupling portion 251 and the coupling portion 62 can be coupled to each other such that the container 250 can lead to the fuel tank 18.

In this configuration, the shovel 100 using the docking device S6 of FIGS. 32A1 through 32B2 can exhibit a similar effect to that of the docking device S6 of FIGS. 30A1 through 30B2.

Although the preferred embodiments of the present invention have been described, the present invention is not limited to the above-described embodiments. Various modifications and variations may be made without departing from the scope of the present invention.

For example, in the above-described embodiments, the aerial vehicle 200 automatically determines whether fuel supply is required, and automatically takes off and flies from the parking area to an area above the shovel 100. However, the present invention is not limited to this configuration. For example, the aerial vehicle 200 may be remotely operated via a remote control. In this case, the pilot may remotely operate the aerial vehicle 200 such that the aerial vehicle 200 flies from the parking area to an area above the shovel 100 before fuel supply and returns, from the area above the shovel 100 to the parking area after the fuel supply.

Further, in the above-described embodiments, the docking device S6 is operated by power supplied from the battery mounted on the aerial vehicle 200. To be more specific, the docking device S6 is operated by power supplied from the battery mounted on the aerial vehicle 200 through the wireless power feeding device 206 and the wireless power receiving device S7. However, the present invention is not limited to this configuration. For example, the docking device S6 may be operated by power supplied from the battery mounted on the shovel 100. In this case, for example, the controller 30 may be continuously or intermittently operated in a power-saving mode so as to communicate with the aerial vehicle 200 while the engine 11 of the shovel 100 is stopped. In this case, the wireless power feeding device 206 and the wireless power receiving device S7 may be omitted. Alternatively, by using a wireless power feeding device mounted on the shovel 100 and a wireless power receiving device mounted on the aerial vehicle 200, the battery of the aerial vehicle 200 may be charged with the battery mounted on the shovel 100. Further, power may be transferred between the shovel 100 and the aerial vehicle 200 in a wired manner.

Various aspects of the subject-matter described herein may be set out non-exhaustively in the following numbered clauses:

1. A shovel includes a lower traveling body; an upper turning body mounted on the lower traveling body; a transmitter and a receiver mounted on the upper turning body; a display device configured to display an image captured by a camera-mounted autonomous aerial vehicle; and a controller configured to generate information related to a target flight position of the camera-mounted autonomous aerial vehicle, wherein the transmitter is configured to transmit the information related to the target flight position to the camera-mounted autonomous aerial vehicle, and the target flight position is a position that is higher by a predetermined height relative to a predetermined point on the shovel and is away by a predetermined distance relative to the predetermined point.

2. The shovel according to clause 1, wherein the receiver is configured to receive position information of the camera-mounted autonomous aerial vehicle, and the controller is configured to generate the information related to the target flight position based on the position information of the camera-mounted autonomous aerial vehicle.

3. The shovel according to clause 1, wherein the information related to the target flight position is either information related to a position of the shovel or a combination of the information related to the position of the shovel and information related to an orientation of the shovel.

4. A camera-mounted autonomous aerial vehicle for flying and following a shovel, the camera-mounted autonomous aerial vehicle includes a camera configured to capture an image of the shovel; a transmitter configured to transmit the image captured by the camera; and a controller configured to obtain a position of the shovel based on the image and determine a target flight position based on the position of the shovel, wherein the target flight position is a position that is higher by a predetermined height relative to a predetermined point on the shovel and is away by a predetermined distance relative to the predetermined point.

5. A camera-mounted autonomous aerial vehicle for flying and following a shovel, the camera-mounted autonomous aerial vehicle includes: a camera configured to capture an image of the shovel; a transmitter configured to transmit the image captured by the camera; a receiver configured to receive information generated by the shovel; and a controller configured to determine a target flight position based on the information generated by the shovel, wherein the information generated by the shovel is either information related to a position of the shovel or a combination of the information related to the position of the shovel and information related to an orientation of the shovel, and the target flight position is a position that is higher by a predetermined height relative to a predetermined point on the shovel and is away by a predetermined distance relative to the predetermined point.

6. A shovel includes a lower traveling body; an upper turning body mounted on the lower traveling body; and a transmitter, a receiver, and a positioning device mounted on the upper turning body, wherein a flight prohibited space of an autonomous aerial vehicle is set based on at least a position of the shovel obtained by the positioning device, whether or not the autonomous aerial vehicle exists in the flight prohibited space is determined based on a position of the autonomous aerial vehicle received by the receiver, and upon the autonomous aerial vehicle being determined to exist in the flight prohibited space, information related to a target flight position set outside the flight prohibited space is transmitted to the autonomous aerial vehicle.

7. A shovel includes a lower traveling body; an upper turning body mounted on the lower traveling body; and a transmitter and a positioning device mounted on the upper turning body, wherein the transmitter is configured to transmit information related to a flight prohibited space of an autonomous aerial vehicle, the flight prohibited space being set based on at least a position of the shovel obtained by the positioning device.

8. The shovel according to clause 7, wherein the flight prohibited space is set based on the position of the shovel and an orientation of the shovel.

9. An autonomous aerial vehicle including a receiver for receiving information generated by a shovel, wherein an autonomous operation is performed such that the autonomous aerial vehicle flies outside a flight prohibited space around the shovel, the flight prohibited space being set based on the information generated by the shovel.

10. An autonomous aerial vehicle including a camera for capturing an image of a shovel, wherein information related to a position of the shovel with respect to the autonomous aerial vehicle is obtained based on the image captured by the camera, and an autonomous operation is performed such that the autonomous aerial vehicle flies outside a flight prohibited space around the shovel, the flight prohibited space being determined based on the information.

11. An autonomous aerial vehicle including a camera for capturing an image of a shovel, wherein information related to a position and an orientation of the shovel with respect to the autonomous aerial vehicle is obtained based on the image captured by the camera, and an autonomous operation is performed such that the autonomous aerial vehicle flies outside a flight prohibited space around the shovel, the flight prohibited space being determined based on the information.

12. A shovel includes a lower traveling body; an upper turning body mounted on the lower traveling body; a transmitter, a receiver, and display device mounted on the upper turning body; and a controller configured to generate information related to a target flight position of an autonomous aerial vehicle, wherein the transmitter is configured to transmit the information related to the target flight position to the autonomous aerial vehicle, and the target flight position is a position that is higher by a predetermined height relative to predetermined point on the shovel and is away by a predetermined distance relative to the predetermined point.

13. The shovel according to clause 12, wherein the receiver is configured to receive position information of the autonomous aerial vehicle, and the controller is configured to generate the information related to the target flight position based on the position information of the autonomous aerial vehicle.

14. The shovel according to clause 12, wherein the information related to the target flight position is either information related to a position of the shovel or a combination of the information related to the position of the shovel and information related to an orientation of the shovel.

15. An autonomous aerial vehicle for flying and following a shovel, the autonomous aerial vehicle includes: a receiver configured to receive information generated by the shovel; and a controller configured to determine a target flight position based on the information generated by the shovel, wherein the information generated by the shovel is either information related to a position of the shovel or a combination of the information related to the position of the shovel and information related to an orientation of the shovel, and the target flight position is a position that is higher by a predetermined height relative to a predetermined point on the shovel and is away by a predetermined distance relative to the predetermined point.

Further, the present invention is not limited to these embodiments, but various variations and modifications may be made without departing from the scope of the present invention.

What is claimed is:

1. A shovel comprising:
a lower traveling body;
an upper turning body mounted on the lower traveling body;
a receiver mounted on the upper turning body and configured to receive an image captured by a camera-mounted autonomous aerial vehicle;
a direction detecting device mounted on the upper turning body and configured to detect a direction of the shovel;
a controller mounted on the upper turning body and configured to generate information related to a target rotation angle of the camera-mounted autonomous aerial vehicle based on the direction of the shovel; and
a display device mounted on the upper turning body and configured to display the captured image in a same direction as a direction of an image that the camera-mounted autonomous aerial vehicle is configured to capture when the camera-mounted autonomous aerial vehicle rotates by the target rotation angle.

2. The shovel according to claim 1, wherein
the receiver is configured to receive information related to a direction of the camera-mounted autonomous aerial vehicle, and
the controller is configured to generate the information related to the target rotation angle based on the direction of the shovel and the direction of the camera-mounted autonomous aerial vehicle.

3. The shovel according to claim 1, wherein the controller is configured to rotate the captured image by the target rotation angle and cause the display device to display the captured image.

4. The shovel according to claim 1, wherein a direction of the camera-mounted autonomous aerial vehicle when the camera-mounted autonomous aerial vehicle rotates by the target rotation angle is the same as the direction of the shovel.

5. The shovel according to claim 1, further comprising:
a transmitter mounted on the upper turning body, wherein
the transmitter is configured to transmit, to the camera-mounted autonomous aerial vehicle, either the information related to the target rotation angle or a combination of the information related to the target rotation angle and information related to a target flight position of the camera-mounted autonomous aerial vehicle, and
the target flight position is a position that is higher by a predetermined height relative to a predetermined point on the shovel and is away by a predetermined distance relative to the predetermined point.

6. The shovel according to claim 1, further comprising:
a transmitter mounted on the upper turning body, wherein
the transmitter is configured to transmit, to the camera-mounted autonomous aerial vehicle, information related to the direction of the shovel as information related to the target rotation angle.

7. An autonomous aerial vehicle comprising:
a camera configured to capture an image of a shovel;
a transmitter configured to transmit the image captured by the camera; and
a controller configured to obtain a direction of the shovel based on the captured image and determine a target rotation angle of the autonomous aerial vehicle based on the direction of the shovel, wherein
an angle between a direction of the autonomous aerial vehicle when the autonomous aerial vehicle rotates by the target rotation angle and a direction of the shovel is a preliminarily set angle.

8. The autonomous aerial vehicle according to claim 7, wherein the transmitter is configured to transmit an image obtained by rotating the captured image by the target rotation angle.

9. The autonomous aerial vehicle according to claim 7, wherein the autonomous aerial vehicle rotates by the target rotation angle.

10. An autonomous aerial vehicle comprising:
a camera configured to capture an image of a shovel;
a transmitter configured to transmit the image captured by the camera;
a receiver configured to receive information generated by the shovel; and
a controller configured to determine a target rotation angle of the autonomous aerial vehicle based on the information generated by the shovel, wherein
an angle between a direction of the autonomous aerial vehicle when the autonomous aerial vehicle rotates by the target rotation angle and a direction of the shovel is a preliminarily set angle.

11. A shovel comprising:
a lower traveling body;
an upper turning body mounted on the lower traveling body;
a receiver mounted on the upper turning body and configured to receive an image captured by a camera-mounted autonomous aerial vehicle, the captured image including a marker image such that a direction of the shovel is identified, the marker image being an image of a mark attached to the shovel; and
a controller mounted on the upper turning body and configured to guide a movement of the shovel based on the marker image included in the captured image.

12. An autonomous aerial vehicle comprising:
a camera configured to capture an image of a shovel;
a transmitter configured to transmit the image captured by the camera; and
a controller configured to obtain a position and a direction of the shovel based on the captured image, wherein
the captured image includes a marker image that is an image of a mark attached to the shovel.

* * * * *